US010880650B2

(12) United States Patent
Woo et al.

(10) Patent No.: US 10,880,650 B2
(45) Date of Patent: Dec. 29, 2020

(54) NETWORK MICROPHONE DEVICES WITH AUTOMATIC DO NOT DISTURB ACTUATION CAPABILITIES

(71) Applicant: Sonos, Inc., Santa Barbara, CA (US)

(72) Inventors: Sein Woo, Somerville, MA (US); Ryan Myers, Santa Barbara, CA (US); Charles Freedman, Santa Barbara, CA (US)

(73) Assignee: SONOS, INC., Santa Barbara, CA (US)

( * ) Notice: Subject to any disclaimer, the term of this patent is extended or adjusted under 35 U.S.C. 154(b) by 0 days.

(21) Appl. No.: 16/214,711

(22) Filed: Dec. 10, 2018

(65) Prior Publication Data

US 2019/0281387 A1    Sep. 12, 2019

Related U.S. Application Data

(60) Provisional application No. 62/596,902, filed on Dec. 10, 2017.

(51) Int. Cl.
*H04R 5/04* (2006.01)
*G06F 3/16* (2006.01)
*G06F 9/54* (2006.01)
*G10L 21/055* (2013.01)

(52) U.S. Cl.
CPC ............ *H04R 5/04* (2013.01); *G06F 3/167* (2013.01); *G06F 9/542* (2013.01); *G10L 21/055* (2013.01); *H04R 2430/01* (2013.01)

(58) Field of Classification Search
CPC ....... H04R 5/04; H04R 2430/01; G06F 3/167; G06F 9/542; G10L 21/055

USPC .............. 381/56, 58, 91, 122, 124, 300, 311
See application file for complete search history.

(56) References Cited

U.S. PATENT DOCUMENTS

| 4,741,038 A | 4/1988 | Elko et al. |
| 4,941,187 A | 7/1990 | Slater |
| 4,974,213 A | 11/1990 | Siwecki |
| 5,036,538 A | 7/1991 | Oken et al. |

(Continued)

FOREIGN PATENT DOCUMENTS

| AU | 2017100486 A4 | 6/2017 |
| AU | 2017100581 A4 | 6/2017 |

(Continued)

OTHER PUBLICATIONS

US 9,299,346 B1, 03/2016, Hart et al. (withdrawn)

(Continued)

*Primary Examiner* — William A Jerez Lora
(74) *Attorney, Agent, or Firm* — McDonnell Boehnen Hulbert & Berghoff LLP

(57) ABSTRACT

Embodiments disclosed herein include networked microphone devices (NMD) determining whether a Do Not Disturb (DND) feature should be activated, in response to determining that the DND feature should be activated, activating the DND feature. In some embodiments, the NMD determines whether to activate the DND feature based on various configuration and operational states. And in some embodiments, activating the DND feature includes activating the DND feature includes activating the DND feature at one or more additional NMDs based on the configuration and operational state of the NMD and the one or more additional NMDs.

20 Claims, 12 Drawing Sheets

(56) References Cited

U.S. PATENT DOCUMENTS

| | | |
|---|---|---|
| 5,440,644 A | 8/1995 | Farinelli et al. |
| 5,588,065 A | 12/1996 | Tanaka et al. |
| 5,740,260 A | 4/1998 | Odom |
| 5,761,320 A | 6/1998 | Farinelli et al. |
| 5,923,902 A | 7/1999 | Inagaki |
| 5,949,414 A | 9/1999 | Namikata et al. |
| 6,032,202 A | 2/2000 | Lea et al. |
| 6,088,459 A | 7/2000 | Hobelsberger |
| 6,256,554 B1 | 7/2001 | DiLorenzo |
| 6,301,603 B1 | 10/2001 | Maher et al. |
| 6,311,157 B1 | 10/2001 | Strong |
| 6,404,811 B1 | 6/2002 | Cvetko et al. |
| 6,408,078 B1 | 6/2002 | Hobelsberger |
| 6,469,633 B1 | 10/2002 | Wachter et al. |
| 6,522,886 B1 | 2/2003 | Youngs et al. |
| 6,594,347 B1 | 7/2003 | Calder et al. |
| 6,594,630 B1 | 7/2003 | Zlokarnik et al. |
| 6,611,537 B1 | 8/2003 | Edens et al. |
| 6,611,604 B1 | 8/2003 | Irby et al. |
| 6,631,410 B1 | 10/2003 | Kowalski et al. |
| 6,757,517 B2 | 6/2004 | Chang et al. |
| 6,778,869 B2 | 8/2004 | Champion |
| 7,130,608 B2 | 10/2006 | Hollstrom et al. |
| 7,130,616 B2 | 10/2006 | Janik |
| 7,143,939 B2 | 12/2006 | Henzerling |
| 7,236,773 B2 | 6/2007 | Thomas |
| 7,295,548 B2 | 11/2007 | Blank et al. |
| 7,356,471 B2 | 4/2008 | Ito et al. |
| 7,391,791 B2 | 6/2008 | Balassanian et al. |
| 7,483,538 B2 | 1/2009 | McCarty et al. |
| 7,571,014 B1 | 8/2009 | Lambourne et al. |
| 7,630,501 B2 | 12/2009 | Blank et al. |
| 7,643,894 B2 | 1/2010 | Braithwaite et al. |
| 7,657,910 B1 | 2/2010 | McAulay et al. |
| 7,661,107 B1 | 2/2010 | Van et al. |
| 7,702,508 B2 | 4/2010 | Bennett |
| 7,792,311 B1 | 9/2010 | Holmgren et al. |
| 7,853,341 B2 | 12/2010 | McCarty et al. |
| 7,961,892 B2 | 6/2011 | Fedigan |
| 7,987,294 B2 | 7/2011 | Bryce et al. |
| 8,014,423 B2 | 9/2011 | Thaler et al. |
| 8,032,383 B1 | 10/2011 | Bhardwaj et al. |
| 8,041,565 B1 | 10/2011 | Bhardwaj et al. |
| 8,045,952 B2 | 10/2011 | Qureshey et al. |
| 8,073,125 B2 | 12/2011 | Zhang et al. |
| 8,073,681 B2 | 12/2011 | Baldwin et al. |
| 8,103,009 B2 | 1/2012 | McCarty et al. |
| 8,136,040 B2 | 3/2012 | Fleming |
| 8,234,395 B2 | 7/2012 | Millington et al. |
| 8,239,206 B1 | 8/2012 | Lebeau et al. |
| 8,255,224 B2 | 8/2012 | Singleton et al. |
| 8,284,982 B2 | 10/2012 | Bailey |
| 8,290,603 B1 | 10/2012 | Lambourne et al. |
| 8,340,975 B1 | 12/2012 | Rosenberger et al. |
| 8,364,481 B2 | 1/2013 | Strope et al. |
| 8,385,557 B2 | 2/2013 | Tashev et al. |
| 8,386,261 B2 | 2/2013 | Mellott et al. |
| 8,423,893 B2 | 4/2013 | Ramsay et al. |
| 8,428,758 B2 | 4/2013 | Naik et al. |
| 8,453,058 B1 | 5/2013 | Coccaro et al. |
| 8,473,618 B2 | 6/2013 | Spear et al. |
| 8,483,853 B1 | 7/2013 | Lambourne et al. |
| 8,484,025 B1 | 7/2013 | Moreno et al. |
| 8,738,925 B1 | 5/2014 | Park et al. |
| 8,831,761 B2 | 9/2014 | Kemp et al. |
| 8,831,957 B2 | 9/2014 | Taubman et al. |
| 8,848,879 B1 | 9/2014 | Coughlan et al. |
| 8,874,448 B1 | 10/2014 | Kauffmann et al. |
| 8,938,394 B1 | 1/2015 | Faaborg et al. |
| 8,942,252 B2 | 1/2015 | Balassanian et al. |
| 8,983,383 B1 | 3/2015 | Haskin |
| 8,983,844 B1 | 3/2015 | Thomas et al. |
| 9,015,049 B2 | 4/2015 | Baldwin et al. |
| 9,042,556 B2 | 5/2015 | Kallai et al. |
| 9,060,224 B1 | 6/2015 | List |
| 9,094,539 B1 | 7/2015 | Noble |
| 9,215,545 B2 | 12/2015 | Dublin et al. |
| 9,251,793 B2 | 2/2016 | Lebeau et al. |
| 9,253,572 B2 | 2/2016 | Beddingfield, Sr. et al. |
| 9,262,612 B2 | 2/2016 | Cheyer |
| 9,275,637 B1 | 3/2016 | Salvador et al. |
| 9,288,597 B2 | 3/2016 | Carlsson et al. |
| 9,300,266 B2 | 3/2016 | Grokop |
| 9,304,736 B1 | 4/2016 | Whiteley et al. |
| 9,307,321 B1 | 4/2016 | Unruh |
| 9,318,107 B1 | 4/2016 | Sharifi |
| 9,319,816 B1 | 4/2016 | Narayanan |
| 9,324,322 B1 | 4/2016 | Torok et al. |
| 9,335,819 B1 | 5/2016 | Jaeger et al. |
| 9,361,878 B2 | 6/2016 | Boukadakis |
| 9,368,105 B1 | 6/2016 | Freed et al. |
| 9,374,634 B2 | 6/2016 | Macours |
| 9,386,154 B2 | 7/2016 | Baciu et al. |
| 9,401,058 B2 | 7/2016 | De La Fuente et al. |
| 9,412,392 B2 | 8/2016 | Lindahl et al. |
| 9,426,567 B2 | 8/2016 | Lee et al. |
| 9,431,021 B1 | 8/2016 | Scalise et al. |
| 9,443,527 B1 | 9/2016 | Watanabe et al. |
| 9,472,201 B1 | 10/2016 | Sleator |
| 9,472,203 B1 | 10/2016 | Ayrapetian et al. |
| 9,484,030 B1 | 11/2016 | Meaney et al. |
| 9,489,948 B1 | 11/2016 | Chu et al. |
| 9,494,683 B1 | 11/2016 | Sadek |
| 9,509,269 B1 | 11/2016 | Rosenberg |
| 9,510,101 B1 | 11/2016 | Polleros |
| 9,514,476 B2 | 12/2016 | Kay et al. |
| 9,514,752 B2 | 12/2016 | Sharifi |
| 9,516,081 B2 | 12/2016 | Tebbs et al. |
| 9,536,541 B2 | 1/2017 | Chen et al. |
| 9,548,053 B1 | 1/2017 | Basye et al. |
| 9,548,066 B2 | 1/2017 | Jain et al. |
| 9,552,816 B2 | 1/2017 | Vanlund et al. |
| 9,554,210 B1 | 1/2017 | Ayrapetian et al. |
| 9,560,441 B1 | 1/2017 | McDonough, Jr. et al. |
| 9,576,591 B2 | 2/2017 | Kim et al. |
| 9,601,116 B2 | 3/2017 | Casado et al. |
| 9,615,170 B2 | 4/2017 | Kirsch et al. |
| 9,615,171 B1 | 4/2017 | O'Neill et al. |
| 9,626,695 B2 | 4/2017 | Balasubramanian et al. |
| 9,632,748 B2 | 4/2017 | Faaborg et al. |
| 9,633,186 B2 | 4/2017 | Ingrassia, Jr. et al. |
| 9,633,368 B2 | 4/2017 | Greenzeiger et al. |
| 9,633,660 B2 | 4/2017 | Haughay et al. |
| 9,633,671 B2 | 4/2017 | Giacobello et al. |
| 9,633,674 B2 | 4/2017 | Sinha et al. |
| 9,640,179 B1 | 5/2017 | Hart et al. |
| 9,640,183 B2 | 5/2017 | Jung et al. |
| 9,641,919 B1 | 5/2017 | Poole et al. |
| 9,646,614 B2 | 5/2017 | Bellegarda et al. |
| 9,653,060 B1 | 5/2017 | Hilmes et al. |
| 9,653,075 B1 | 5/2017 | Chen et al. |
| 9,659,555 B1 | 5/2017 | Hilmes et al. |
| 9,672,821 B2 | 6/2017 | Krishnaswamy et al. |
| 9,685,171 B1 | 6/2017 | Yang |
| 9,691,378 B1 | 6/2017 | Meyers et al. |
| 9,691,379 B1 | 6/2017 | Mathias et al. |
| 9,697,826 B2 | 7/2017 | Sainath et al. |
| 9,697,828 B1 | 7/2017 | Prasad et al. |
| 9,698,999 B2 | 7/2017 | Mutagi et al. |
| 9,704,478 B1 | 7/2017 | Vitaladevuni et al. |
| 9,721,566 B2 | 8/2017 | Newendorp et al. |
| 9,721,568 B1 | 8/2017 | Polansky et al. |
| 9,721,570 B1 | 8/2017 | Beal et al. |
| 9,728,188 B1 | 8/2017 | Rosen et al. |
| 9,734,822 B1 | 8/2017 | Sundaram et al. |
| 9,743,204 B1 | 8/2017 | Welch et al. |
| 9,747,011 B2 | 8/2017 | Lewis et al. |
| 9,747,899 B2 | 8/2017 | Pogue et al. |
| 9,747,920 B2 | 8/2017 | Ayrapetian et al. |
| 9,747,926 B2 | 8/2017 | Sharifi et al. |
| 9,754,605 B1 | 9/2017 | Chhetri |
| 9,762,967 B2 | 9/2017 | Clarke et al. |
| 9,769,420 B1 | 9/2017 | Moses |
| 9,811,314 B2 | 11/2017 | Plagge et al. |

(56) References Cited

U.S. PATENT DOCUMENTS

| | | |
|---|---|---|
| 9,813,810 B1 | 11/2017 | Nongpiur |
| 9,813,812 B2 | 11/2017 | Berthelsen et al. |
| 9,820,036 B1 | 11/2017 | Tritschler et al. |
| 9,820,039 B2 | 11/2017 | Lang |
| 9,826,306 B2 | 11/2017 | Lang |
| 9,865,259 B1 | 1/2018 | Typrin et al. |
| 9,865,264 B2 | 1/2018 | Gelfenbeyn et al. |
| 9,881,616 B2 | 1/2018 | Beckley et al. |
| 9,900,723 B1 | 2/2018 | Choisel et al. |
| 9,916,839 B1 | 3/2018 | Scalise et al. |
| 9,947,316 B2 | 4/2018 | Millington et al. |
| 9,947,333 B1 | 4/2018 | David |
| 9,972,318 B1 | 5/2018 | Kelly et al. |
| 9,973,849 B1 | 5/2018 | Zhang et al. |
| 10,013,995 B1 | 7/2018 | Lashkari et al. |
| 10,026,401 B1 | 7/2018 | Mutagi et al. |
| 10,048,930 B1 | 8/2018 | Vega et al. |
| 10,049,675 B2 | 8/2018 | Haughay |
| 10,051,366 B1 | 8/2018 | Buoni et al. |
| 10,051,600 B1 | 8/2018 | Zhong et al. |
| 10,068,573 B1 | 9/2018 | Aykac et al. |
| 10,074,371 B1 | 9/2018 | Wang et al. |
| 10,079,015 B1 | 9/2018 | Lockhart et al. |
| 10,116,748 B2 | 10/2018 | Farmer et al. |
| 10,134,399 B2 | 11/2018 | Lang et al. |
| 10,136,204 B1 | 11/2018 | Poole et al. |
| 10,152,969 B2 | 12/2018 | Reilly et al. |
| 10,224,056 B1 | 3/2019 | Torok et al. |
| 10,276,161 B2 | 4/2019 | Hughes et al. |
| 10,297,256 B2 | 5/2019 | Reilly et al. |
| 10,339,917 B2 | 7/2019 | Aleksic et al. |
| 10,346,122 B1 | 7/2019 | Morgan |
| 10,354,650 B2 | 7/2019 | Gruenstein et al. |
| 10,366,688 B2 | 7/2019 | Gunn et al. |
| 10,374,816 B1 | 8/2019 | Leblang et al. |
| 10,381,001 B2 | 8/2019 | Gunn et al. |
| 10,381,002 B2 | 8/2019 | Gunn et al. |
| 10,381,003 B2 | 8/2019 | Wakisaka et al. |
| 10,499,146 B2 | 12/2019 | Lang et al. |
| 10,511,904 B2 | 12/2019 | Buoni et al. |
| 10,546,583 B2 | 1/2020 | White et al. |
| 10,602,268 B1 | 3/2020 | Soto |
| 10,624,612 B2 | 4/2020 | Sumi et al. |
| 2001/0042107 A1 | 11/2001 | Palm |
| 2002/0022453 A1 | 2/2002 | Balog et al. |
| 2002/0026442 A1 | 2/2002 | Lipscomb et al. |
| 2002/0034280 A1 | 3/2002 | Infosino |
| 2002/0072816 A1 | 6/2002 | Shdema et al. |
| 2002/0116196 A1 | 8/2002 | Tran |
| 2002/0124097 A1 | 9/2002 | Isely et al. |
| 2003/0038848 A1 | 2/2003 | Lee et al. |
| 2003/0040908 A1 | 2/2003 | Yang et al. |
| 2003/0070869 A1 | 4/2003 | Hlibowicki |
| 2003/0072462 A1 | 4/2003 | Hlibowicki |
| 2003/0095672 A1 | 5/2003 | Hobelsberger |
| 2003/0157951 A1 | 8/2003 | Hasty |
| 2004/0024478 A1 | 2/2004 | Hans |
| 2004/0093219 A1 | 5/2004 | Shin et al. |
| 2004/0127241 A1 | 7/2004 | Shostak |
| 2004/0128135 A1 | 7/2004 | Anastasakos |
| 2004/0234088 A1 | 11/2004 | McCarty et al. |
| 2005/0031131 A1 | 2/2005 | Browning et al. |
| 2005/0031132 A1 | 2/2005 | Browning et al. |
| 2005/0031133 A1 | 2/2005 | Browning et al. |
| 2005/0031134 A1 | 2/2005 | Leske |
| 2005/0031137 A1 | 2/2005 | Browning et al. |
| 2005/0031138 A1 | 2/2005 | Browning et al. |
| 2005/0031139 A1 | 2/2005 | Browning et al. |
| 2005/0031140 A1 | 2/2005 | Browning |
| 2005/0047606 A1 | 3/2005 | Lee et al. |
| 2005/0077843 A1 | 4/2005 | Benditt |
| 2005/0164664 A1 | 7/2005 | Difonzo et al. |
| 2005/0195988 A1 | 9/2005 | Tashev et al. |
| 2005/0201254 A1 | 9/2005 | Looney et al. |
| 2005/0207584 A1 | 9/2005 | Bright |
| 2005/0268234 A1 | 12/2005 | Rossi et al. |
| 2005/0283330 A1 | 12/2005 | Laraia et al. |
| 2006/0004834 A1 | 1/2006 | Pyhalammi et al. |
| 2006/0023945 A1 | 2/2006 | King et al. |
| 2006/0104451 A1 | 5/2006 | Browning et al. |
| 2006/0147058 A1 | 7/2006 | Wang |
| 2006/0190269 A1 | 8/2006 | Tessel et al. |
| 2006/0190968 A1 | 8/2006 | Jung et al. |
| 2006/0247913 A1 | 11/2006 | Huerta et al. |
| 2006/0262943 A1 | 11/2006 | Oxford |
| 2007/0018844 A1 | 1/2007 | Sutardja |
| 2007/0019815 A1 | 1/2007 | Asada et al. |
| 2007/0033043 A1 | 2/2007 | Hyakumoto |
| 2007/0071255 A1 | 3/2007 | Schobben |
| 2007/0076131 A1 | 4/2007 | Li et al. |
| 2007/0076906 A1 | 4/2007 | Takagi et al. |
| 2007/0140058 A1 | 6/2007 | McIntosh et al. |
| 2007/0140521 A1 | 6/2007 | Mitobe et al. |
| 2007/0142944 A1 | 6/2007 | Goldberg et al. |
| 2007/0147651 A1 | 6/2007 | Mitobe et al. |
| 2008/0037814 A1 | 2/2008 | Shau |
| 2008/0090537 A1 | 4/2008 | Sutardja |
| 2008/0146289 A1 | 6/2008 | Korneluk et al. |
| 2008/0182518 A1 | 7/2008 | Lo |
| 2008/0208594 A1 | 8/2008 | Cross et al. |
| 2008/0221897 A1 | 9/2008 | Cerra et al. |
| 2008/0247530 A1 | 10/2008 | Barton et al. |
| 2008/0248797 A1 | 10/2008 | Freeman et al. |
| 2008/0291896 A1* | 11/2008 | Tuubel ............... H04L 67/1095 370/352 |
| 2008/0301729 A1 | 12/2008 | Broos et al. |
| 2009/0003620 A1 | 1/2009 | McKillop et al. |
| 2009/0005893 A1 | 1/2009 | Sugii et al. |
| 2009/0010445 A1 | 1/2009 | Matsuo et al. |
| 2009/0018828 A1 | 1/2009 | Nakadai et al. |
| 2009/0043206 A1 | 2/2009 | Towfiq et al. |
| 2009/0052688 A1 | 2/2009 | Ishibashi et al. |
| 2009/0076821 A1 | 3/2009 | Brenner et al. |
| 2009/0153289 A1 | 6/2009 | Hope et al. |
| 2009/0197524 A1 | 8/2009 | Haff et al. |
| 2009/0220107 A1 | 9/2009 | Every et al. |
| 2009/0228919 A1 | 9/2009 | Zott et al. |
| 2009/0238377 A1 | 9/2009 | Ramakrishnan et al. |
| 2009/0248397 A1 | 10/2009 | Garcia et al. |
| 2009/0264072 A1 | 10/2009 | Dai |
| 2009/0323907 A1 | 12/2009 | Gupta et al. |
| 2009/0326949 A1 | 12/2009 | Douthitt et al. |
| 2010/0014690 A1 | 1/2010 | Wolff et al. |
| 2010/0023638 A1 | 1/2010 | Bowman |
| 2010/0035593 A1 | 2/2010 | Franco et al. |
| 2010/0070922 A1 | 3/2010 | Demaio et al. |
| 2010/0075723 A1 | 3/2010 | Min et al. |
| 2010/0088100 A1 | 4/2010 | Lindahl |
| 2010/0092004 A1 | 4/2010 | Kuze |
| 2010/0172516 A1 | 7/2010 | Lastrucci |
| 2010/0178873 A1 | 7/2010 | Lee et al. |
| 2010/0179874 A1 | 7/2010 | Higgins et al. |
| 2010/0185448 A1 | 7/2010 | Meisel |
| 2010/0211199 A1 | 8/2010 | Naik et al. |
| 2011/0033059 A1 | 2/2011 | Bhaskar et al. |
| 2011/0035580 A1 | 2/2011 | Wang et al. |
| 2011/0044461 A1 | 2/2011 | Kuech et al. |
| 2011/0044489 A1 | 2/2011 | Saiki et al. |
| 2011/0066634 A1 | 3/2011 | Phillips et al. |
| 2011/0091055 A1 | 4/2011 | Leblanc |
| 2011/0103615 A1 | 5/2011 | Sun |
| 2011/0145581 A1 | 6/2011 | Malhotra et al. |
| 2011/0170707 A1 | 7/2011 | Yamada et al. |
| 2011/0182436 A1 | 7/2011 | Murgia et al. |
| 2011/0202924 A1 | 8/2011 | Banguero et al. |
| 2011/0267985 A1 | 11/2011 | Wilkinson et al. |
| 2011/0276333 A1 | 11/2011 | Wang et al. |
| 2011/0280422 A1 | 11/2011 | Neumeyer et al. |
| 2011/0289506 A1 | 11/2011 | Trivi et al. |
| 2011/0299706 A1 | 12/2011 | Sakai |
| 2012/0020486 A1 | 1/2012 | Fried et al. |
| 2012/0022863 A1 | 1/2012 | Cho et al. |
| 2012/0022864 A1 | 1/2012 | Leman et al. |
| 2012/0078635 A1 | 3/2012 | Rothkopf et al. |

(56) References Cited

U.S. PATENT DOCUMENTS

| | | |
|---|---|---|
| 2012/0086568 A1 | 4/2012 | Scott et al. |
| 2012/0123268 A1 | 5/2012 | Tanaka et al. |
| 2012/0128160 A1 | 5/2012 | Kim et al. |
| 2012/0131125 A1 | 5/2012 | Seidel et al. |
| 2012/0148075 A1 | 6/2012 | Goh et al. |
| 2012/0163603 A1 | 6/2012 | Abe et al. |
| 2012/0177215 A1 | 7/2012 | Bose et al. |
| 2012/0183149 A1 | 7/2012 | Hiroe |
| 2012/0297284 A1 | 11/2012 | Matthews, III et al. |
| 2012/0308044 A1 | 12/2012 | Vander et al. |
| 2012/0308046 A1 | 12/2012 | Muza |
| 2013/0006453 A1 | 1/2013 | Wang et al. |
| 2013/0024018 A1 | 1/2013 | Chang et al. |
| 2013/0034241 A1 | 2/2013 | Pandey et al. |
| 2013/0039527 A1 | 2/2013 | Jensen et al. |
| 2013/0058492 A1 | 3/2013 | Silzle et al. |
| 2013/0066453 A1 | 3/2013 | Seefeldt et al. |
| 2013/0080146 A1 | 3/2013 | Kato et al. |
| 2013/0124211 A1 | 5/2013 | McDonough |
| 2013/0148821 A1 | 6/2013 | Sorensen |
| 2013/0179173 A1 | 7/2013 | Lee et al. |
| 2013/0183944 A1 | 7/2013 | Mozer et al. |
| 2013/0191119 A1 | 7/2013 | Sugiyama |
| 2013/0191122 A1 | 7/2013 | Mason |
| 2013/0198298 A1 | 8/2013 | Li et al. |
| 2013/0211826 A1 | 8/2013 | Mannby |
| 2013/0216056 A1 | 8/2013 | Thyssen |
| 2013/0262101 A1 | 10/2013 | Srinivasan |
| 2013/0315420 A1 | 11/2013 | You |
| 2013/0317635 A1 | 11/2013 | Bates et al. |
| 2013/0322665 A1 | 12/2013 | Bennett et al. |
| 2013/0324031 A1 | 12/2013 | Loureiro |
| 2013/0329896 A1 | 12/2013 | Krishnaswamy et al. |
| 2013/0331970 A1 | 12/2013 | Beckhardt et al. |
| 2013/0332165 A1 | 12/2013 | Beckley et al. |
| 2013/0339028 A1 | 12/2013 | Rosner et al. |
| 2013/0343567 A1 | 12/2013 | Triplett et al. |
| 2014/0003611 A1 | 1/2014 | Mohammad et al. |
| 2014/0003625 A1 | 1/2014 | Sheen et al. |
| 2014/0003635 A1 | 1/2014 | Mohammad et al. |
| 2014/0005813 A1 | 1/2014 | Reimann |
| 2014/0006026 A1 | 1/2014 | Lamb et al. |
| 2014/0034929 A1 | 2/2014 | Hamada et al. |
| 2014/0046464 A1 | 2/2014 | Reimann |
| 2014/0064501 A1 | 3/2014 | Olsen et al. |
| 2014/0075306 A1 | 3/2014 | Rega |
| 2014/0075311 A1 | 3/2014 | Boettcher et al. |
| 2014/0094151 A1 | 4/2014 | Klappert et al. |
| 2014/0100854 A1 | 4/2014 | Chen et al. |
| 2014/0122075 A1 | 5/2014 | Bak et al. |
| 2014/0136195 A1 | 5/2014 | Abdossalami et al. |
| 2014/0145168 A1 | 5/2014 | Ohsawa et al. |
| 2014/0146983 A1 | 5/2014 | Kim et al. |
| 2014/0163978 A1 | 6/2014 | Basye et al. |
| 2014/0164400 A1 | 6/2014 | Kruglick |
| 2014/0167931 A1 | 6/2014 | Lee et al. |
| 2014/0168344 A1 | 6/2014 | Shoemake et al. |
| 2014/0172953 A1 | 6/2014 | Blanksteen |
| 2014/0195252 A1 | 7/2014 | Gruber et al. |
| 2014/0219472 A1 | 8/2014 | Huang et al. |
| 2014/0222436 A1 | 8/2014 | Binder et al. |
| 2014/0244013 A1 | 8/2014 | Reilly |
| 2014/0244712 A1 | 8/2014 | Walters et al. |
| 2014/0249817 A1 | 9/2014 | Hart et al. |
| 2014/0252386 A1 | 9/2014 | Ito et al. |
| 2014/0254805 A1 | 9/2014 | Su et al. |
| 2014/0258292 A1 | 9/2014 | Thramann et al. |
| 2014/0259075 A1 | 9/2014 | Chang et al. |
| 2014/0270282 A1 | 9/2014 | Tammi et al. |
| 2014/0274185 A1 | 9/2014 | Luna |
| 2014/0274203 A1 | 9/2014 | Ganong, III et al. |
| 2014/0274218 A1 | 9/2014 | Kadiwala et al. |
| 2014/0277650 A1 | 9/2014 | Zurek et al. |
| 2014/0291642 A1 | 10/2014 | Watabe et al. |
| 2014/0310002 A1 | 10/2014 | Nitz et al. |
| 2014/0310614 A1 | 10/2014 | Jones |
| 2014/0340888 A1 | 11/2014 | Ishisone et al. |
| 2014/0357248 A1 | 12/2014 | Tonshal et al. |
| 2014/0363022 A1 | 12/2014 | Dizon et al. |
| 2014/0363024 A1 | 12/2014 | Apodaca |
| 2014/0365227 A1 | 12/2014 | Cash et al. |
| 2014/0369491 A1 | 12/2014 | Kloberdans et al. |
| 2014/0372109 A1 | 12/2014 | Iyer et al. |
| 2015/0006176 A1 | 1/2015 | Pogue et al. |
| 2015/0006184 A1 | 1/2015 | Marti et al. |
| 2015/0010169 A1 | 1/2015 | Popova et al. |
| 2015/0014680 A1 | 1/2015 | Yamazaki et al. |
| 2015/0016642 A1 | 1/2015 | Walsh et al. |
| 2015/0019201 A1 | 1/2015 | Schoenbach |
| 2015/0019219 A1 | 1/2015 | Tzirkel-Hancock et al. |
| 2015/0036831 A1 | 2/2015 | Klippel |
| 2015/0063580 A1 | 3/2015 | Huang et al. |
| 2015/0086034 A1 | 3/2015 | Lombardi et al. |
| 2015/0091709 A1 | 4/2015 | Reichert et al. |
| 2015/0092947 A1 | 4/2015 | Gossain et al. |
| 2015/0104037 A1 | 4/2015 | Lee et al. |
| 2015/0106085 A1 | 4/2015 | Lindahl |
| 2015/0110294 A1 | 4/2015 | Chen et al. |
| 2015/0112672 A1 | 4/2015 | Giacobello et al. |
| 2015/0128065 A1 | 5/2015 | Torii et al. |
| 2015/0134456 A1 | 5/2015 | Baldwin |
| 2015/0154976 A1 | 6/2015 | Mutagi |
| 2015/0161990 A1 | 6/2015 | Sharifi |
| 2015/0169279 A1 | 6/2015 | Duga |
| 2015/0170645 A1 | 6/2015 | Di et al. |
| 2015/0172843 A1 | 6/2015 | Quan |
| 2015/0179181 A1 | 6/2015 | Morris et al. |
| 2015/0180432 A1 | 6/2015 | Gao et al. |
| 2015/0181318 A1 | 6/2015 | Gautama et al. |
| 2015/0189438 A1 | 7/2015 | Hampiholi et al. |
| 2015/0200454 A1 | 7/2015 | Heusdens et al. |
| 2015/0221678 A1 | 8/2015 | Yamazaki et al. |
| 2015/0222563 A1 | 8/2015 | Burns et al. |
| 2015/0222987 A1 | 8/2015 | Angel, Jr. et al. |
| 2015/0228274 A1 | 8/2015 | Leppänen; et al. |
| 2015/0228803 A1 | 8/2015 | Koezuka et al. |
| 2015/0237406 A1 | 8/2015 | Ochoa et al. |
| 2015/0245152 A1 | 8/2015 | Ding et al. |
| 2015/0249889 A1 | 9/2015 | Iyer et al. |
| 2015/0253292 A1 | 9/2015 | Larkin et al. |
| 2015/0253960 A1 | 9/2015 | Lin et al. |
| 2015/0263174 A1 | 9/2015 | Yamazaki et al. |
| 2015/0271593 A1 | 9/2015 | Sun et al. |
| 2015/0277846 A1 | 10/2015 | Yen et al. |
| 2015/0280676 A1 | 10/2015 | Holman et al. |
| 2015/0296299 A1 | 10/2015 | Klippel et al. |
| 2015/0302856 A1 | 10/2015 | Kim et al. |
| 2015/0319529 A1 | 11/2015 | Klippel |
| 2015/0325267 A1 | 11/2015 | Lee et al. |
| 2015/0334471 A1 | 11/2015 | Innes et al. |
| 2015/0338917 A1 | 11/2015 | Steiner et al. |
| 2015/0341406 A1 | 11/2015 | Rockefeller et al. |
| 2015/0346845 A1 | 12/2015 | Di et al. |
| 2015/0348548 A1 | 12/2015 | Piernot et al. |
| 2015/0348551 A1 | 12/2015 | Gruber et al. |
| 2015/0355878 A1 | 12/2015 | Corbin |
| 2015/0363061 A1 | 12/2015 | De, III et al. |
| 2015/0363401 A1 | 12/2015 | Chen et al. |
| 2015/0371657 A1 | 12/2015 | Gao et al. |
| 2015/0371659 A1 | 12/2015 | Gao |
| 2015/0371664 A1 | 12/2015 | Bar-Or et al. |
| 2015/0380010 A1 | 12/2015 | Srinivasan et al. |
| 2015/0382047 A1 | 12/2015 | Van Os et al. |
| 2016/0007116 A1 | 1/2016 | Holman |
| 2016/0021458 A1 | 1/2016 | Johnson et al. |
| 2016/0026428 A1 | 1/2016 | Morganstern et al. |
| 2016/0029142 A1 | 1/2016 | Isaac et al. |
| 2016/0035321 A1 | 2/2016 | Cho et al. |
| 2016/0036962 A1 | 2/2016 | Rand et al. |
| 2016/0042748 A1 | 2/2016 | Jain et al. |
| 2016/0044151 A1 | 2/2016 | Shoemaker et al. |
| 2016/0050488 A1 | 2/2016 | Matheja et al. |
| 2016/0057522 A1 | 2/2016 | Choisel et al. |
| 2016/0077710 A1 | 3/2016 | Lewis et al. |

(56) References Cited

U.S. PATENT DOCUMENTS

| | | |
|---|---|---|
| 2016/0088036 A1 | 3/2016 | Corbin et al. |
| 2016/0088392 A1 | 3/2016 | Huttunen |
| 2016/0093304 A1 | 3/2016 | Kim et al. |
| 2016/0094718 A1 | 3/2016 | Mani et al. |
| 2016/0094917 A1 | 3/2016 | Wilk et al. |
| 2016/0098393 A1 | 4/2016 | Hebert |
| 2016/0098992 A1 | 4/2016 | Renard et al. |
| 2016/0103653 A1 | 4/2016 | Jang |
| 2016/0104480 A1 | 4/2016 | Sharifi |
| 2016/0111110 A1 | 4/2016 | Gautama et al. |
| 2016/0125876 A1 | 5/2016 | Schroeter et al. |
| 2016/0127780 A1 | 5/2016 | Roberts et al. |
| 2016/0133259 A1 | 5/2016 | Rubin et al. |
| 2016/0134982 A1 | 5/2016 | Iyer |
| 2016/0154089 A1 | 6/2016 | Altman |
| 2016/0155442 A1 | 6/2016 | Kannan et al. |
| 2016/0155443 A1 | 6/2016 | Khan et al. |
| 2016/0157035 A1 | 6/2016 | Russell et al. |
| 2016/0162469 A1 | 6/2016 | Santos |
| 2016/0173578 A1 | 6/2016 | Sharma et al. |
| 2016/0173983 A1 | 6/2016 | Berthelsen et al. |
| 2016/0180853 A1 | 6/2016 | Vanlund et al. |
| 2016/0189716 A1 | 6/2016 | Lindahl et al. |
| 2016/0196499 A1 | 7/2016 | Khan et al. |
| 2016/0203331 A1 | 7/2016 | Khan et al. |
| 2016/0212538 A1 | 7/2016 | Fullam et al. |
| 2016/0216938 A1 | 7/2016 | Millington |
| 2016/0225385 A1 | 8/2016 | Hammarqvist |
| 2016/0232451 A1 | 8/2016 | Scherzer |
| 2016/0234204 A1 | 8/2016 | Rishi et al. |
| 2016/0239255 A1 | 8/2016 | Chavez et al. |
| 2016/0241976 A1 | 8/2016 | Pearson |
| 2016/0253050 A1 | 9/2016 | Mishra et al. |
| 2016/0260431 A1 | 9/2016 | Newendorp et al. |
| 2016/0302018 A1 | 10/2016 | Russell et al. |
| 2016/0314782 A1 | 10/2016 | Klimanis |
| 2016/0316293 A1 | 10/2016 | Klimanis |
| 2016/0336519 A1 | 11/2016 | Seo et al. |
| 2016/0343866 A1 | 11/2016 | Koezuka et al. |
| 2016/0343949 A1 | 11/2016 | Seo et al. |
| 2016/0343954 A1 | 11/2016 | Seo et al. |
| 2016/0345114 A1 | 11/2016 | Hanna et al. |
| 2016/0352915 A1 | 12/2016 | Gautama |
| 2016/0353218 A1 | 12/2016 | Starobin et al. |
| 2016/0357503 A1 | 12/2016 | Triplett et al. |
| 2016/0366515 A1 | 12/2016 | Mendes et al. |
| 2016/0372688 A1 | 12/2016 | Seo et al. |
| 2016/0373269 A1 | 12/2016 | Okubo et al. |
| 2016/0373909 A1 | 12/2016 | Rasmussen et al. |
| 2016/0379634 A1 | 12/2016 | Yamamoto et al. |
| 2017/0003931 A1 | 1/2017 | Dvortsov et al. |
| 2017/0012207 A1 | 1/2017 | Seo et al. |
| 2017/0012232 A1 | 1/2017 | Kataishi et al. |
| 2017/0019732 A1 | 1/2017 | Mendes et al. |
| 2017/0025615 A1 | 1/2017 | Seo et al. |
| 2017/0025630 A1 | 1/2017 | Seo et al. |
| 2017/0026769 A1 | 1/2017 | Patel |
| 2017/0039025 A1 | 2/2017 | Kielak |
| 2017/0040018 A1 | 2/2017 | Tormey |
| 2017/0041724 A1 | 2/2017 | Master et al. |
| 2017/0060526 A1 | 3/2017 | Barton et al. |
| 2017/0062734 A1 | 3/2017 | Suzuki et al. |
| 2017/0070478 A1 | 3/2017 | Park et al. |
| 2017/0076720 A1 | 3/2017 | Gopalan et al. |
| 2017/0078824 A1 | 3/2017 | Heo |
| 2017/0083285 A1 | 3/2017 | Meyers et al. |
| 2017/0084277 A1 | 3/2017 | Sharifi |
| 2017/0084292 A1 | 3/2017 | Yoo |
| 2017/0084295 A1 | 3/2017 | Tsiartas et al. |
| 2017/0090864 A1 | 3/2017 | Jorgovanovic |
| 2017/0092278 A1 | 3/2017 | Evermann et al. |
| 2017/0092297 A1 | 3/2017 | Sainath et al. |
| 2017/0092299 A1 | 3/2017 | Matsuo |
| 2017/0092889 A1 | 3/2017 | Seo et al. |
| 2017/0092890 A1 | 3/2017 | Seo et al. |
| 2017/0094215 A1 | 3/2017 | Western |
| 2017/0103754 A1 | 4/2017 | Higbie et al. |
| 2017/0103755 A1 | 4/2017 | Jeon et al. |
| 2017/0110124 A1 | 4/2017 | Boesen et al. |
| 2017/0110144 A1 | 4/2017 | Sharifi et al. |
| 2017/0117497 A1 | 4/2017 | Seo et al. |
| 2017/0123251 A1 | 5/2017 | Nakada et al. |
| 2017/0125037 A1 | 5/2017 | Shin |
| 2017/0125456 A1 | 5/2017 | Kasahara |
| 2017/0134872 A1 | 5/2017 | Silva et al. |
| 2017/0139720 A1 | 5/2017 | Stein |
| 2017/0140748 A1 | 5/2017 | Roberts et al. |
| 2017/0140759 A1 | 5/2017 | Kumar et al. |
| 2017/0177585 A1 | 6/2017 | Rodger et al. |
| 2017/0178662 A1 | 6/2017 | Ayrapetian et al. |
| 2017/0180561 A1 | 6/2017 | Kadiwala et al. |
| 2017/0188150 A1 | 6/2017 | Brunet et al. |
| 2017/0193999 A1 | 7/2017 | Aleksic et al. |
| 2017/0206896 A1 | 7/2017 | Ko et al. |
| 2017/0206900 A1 | 7/2017 | Lee et al. |
| 2017/0214996 A1 | 7/2017 | Yeo |
| 2017/0236512 A1 | 8/2017 | Williams et al. |
| 2017/0236515 A1 | 8/2017 | Pinsky et al. |
| 2017/0242649 A1 | 8/2017 | Jarvis et al. |
| 2017/0242651 A1 | 8/2017 | Lang et al. |
| 2017/0242653 A1 | 8/2017 | Lang et al. |
| 2017/0242657 A1 | 8/2017 | Jarvis et al. |
| 2017/0243576 A1 | 8/2017 | Millington et al. |
| 2017/0243587 A1 | 8/2017 | Plagge et al. |
| 2017/0245076 A1 | 8/2017 | Kusano et al. |
| 2017/0257686 A1 | 9/2017 | Gautama et al. |
| 2017/0270919 A1 | 9/2017 | Parthasarathi et al. |
| 2017/0287485 A1 | 10/2017 | Civelli et al. |
| 2017/0332168 A1 | 11/2017 | Moghimi et al. |
| 2017/0352357 A1 | 12/2017 | Fink |
| 2017/0353789 A1 | 12/2017 | Kim et al. |
| 2017/0357475 A1 | 12/2017 | Lee et al. |
| 2017/0357478 A1 | 12/2017 | Piersol et al. |
| 2017/0366393 A1 | 12/2017 | Shaker et al. |
| 2017/0374454 A1 | 12/2017 | Bernardini et al. |
| 2018/0025733 A1 | 1/2018 | Qian et al. |
| 2018/0033428 A1 | 2/2018 | Kim et al. |
| 2018/0040324 A1 | 2/2018 | Wilberding |
| 2018/0047394 A1 | 2/2018 | Tian et al. |
| 2018/0053504 A1 | 2/2018 | Wang et al. |
| 2018/0054506 A1 | 2/2018 | Hart et al. |
| 2018/0062871 A1 | 3/2018 | Jones et al. |
| 2018/0084367 A1 | 3/2018 | Greff et al. |
| 2018/0091898 A1 | 3/2018 | Yoon et al. |
| 2018/0091913 A1 | 3/2018 | Hartung et al. |
| 2018/0096683 A1 | 4/2018 | James et al. |
| 2018/0096696 A1 | 4/2018 | Mixter |
| 2018/0122378 A1 | 5/2018 | Mixter et al. |
| 2018/0130469 A1 | 5/2018 | Gruenstein et al. |
| 2018/0132217 A1 | 5/2018 | Stirling-Gallacher |
| 2018/0132298 A1 | 5/2018 | Birnam et al. |
| 2018/0137861 A1 | 5/2018 | Ogawa et al. |
| 2018/0165055 A1 | 6/2018 | Yu et al. |
| 2018/0167981 A1 | 6/2018 | Jonna et al. |
| 2018/0190285 A1 | 7/2018 | Heckmann et al. |
| 2018/0199146 A1 | 7/2018 | Sheen |
| 2018/0210698 A1 | 7/2018 | Park et al. |
| 2018/0218747 A1 | 8/2018 | Moghimi et al. |
| 2018/0219976 A1* | 8/2018 | Decenzo .................. G07C 9/00 |
| 2018/0225933 A1 | 8/2018 | Park et al. |
| 2018/0228006 A1* | 8/2018 | Baker .................. H05B 47/105 |
| 2018/0233136 A1 | 8/2018 | Torok et al. |
| 2018/0233137 A1 | 8/2018 | Torok et al. |
| 2018/0233139 A1 | 8/2018 | Finkelstein et al. |
| 2018/0262793 A1 | 9/2018 | Lau et al. |
| 2018/0277107 A1 | 9/2018 | Kim |
| 2018/0277113 A1 | 9/2018 | Hartung et al. |
| 2018/0277133 A1 | 9/2018 | Deetz et al. |
| 2018/0293484 A1 | 10/2018 | Wang et al. |
| 2018/0308470 A1 | 10/2018 | Park et al. |
| 2018/0314552 A1 | 11/2018 | Kim et al. |
| 2018/0324756 A1 | 11/2018 | Ryu et al. |
| 2018/0335903 A1 | 11/2018 | Coffman et al. |
| 2018/0336274 A1 | 11/2018 | Choudhury et al. |

(56) References Cited

U.S. PATENT DOCUMENTS

| | | | |
|---|---|---|---|
| 2018/0358009 A1 | 12/2018 | Daley et al. | |
| 2018/0365567 A1 | 12/2018 | Kolavennu et al. | |
| 2018/0367944 A1 | 12/2018 | Heo et al. | |
| 2019/0013019 A1 | 1/2019 | Lawrence | |
| 2019/0033446 A1 | 1/2019 | Bultan et al. | |
| 2019/0043492 A1 | 2/2019 | Lang | |
| 2019/0074025 A1 | 3/2019 | Lashkari et al. | |
| 2019/0079724 A1 | 3/2019 | Feuz et al. | |
| 2019/0081507 A1 | 3/2019 | Ide | |
| 2019/0088261 A1 | 3/2019 | Lang et al. | |
| 2019/0090056 A1 | 3/2019 | Rexach et al. | |
| 2019/0098400 A1 | 3/2019 | Buoni et al. | |
| 2019/0104119 A1 | 4/2019 | Giorgi et al. | |
| 2019/0104373 A1 | 4/2019 | Wodrich et al. | |
| 2019/0108839 A1 | 4/2019 | Reilly et al. | |
| 2019/0130906 A1 | 5/2019 | Kobayashi et al. | |
| 2019/0163153 A1 | 5/2019 | Price et al. | |
| 2019/0172452 A1 | 6/2019 | Smith et al. | |
| 2019/0173687 A1 | 6/2019 | Mackay et al. | |
| 2019/0179607 A1 | 6/2019 | Thangarathnam et al. | |
| 2019/0220246 A1 | 7/2019 | Orr et al. | |
| 2019/0237067 A1 | 8/2019 | Friedman et al. | |
| 2019/0295563 A1 | 9/2019 | Kamdar et al. | |
| 2019/0297388 A1 | 9/2019 | Panchaksharaiah et al. | |
| 2019/0304443 A1 | 10/2019 | Bhagwan | |
| 2019/0311710 A1 | 10/2019 | Eraslan et al. | |
| 2020/0034492 A1 | 1/2020 | Verbeke et al. | |

FOREIGN PATENT DOCUMENTS

| | | |
|---|---|---|
| CN | 101310558 A | 11/2008 |
| CN | 101661753 A | 3/2010 |
| CN | 102256098 A | 11/2011 |
| CN | 103181192 A | 6/2013 |
| CN | 103546616 A | 1/2014 |
| CN | 103811007 A | 5/2014 |
| CN | 104010251 A | 8/2014 |
| CN | 104035743 A | 9/2014 |
| CN | 104053088 A | 9/2014 |
| CN | 104092936 A | 10/2014 |
| CN | 104538030 A | 4/2015 |
| CN | 104865550 A | 8/2015 |
| CN | 105187907 A | 12/2015 |
| CN | 105284076 A | 1/2016 |
| CN | 107919123 A | 4/2018 |
| EP | 1349146 A1 | 10/2003 |
| EP | 1389853 A1 | 2/2004 |
| EP | 2683147 A1 | 1/2014 |
| EP | 2351021 B1 | 9/2017 |
| EP | 3285502 A1 | 2/2018 |
| JP | 2001236093 A | 8/2001 |
| JP | 2003223188 A | 8/2003 |
| JP | 2004347943 A | 12/2004 |
| JP | 2004354721 A | 12/2004 |
| JP | 2005284492 A | 10/2005 |
| JP | 2007013400 A | 1/2007 |
| JP | 2007142595 A | 6/2007 |
| JP | 2008079256 A | 4/2008 |
| JP | 2008158868 A | 7/2008 |
| JP | 2010141748 A | 6/2010 |
| JP | 2013037148 A | 2/2013 |
| JP | 2014071138 A | 4/2014 |
| JP | 2014137590 A | 7/2014 |
| JP | 2015161551 A | 9/2015 |
| KR | 20100111071 A | 10/2010 |
| KR | 20130050987 A | 5/2013 |
| KR | 20140035310 A | 3/2014 |
| WO | 200153994 | 7/2001 |
| WO | 2003093950 A2 | 11/2003 |
| WO | 2014159581 A1 | 10/2014 |
| WO | 2015037396 A1 | 3/2015 |
| WO | 2015178950 A1 | 11/2015 |
| WO | 2016014142 A1 | 1/2016 |
| WO | 2016022926 A1 | 2/2016 |
| WO | 2016033364 A1 | 3/2016 |
| WO | 2016057268 A1 | 4/2016 |
| WO | 2016085775 A2 | 6/2016 |
| WO | 2016171956 A1 | 10/2016 |
| WO | 2017039632 A1 | 3/2017 |
| WO | 2017138934 A1 | 8/2017 |
| WO | 2018027142 A1 | 2/2018 |
| WO | 2018067404 A1 | 4/2018 |

OTHER PUBLICATIONS

Notice of Allowance dated Jul. 5, 2018, issued in connection with U.S. Appl. No. 51/237,133, filed Aug. 15, 2016, 5 pages.
Notice of Allowance dated Jul. 9, 2018, issued in connection with U.S. Appl. No. 15/438,741, filed Feb. 21, 2017, 5 pages.
Notice of Allowance dated Apr. 1, 2019, issued in connection with U.S. Appl. No. 15/935,966, filed Mar. 26, 2018, 5 pages.
Notice of Allowance dated Aug. 1, 2018, issued in connection with U.S. Appl. No. 15/297,627, filed Oct. 19, 2016, 9 pages.
Notice of Allowance dated Apr. 11, 2018, issued in connection with U.S. Appl. No. 15/719,454, filed Sep. 28, 2017, 15 pages.
Notice of Allowance dated Dec. 12, 2018, issued in connection with U.S. Appl. No. 15/811,468, filed Nov. 13, 2017, 9 pages.
Notice of Allowance dated Jul. 12, 2017, issued in connection with U.S. Appl. No. 15/098,805, filed Apr. 14, 2016, 8 pages.
Notice of Allowance dated Sep. 12, 2018, issued in connection with U.S. Appl. No. 15/438,744, filed Feb. 21, 2017, 15 pages.
Notice of Allowance dated Dec. 13, 2017, issued in connection with U.S. Appl. No. 15/784,952, filed Oct. 16, 2017, 9 pages.
Notice of Allowance dated Aug. 14, 2017, issued in connection with U.S. Appl. No. 15/098,867, filed Apr. 14, 2016, 10 pages.
Notice of Allowance dated Feb. 14, 2017, issued in connection with U.S. Appl. No. 15/229,855, filed Aug. 5, 2016, 11 pages.
Notice of Allowance dated Jun. 14, 2017, issued in connection with U.S. Appl. No. 15/282,554, filed Sep. 30, 2016, 11 pages.
Notice of Allowance dated Nov. 14, 2018, issued in connection with U.S. Appl. No. 15/297,627, filed Oct. 19, 2016, 5 pages.
Notice of Allowance dated Dec. 15, 2017, issued in connection with U.S. Appl. No. 15/223,218, filed Jul. 29, 2016, 7 pages.
Notice of Allowance dated Mar. 15, 2019, issued in connection with U.S. Appl. No. 15/804,776, filed on Nov. 6, 2017, 9 pages.
Notice of Allowance dated Aug. 16, 2017, issued in connection with U.S. Appl. No. 15/098,892, filed Apr. 14, 2016, 9 pages.
Notice of Allowance dated Aug. 17, 2017, issued in connection with U.S. Appl. No. 15/131,244, filed Apr. 18, 2016, 9 pages.
Notice of Allowance dated Sep. 17. 2018, issued in connection with U.S. Appl. No. 15/211,689. filed Jul 15, 2016, 6 pages.
Notice of Allowance dated Apr. 18, 2019, issued in connection with U.S. Appl. No. 16/173,797, filed Oct. 29, 2018, 9 pages.
Notice of Allowance dated Dec. 19, 2018, issued in connection with U.S. Appl. No. 15/818,051, filed Nov. 20, 2017, 9 pages.
Notice of Allowance dated Jul. 19, 2018, issued in connection with U.S. Appl. No. 15/681,937, filed Aug. 21, 2017, 7 pages.
Notice of Allowance dated Mar. 20, 2018, issued in connection with U.S. Appl. No. 15/784,952, filed Oct. 16, 2017, pages.
Notice of Allowance dated Sep. 20, 2018, issued in connection with U.S. Appl. No. 15/946,599, filed Apr. 5, 2018, 7 pages.
Notice of Allowance dated Aug. 22, 2017, issued in connection with U.S. Appl. No. 15/273,679, filed Sep. 22, 2016, 5 pages.
Notice of Allowance dated Jan. 22, 2018, issued in connection withU.S. Appl. No. 15/178,180, filed Jun. 9, 2016, 9 pages.
Notice of Allowance dated Mar. 27, 2019, issued in connection with U.S. Appl. No. 16/214,666, filed Dec. 10, 2018, 6 pages.
Notice of Allowance dated Dec. 29, 2017, issued in connection with U.S. Appl. No. 15/131,776, filed Apr. 18, 2016, 13 pages.
Notice of Allowance dated Apr. 3, 2019, issued in connection with U.S. Appl. No. 16/160,107, filed Oct. 15, 2018, 7 pages.
Notice of Allowance dated Jul. 30, 2018, issued in connection with U.S. Appl. No. 15/098,718, filed Apr. 14, 2016, 5 pages.
Notice of Allowance dated Nov. 30, 2018, issued in connection with U.S. Appl. No. 15/438,725, filed Feb. 21, 2017, 5 pages.
Notice of Allowance dated Oct. 5, 2018, issued in connection with U.S. Appl. No. 15/211,748, filed Jul. 15, 2018, 10 pages.

(56) References Cited

OTHER PUBLICATIONS

Notice of Allowance dated Aug. 9, 2016, issued in connection with U.S. Appl. No. 15/229,868, filed Aug. 5, 2016, 11 pages.
Notice of Allowance dated Mar. 9, 2018, issued in connection with U.S. Appl. No. 15/584,782, filed May 2, 2017, 8 pages.
Palm, Inc., "Handbook for the Palm VII Handheld," May 2000, 311 pages.
Presentations at WinHEC 2000, May 2000, 138 pages.
Restriction Requirement dated Aug. 9, 2018, issued in connection with U.S. Appl. No. 15/717,621, filed Sep. 27, 2017, 8 pages.
Souden et al. "An Integrated Solution for Online Multichannel Noise Tracking and Reduction." IEEE Transactions on Audio, Speech, and Language Processing, vol. 19. No. 7, Sep. 7, 2011, 11 pages.
Souden et al. "Gaussian Model-Based Multichannel Speech Presence Probability" IEEE Transactions on Audio, Speech, and Language Processing, vol. 18, No. 5, Jul. 5, 2010, 6pages.
Souden et al. "On Optimal Frequency-Domain Multichannel Linear Filtering for Noise Reduction." IEEE Transactions on Audio, Speech, and Language Processing, vol. 18, No. 2, Feb. 2010, 17pages.
Steven J. Nowlan and Geoffrey E. Hinton "Simplifying Neural Networks by Soft Weight-Sharing" Neural Computation 4, 1992, 21 pages.
Tsiami et al. "Experiments in acoustic source localization using sparse arrays in adverse indoors environments", 2014 22nd European Signal Processing Conference, Sep. 1, 2014, 5 pages.
Tweet: "How to start using Google app voice commands to make your life easier Share This Story shop @Bullet", Jan. 21, 2016, https://bgr.com/2016/01/21/best-ok-google-voice-commands/, 3 page.
Ullrich et al. "Soft Weight-Sharing for Neural Network Compression." ICLR 2017, 16 pages.
U.S. Appl. No. 60/490,768, filed Jul. 28, 2003, entitled "Method for synchronizing audio playback between multiple networked devices," 13 pages.
U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Vacher at al. "Recognition of voice commands by multisource ASR and noise cancellation in a smart home environment" Signal Processing Conference 2012 Proceedings of the 20th European, IEEE, Aug. 27, 2012, 5 pages.
Vacher et al. "Speech Recognition in a Smart Home: Some Experiments for Telemonitoring," 2009 Proceedings of the 5th Conference on Speech Technology and Human-Computer Dialogoue, Constant, 2009, 10 pages.
Wung et al. "Robust Acoustic Echo Cancellation in the Short-Time Fourier Transform Domain Using Adaptive Crossband Filters" IEEE International Conference on Acoustic, Speech and Signal Processing ICASSP, 2014, p. 1300-1304.
Xiao et al. "A Learning-Based Approach to Direction of Arrival Estimation in Noisy and Reverberant Environments," 2015 IEEE International Conference on Acoustics, Speech and Signal Processing, Apr. 19, 2015, 5 pages.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.
Advisory Action dated Jun. 28, 2018, issued in connection with U.S. Appl. No. 15/438,744, filed Feb. 21, 2017, 3 pages.
Advisory Action dated Dec. 31, 2018, issued in connection with U.S. Appl. No. 15/804,776, filed Nov. 6, 2017, 4 pages.
AudioTron Quick Start Guide, Version 1.0, Mar. 2001, 24 pages.
AudioTron Reference Manual, Version 3.0, May 2002, 70 pages.
AudioTron Setup Guide, Version 3.0, May 2002, 38 pages.
Australian Patent Office, Examination Report dated Oct. 30, 2018, issued in connection with Australian Application No. 2017222436, 3 pages.

"Automatic Parameter Tying in Neural Networks" ICLR 2018, 14 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Canadian Patent Office, Canadian Office Action dated Nov. 14, 2018, issued in connection with Canadian Application No. 3015491, 3 pages.
Chinese Patent Office, First Office Action and Translation dated Mar. 20, 2019, issued in connection with Chinese Application No. 201780025028.2, 18 pages.
Chinese Patent Office, First Office Action and Translation dated Mar. 27, 2019, issued in connection with Chinese Application No. 201780025029.7, 9 pages.
Jo et al., "Synchronized One-to-many Media Streaming with Adaptive Playout Control," Proceedings of SPIE, 2002, pp. 71-82, vol. 4861.
International Searching Authority, International Search Report and Written Opinion dated May 30, 2017, issued in connection with International Application No. PCT/US2017/018728, Filed on Feb. 21, 2017, 11 pages.
Corrected Notice of Allowability dated Mar. 8, 2017, issued in connection with U.S. Appl. No. 15/229,855, filed Aug. 5, 2016, 6 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
European Patent Office, European Extended Search Report dated Jan. 3, 2019, issued in connection with European Application No. 177570702, 8 pages.
European Patent Office, European Extended Search Report dated Jan. 3, 2019, issued in connection with European Application No. 17757075.1, 9 pages.
European Patent Office, European Extended Search Report dated Oct. 30, 2017, issued in connection with EP Application No. 17174435.2, 11 pages.
European Patent Office, European Office Action dated Jan. 22, 2019, issued in connection with European Application No. 171744352, 9 pages.
Final Office Action dated Oct. 6, 2017, issued in connection with U.S. Appl. No. 15/098,760, filed Apr. 14, 2016, 25 pages.
Final Office Action dated Apr. 11, 2019, issued in connection with U.S. Appl. No. 15/131,254, filed Apr. 18, 2016, 17 pages.
Final Office Action dated Aug. 11, 2017, issued in connection with U.S. Appl. No. 15/131,776, filed Apr. 18, 2016, 7 pages.
Final Office Action dated Apr. 13, 2018, issued in connection with U.S. Appl. No. 15/131,254, filed Apr. 18, 2016, 18 pages.
Final Office Action dated Apr. 13, 2018, issued in connection with U.S. Appl. No. 15/438,744, filed Feb. 21, 2017, 20 pages.
Final Office Action dated Jun. 15, 2017, issued in connection with U.S. Appl. No. 15/098,718, filed Apr. 14, 2016, 15 pages.
Final Office Action dated Oct. 15, 2018, issued in connection withU.S. Appl. No. 15/804,776, filed Nov. 6, 2017, 18 pages.
Final Office Action dated Oct. 16, 2018, issued in connection with U.S. Appl. No. 15/438,725, filed Feb. 21, 2017, 10 pages.
Final Office Action dated Feb. 21, 2018, issued in connection with U.S. Appl. No. 15/297,627, filed on Oct. 19, 2016, 12 pages.
Final Office Action dated Feb. 5, 2019, issued in connection with U.S. Appl. No. 15/438749, filed Feb. 21, 2017, 17 pages.
Fiorenza Arisio et al. "Deliverable 1.1 User Study, analysis of requirements and definition of the application task," May 31, 2012, http://dirha.fbk.eu/sites/dirhalbk.eu/files/docs/DIRHA_D1.1., 31 pages.
Freiberger, Karl, "Development and Evaluation of Source Localization Algorithms for Coincident Microphone Arrays," Diploma Thesis, Apr. 1, 2010, 106 pages.
Giacobello et al. "A Sparse Nonuniformly Partitioned Multidelay Filter for Acoustic Echo Cancellation," 2013, IEEE Workshop on Applications of Signal Processing to Audio and Acoustics, Oct. 2013, New Paltz, NY, 4 pages.

(56) References Cited

OTHER PUBLICATIONS

Giacobello et al. "Tuning Methodology for Speech Enhancement Algorithms using a Simulated Conversational Database and Perceptual Objective Measures," 2014, 4th Joint Workshop on Hands-free Speech Communication and Microphone Arrays HSCMA, 2014, 5 pages.
Han et al. "Deep Compression: Compressing Deep Neural Networks with Pruning, Trained Quantization and Huffman Coding." ICLR 2016, Feb. 15, 2016, 14 pages.
Helwani et al "Source-domain adaptive filtering for MIMO systems with application to acoustic echo cancellation", Aoustics Speech and Signal Processing, 2010 IEEE International Conference, Mar. 14, 2010, 4 pages.
Hirano et al. "A Noise-Robust Stochastic Gradient Algorithm with an Adaptive Step-Size Suitable for Mobile Hands-Free Telephones," 1995, International Conference on Acoustics, Speech, and Signal Processing, vol. 2, 4 pages.
International Bureau, International Preliminary Report on Patentability, dated Apr. 11, 2019, issued in connection with International Application No. PCT/US2017/0054063, filed on Sep. 28, 2017, 9 pages.
International Bureau, International Preliminary Report on Patentability, dated Sep. 7, 2018, issued in connection with International Application No. PCT/US2017/018728, filed on Feb. 21, 2017, 8 pages.
International Bureau, International Preliminary Report on Patentability, dated Sep. 7, 2018, issued in connection with International Application No. PCT/US2017/018739, filed on Feb. 21, 2017, 7 pages.
International Searching Authority, International Search Report and Written Opinion dated Dec. 19, 2018, in connection with International Application No. PCT/US2018/053517, 13 pages.
International Searching Authority, International Search Report and Written Opinion dated Nov. 22, 2017, issued in connection with International Application No. PCT/US2017/054063, filed on Sep. 28, 2017, 11 pages.
International Searching Authority, International Search Report and Written Opinion dated Jan. 23, 2018, issued in connection with International Application No. PCT/US2017/57220, filed on Oct. 18, 2017, 8 pages.
International Searching Authority, International Search Report and Written Opinion dated May 23, 2017, issued in connection with International Application No. PCT/US2017/018739, Filed on Feb. 21, 2017, 10 pages.
International Searching Authority, International Search Report and Written Opinion dated Oct. 23, 2017, issued in connection with International Application No. PCT/US2017/042170, filed on Jul. 14, 2017, 15 pages.
International Searching Authority, International Search Report and Written Opinion dated Oct. 24, 2017, issued in connection with International Application No. PCT/US2017/042227, filed on Jul. 14, 2017, 16 pages.
Newman, Jared. "Chromecast Audio's multi-room support has arrived," Dec. 11, 2015, https://www.pcworld.com/article/3014204/customer-electronic/chromcase-audio-s-multi-room-support-has . . . , 1 page.
Ngo et al. "Incorporating the Conditional Speech Presence Probability in Multi-Channel Wiener Filter Based Noise Reduction in Hearing Aids." EURASIP Journal on Advances in Signal Processing vol. 2009, Jun. 2, 2009, 11 pages.
Non-Final Office Action dated Jun. 1, 2017, issued in connection with U.S. Appl. No. 15/223,218, filed Jul. 29, 2016, 7 pages.
Non-Final Office Action dated Nov. 2, 2017, issued in connection with U.S. Appl. No. 15/584,782, filed May 2, 2017, 11 pages.
Non-Final Office Action dated Nov. 3, 2017, issued in connection with U.S. Appl. No. 15/438,741, filed Feb. 21, 2017, 11 pages.
Non-Final Office Action dated Feb. 7, 2017, issued in connection with U.S. Appl. No. 15/131,244, filed Apr. 18, 2016, 12 pages.
Non-Final Office Action dated Feb. 8, 2017, issued in connection with U.S. Appl. No. 15/098,893, filed Apr. 14, 2016, 17 pages.
Non-Final Office Action dated Mar. 9, 2017, issued in connection with U.S. Appl. No. 15/098,760, filed Apr. 14, 2016, 13 pages.
Non-Final Office Action dated Jan. 10, 2018, issued in connection with U.S. Appl. No. 15/098,718, filed Apr. 14, 2016, 15 pages.
Non-Final Office Action dated Jan. 10, 2018, issued in connection with U.S. Appl. No. 15/229,868, filed Aug. 5, 2016, 13 pages.
Non-Final Office Action dated Jan. 10, 2018, issued in connection with U.S. Appl. No. 15/438,725, filed Feb. 21, 2017, 15 pages.
Non-Final Office Action dated Sep. 10, 2018, issued in connection with U.S. Appl. No. 15/670,361, filed Aug. 7, 2017, 17 pages.
Non-Final Office Action dated Dec. 12, 2016, issued in connection with U.S. Appl. No. 15/098,718, filed Apr. 14, 2016, 11 pages.
Non-Final Office Action dated Feb. 12, 2019, issued in connection with U.S. Appl. No. 15/670,361, filed Aug. 7, 2017, 13 pages.
Non-Final Office Action dated Jan. 13, 2017, issued in connection with U.S. Appl. No. 15/098,805, filed Apr. 14, 2016, 11 pages.
Non-Final Office Action dated Nov. 13, 2018, issued in connection with U.S. Appl. No. 15/717,621, filed Sep. 27, 2017, 23 pages.
Non-Final Office Action dated Nov. 13, 2018, issued in connection with U.S. Appl. No. 16/160,107, filed Oct. 15, 2018, 8 pages.
Non-Final Office Action dated Sep. 14, 2017, issued in connection with U.S. Appl. No. 15/178,180, filed Jun. 9, 2016, 16 pages.
Non-Final Office Action dated Jan. 15, 2019, issued in connection with U.S. Appl. No. 15/959,907, filed Oct. 29, 2018, 6 pages.
Non-Final Office Action dated Jan. 15, 2019, issued in connection with U.S. Appl. No. 16/173,797, filed Oct. 29, 2018, 6 pages.
Non-Final Office Action dated Mar. 16, 2018, issued in connection with U.S. Appl. No. 15/681,937, filed Aug. 21, 2017, 5 pages.
Non-Final Office Qction dated Oct. 16, 2018, issued in connection with U.S. Appl. No. 15/131,254, filed Apr. 18, 2016, 16 pages.
Non-Final Office Action dated Apr. 18, 2018, issued in connection with U.S. Appl. No. 15/811,468, filed Nov. 13, 2017, 14 pages.
Non-Final Office Action dated Jan. 18, 2019, issued in connection with U.S. Appl. No. 15/721,141, filed Sep. 29, 2017, 18 pages.
Non-Final Office Action dated Apr. 19, 2017, issued in connection with U.S. Appl. No. 15/131,776, filed Apr. 18, 2016, 12 pages.
Non-Final Office Action dated Feb. 20, 2018, issued in connection with U.S. Appl. No. 15/211,748, filed Jul. 15, 2016, 31 pages.
Non-Final Office Action dated Feb. 21, 2019, issued in connection withU.S. Appl. No. 16/214,666, filed Dec. 10, 2018, 12 pages.
Non-Final Office Action dated May 22, 2018, isssued in connection with U.S. Appl. No. 15/946,599, filed Apr. 5, 2018, 19 pages.
Non-Final Office Action dated Aug. 24, 2017, issued in connection with U.S. Appl. No. 15/297,627, filed Oct. 19, 2016, 13 pages.
Non-Final Office Action dated Jul. 25, 2017, issued in connection with U.S. Appl. No. 15/273,679, filed Jul. 22, 2016, 11 pages.
Non-Final Office Action dated Dec. 26, 2018, issued in connection with U.S. Appl. No. 16/154,469, filed Oct. 8, 2018, 7 pages.
Non-Final Office Action dated Jan. 26, 2017, issued in connection with U.S. Appl. No. 15/098,867, filed Apr. 14, 2016, 16 pages.
Non-Final Office Action dated Oct. 26, 2017, issued in connection with U.S. Appl. No. 15/438,744, filed Feb. 21, 2017, 12 pages.
Non-Final Office Action dated Jun. 27, 2018, issued in connection with U.S. Appl. No. 15/438,749, filed Feb. 21, 2017, 16 pages.
Non-Final Office Action dated Mar. 29, 2019, issued in connection with U.S. Appl. No. 16/102,650, filed Aug. 13, 2018, 11 pages.
Non-Final Office Action dated Jun. 30, 2017, issued in connection with U.S. Appl. No. 15/277,810, filed Sep. 27, 2016, 13 pages.
Non-Final Office Action dated Apr. 4, 2019, issued in connection with U.S. Appl. No. 15/718,911, filed Sep. 28, 2017, 21 pages.
Non-Final Office Action dated Jan. 4, 2019, issued in connection with U.S. Appl. No. 15/948,541, filed Apr. 9, 2018, 6 pages.
Non-Final Office Action dated Feb. 6, 2018, issued in connection with U.S. Appl. No. 15/211,689, filed Jul. 15, 2016, 32 pages.
Non-Final Office Action dated Feb. 6, 2018, issued in connection with U.S. Appl. No. 15/237,133, filed Aug. 15, 2016, 6 pages.
Non-Final Office Action dated Sep. 6, 2017, issued in connection with U.S. Appl. No. 15/131,254, filed Apr. 18, 2016, 13 pages.
Non-Final Office Action dated Sep. 6, 2018, issued in connection with U.S. Appl. No. 15/098,760, filed Apr. 14, 2016, 29 pages.
Non-Final Office Action dated Apr. 9, 2018, issued in connection with U.S. Appl. No. 15/804,776, filed Nov. 6, 2017, 18 pages.

(56) References Cited

OTHER PUBLICATIONS

Non-Final Office Action dated May 9, 2018, issued in connection with U.S. Appl. No. 15/818,051, filed Nov. 20, 2017, 22 pages.
Notice of Allowance dated Dec. 4, 2017, issued in connection with U.S. Appl. No. 15/277,810, filed Sep. 27, 2016, 5 pages.
Korean Patent Office, Korean Office Action and Translation dated Mar. 30, 2020, issued in connection with Korean Application No. 10-2020-7004425, 5 pages.
Korean Patent Office, Korean Office Action and Translation dated Sep. 9, 2019, issued in connection with Korean Application No. 10-2018-7027451, 21 pages.
Korean Patent Office, Korean Office Action dated May 8, 2019, issued in connection with Korean Application No. 10-2018-7027451, 7 pages.
Korean Patent Office, Korean Office Action dated May 8, 2019, issued in connection with Korean Application No. 10-2018-7027452, 5 pages.
Non-Final Office Action dated Nov. 4, 2019, issued in connection with U.S. Appl. No. 16/022,662, filed Jun. 28, 2018, 16 pages.
Non-Final Office Action dated Sep. 5, 2019, issued in connection with U.S. Appl. No. 16/416,752, filed May 20, 2019, 14 pages.
Non-Final Office Action dated Oct. 9, 2019, issued in connection with U.S. Appl. No. 15/936,177, filed Mar. 26, 2018, 16 pages.
Non-Final Office Action dated Oct. 11, 2019, issued in connection with U.S. Appl. No. 16/177,185, filed Oct. 31, 2018, 14 pages.
Non-Final Office Action dated Nov. 13, 2019, issued in connection with U.S. Appl. No. 15/984,073, filed May 18, 2018, 18 pages.
Non-Final Office Action dated May 14, 2020, issued in connection with U.S. Appl. No. 15/948,541, filed Apr. 9, 2018, 8 pages.
Non-Final Office Action dated Apr. 15, 2020, issued in connection with U.S. Appl. No. 16/138,111, filed Sep. 21, 2018, 15 pages.
Non-Final Office Action dated Nov. 15, 2019, issued in connection with U.S. Appl. No. 16/153,530, filed Oct. 5, 2018, 17 pages.
Non-Final Office Action dated Oct. 18, 2019, issued in connection with U.S. Appl. No. 15/098,760, filed Apr. 14, 2016, 27 pages.
Non-Final Office Action dated Sep. 18, 2019, issued in connection with U.S. Appl. No. 16/179,779, filed Nov. 2, 2018, 14 pages.
Non-Final Office Action dated Dec. 19, 2019, issued in connection with U.S. Appl. No. 16/147,710, filed Sep. 29, 2018, 10 pages.
Non-Final Office Action dated Feb. 19, 2020, issued in connection with U.S. Appl. No. 16/148,879, filed Oct. 1, 2018, 15 pages.
Non-Final Office Action dated Jun. 20, 2019, issued in connection with U.S. Appl. No. 15/946,585, filed Apr. 5, 2018, 10 pages.
Non-Final Office Action dated Aug. 21, 2019, issued in connection with U.S. Appl. No. 16/192,126, filed Nov. 15, 2018, 8 pages.
Non-Final Office Action dated Jan. 21, 2020, issued in connection with U.S. Appl. No. 16/598,125, filed Oct. 10, 2019, 25 pages.
Non-Final Office Action dated Oct. 21, 2019, issued in connection with U.S. Appl. No. 15/973,413, filed May 7, 2018, 10 pages.
Non-Final Office Action dated May 23, 2019, issued in connection with U.S. Appl. No. 16/154,071, filed Oct. 8, 2018, 36 pages.
Non-Final Office Action dated Jul. 24, 2019, issued in connection with U.S. Appl. No. 16/439,009, filed Jun. 12, 2019, 26 pages.
Non-Final Office Action dated Jun. 27, 2019, issued in connection with U.S. Appl. No. 16/437,437, filed Jun. 11, 2019, 8 pages.
Non-Final Office Action dated Jun. 27, 2019, issued in connection with U.S. Appl. No. 16/437,476, filed Jun. 11, 2019, 8 pages.
Non-Final Office Actiondated Mar. 27, 2020, issued in connection with U.S. Appl. No. 16/790,621, filed Feb. 13. 2020, 8 pages.
Non-Final Office Action dated May 27, 2020, issued in connection with U.S. Appl. No. 16/715,713, filed Dec. 16, 2019, 14 pages.
Non-Final Office Action dated Oct. 28, 2019, issued in connection with U.S. Appl. No. 16/145,275, filed Feb. 28, 2018, 11 pages.
Non-Final Office Action dated Jul. 3, 2019, issued in connection with U.S. Appl. No. 15/948,541, filed Apr. 9, 2018, 7 pages.
Non-Final Office Action dated May 3, 2019, issued in connection with U.S. Appl. No. 16/178,122, filed Nov. 1, 2018, 14 pages.
Non-Final Office Action dated Oct. 3, 2018, issued in connection with U.S. Appl. No. 16/102,153, filed Aug. 13, 2018, 20 pages.
Non-Final Office Action dated Apr. 30, 2019, issued in connection with U.S. Appl. No. 15/718,521, filed Sep. 28, 2017, 39 pages.
Non-Final Office Action dated Apr. 6, 2020, issued in connection with U.S. Appl. No. 16/424,825, filed May 29, 2019, 22 pages.
Non-Final Office Action dated Mar. 6, 2020, issued in connection with U.S. Appl. No. 16/141,875, filed Sep. 25, 2018, 8 pages.
Notice of Allowance dated Dec. 2, 2019, issued in connection with U.S. Appl. No. 15/718,521, filed Sep. 28, 2017, 15 pages.
Notice of Allowance dated Oct. 11, 2019, issued in connection with U.S. Appl. No. 16/437,476, filed Jun. 11, 2019, 9 pages.
Notice of Allowance dated Sep. 11, 2019, issued in connection with U.S. Appl. No. 16/154,071, filed Oct. 8, 2018, 5 pages.
Notice of Allowance dated Jun. 12, 2019, issued in connection with U.S. Appl. No. 15/670,361, filed Aug. 1, 2017, 7 pages.
Notice of Allowance dated Jan. 13, 2020, issued in connection with U.S. Appl. No. 16/192,126, filed Nov. 15, 2018, 6 pages.
Notice of Allowance dated Jan. 15, 2020, issued in connection with U.S. Appl. No. 16/439,009, filed Jun. 12, 2019, 9 pages.
Notice of Allowance dated Oct. 15, 2019, issued in connection with U.S. Appl. No. 16/437,437, filed Jun. 11, 2019, 9 pages.
Notice of Allowance dated Jul. 17, 2019, issued in connection with UU.S. Appl. No. 15/718,911, filed Sep. 28, 2017, 5 pages.
Notice of Allowance dated Dec. 18, 2019, issued in connection with U.S. Appl. No. 16/434,426 filed Jun. 7, 2019, 13 pages.
Notice of Allowance dated Feb. 18, 2020, issued in connection with U.S. Appl. No. 16/022,662, filed Jun. 28, 2018, 8 pages.
Notice of Allowance dated Jul. 18, 2019, issued in connection with U.S. Appl. No. 15/438,749, filed Feb. 21, 2017, 9 pages.
Notice of Allowance dated Jul. 18, 2019, issued in connection with U.S. Appl. No. 15/721,141, filed Sep. 29, 2017, 8 pages.
Notice of Allowance dated Aug. 2, 2019, issued in connection with U.S. Appl. No. 16/102,650, filed Aug. 13, 2018, 5 pages.
Notice of Allowance dated Feb. 21, 2020, issued in connection with U.S. Appl. No. 16/416,752, filed May 20, 2019, 6 pages.
Notice of Allowance dated Jan. 21, 2020, issued in connection with U.S. Appl. No. 16/672,764, filed Nov. 4, 2019, 10 pages.
Notice of Allowance dated Oct. 21, 2019, issued in connection with U.S. Appl. No. 15/946,585, filed Apr. 5, 2018, 5 pages.
Notice of Allowance dated Apr. 24, 2019, issued in connection with U.S. Appl. No. 16/154,469, filed Oct. 3, 2018, 5 pages.
Notice of Allowance dated Apr. 27, 2020, issued in connection with U.S. Appl. No. 16/700,607, filed Dec. 2, 2019, 10 pages.
Notice of Allowance dated Mar. 28, 2018, issued in connection with U.S. Appl. No. 15/699,982, filed Sep. 8, 2017, 17 pages.
Notice of Allowance dated May 29, 2020, issued in connection with U.S. Appl. No. 16/148,879, filed Oct. 1, 2018, 6 pages.
Notice of Allowance dated Jul. 30, 2019, issued in connection with U.S. Appl. No. 15/131,254, filed Apr. 18, 2016, 9 pages.
Notice of Allowance dated Mar. 30, 2020, issued in connection with U.S. Appl. No. 15/973,413, filed May 7, 2018, 5 pages.
Notice of Allowance dated Oct. 30, 2019, issued in connection with U.S. Appl. No. 16/131,392, filed Sep. 14, 2018, 9 pages.
Notice of Allowance dated May 31, 2019, issued in connection with U.S. Appl. No. 15/717,621, filed Sep. 27, 2017, 9 pages.
Notice of Allowance dated Mar. 4, 2020, issued in connection with U.S. Appl. No. 16/444,975, filed Jun. 18, 2019, 10 pages.
Notice of Allowance dated Feb. 5, 2020, issued in connection with U.S. Appl. No. 16/178,122, filed Nov. 1, 2018, 9 pages.
Notice of Allowance dated Feb. 6, 2019, issued in connection with U.S. Appl. No. 16/102,153, filed Aug. 13, 2018, 9 pages.
Notice of Allowance dated Feb. 6, 2020, issued in connection with U.S. Appl. No. 16/227,308, filed Dec. 20, 2018, 7 pages.
Notice of Allowance dated Apr. 7, 2020, issued in connection with U.S. Appl. No. 15/098,760, filed Apr. 14, 2016, 7 pages.
Notice of Allowance dated Apr. 7, 2020, issued in connection with U.S. Appl. No. 16/147,710, filed Sep. 29, 2018, 15 pages.
Notice of Allowance dated Jun. 7, 2019, issued in connection with U.S. Appl. No. 16/102,153, filed Aug. 13, 2018, 9 pages.
Optimizing Siri on HomePod in Far-Field Settings. Audio Software Engineering and Siri Speech Team, Machine Learning Journal vol. 1, Issue 12. https://machinelearning.apple.com/2018/12/03/optimizing-siri-on-homepod-in-far-field-settings.html. Dec. 2018, 18 pages.

(56) References Cited

OTHER PUBLICATIONS

Preinterview First Office Action dated Aug. 5, 2019, issued in connection with U.S. Appl. No. 16/434,426, filed Jun. 7, 2019, 4 pages.
Preinterview First Office Action dated Mar. 25, 2020, issued in connection with U.S. Appl. No. 16/109,375, filed Aug. 22, 2018, 6 pages.
Preinterview First Office Action dated Sep. 30, 2019, issued in connection with U.S. Appl. No. 15/989,715, filed May 25, 2018, 4 pages.
Preinterview First Office Action dated May 7, 2020, issued in connection with U.S. Appl. No. 16/213,570, filed Dec. 7, 2018, 5 pages.
"S Voice or Google Now?"; https://web.archive.org/web/20160807040123/lowdown.carphonewarehouse.com/news/s-voice-or-google-now/ . . . , Apr. 28, 2015; 4 pages.
Yamaha DME Designer 3.0 Owner's Manual; Copyright 2008, 501 pages.
Advisory Action dated Apr. 24, 2020, issued in connection with U.S. Appl. No. 15/948,541, filed Apr. 9, 2018, 4 pages.
Anonymous,. S Voice or Google Now—The Lowdown. Apr. 28, 2015, 9 pages. [online], [retrieved on Nov. 29, 2017]. Retrieved from the Internet (URL:http://web.archive.org/web/20160807040123/http://lowdown.carphonewarehouse.com/news/s-voice-or-google-now/29958/).
Australian Patent Office, Australian Examination Report Action dated Apr. 14, 2020, issued in connection with Australian Application No. 2019202257, 3 pages.
Australian Patent Office, Australian Examination Report Action dated Oct. 3, 2019, issued in connection with Australian Application No. 2018230932, 3 pages.
Chinese Patent Office, First Office Action and Translation dated Nov. 5, 2019, issued in connection with Chinese Application No. 201780072651.3, 19 pages.
Chinese Patent Office, First Office Action dated Feb. 28, 2020, issued in connection with Chinese Application No. 201780061543.6, 29 pages.
Chinese Patent Office, Second Office Action and Translation dated May 11, 2020, issued in connection with Chinese Application No. 201780061543.6, 17 pages.
Chinese Patent Office, Second Office Action and Translation dated Jul. 18, 2019, issued in connection with Chinese Application No. 201780025029.7, 14 pages.
Chinese Patent Office, Second Office Action and Translation dated Sep. 23, 2019, issued in connection with Chinese Application No. 201780025028.2, 15 pages.
Chinese Patent Office, Second Office Action and Translation dated Mar. 31, 2020, issued in connection with Chinese Application No. 201780072651.3, 17 pages.
Chinese Patent Office, Third Office Action and Translation dated Sep. 16, 2019, issued in connection with Chinese Application No. 201780025029.7, 14 pages.
Chinese Patent Office, Translation of Office Action dated Jul. 18, 2019, issued in connection with Chinese Application No. 201780025029.7, 8 pages.
Cipriani,. The complete list of OK, Google commands—CNET. Jul. 1, 2016, 5 pages. [online], [retrieved on Jan. 15, 2020]. Retrieved from the Internet: (URL:https://web.archive.org/web/20160803230926/https://www.cnet.com/how-to/complete-list-of-ok-google--commands/).
European Patent Office, European Extended Search Report dated Feb. 3, 2020, issued in connection with European Application No. 19197116.7, 9 pages.
European Patent Office, European Office Action dated Jan. 14, 2020, issued in connection with European Application No. 17757070.2, 7 pages.
European Patent Office, European Office Action dated Aug. 30, 2019, issued in connection with European Application No. 17781608.9, 6 pages.
European Patent Office, Summons to Attend Oral Proceedings dated Dec. 20, 2019, issued in connection with European Application No. 17174435.2, 13 pages.
Fadilpasic,"Cortana can now be the default PDA on your Android", IT Pro Portal: Accessed via WayBack Machine; http://web.archive.org/web/20171129124915/https://www.itproportal.com/2015/08/11/cortana-can-now-be- . . . , Aug. 11, 2015, 6 pages.
Final Office Action dated Dec. 11, 2019, issued in connection with U.S. Appl. No. 16/227,308, filed Dec. 20, 2018, 10 pages.
Final Office Action dated Sep. 11, 2019, issued in connection with U.S. Appl. No. 16/178,122, filed Nov. 1, 2018, 13 pages.
Final Office Action dated May 13, 2020, issued in connection with U.S. Appl. No. 16/153,530, filed Oct. 5, 2018, 20 pages.
Final Office Action dated May 18, 2020, issued in connection with U.S. Appl. No. 16/177,185, filed Oct. 31, 2018, 16 pages.
Final Office Action dated May 21, 2020, issued in connection with U.S. Appl. No. 15/989,715, filed May 25, 2018, 21 pages.
Final Office Action dated Mar. 23, 2020, issued in connection with U.S. Appl. No. 16/145,275, filed Sep. 28, 2018, 11 pages.
Final Office Action dated Feb. 24, 2020, issued in connection with U.S. Appl. No. 15/936,177, filed Mar. 26, 2018, 20 pages.
Final Office Action dated Apr. 26, 2019, issued in connection with U.S. Appl. No. 15/721,141, filed Sep. 29, 2017, 20 pages.
Final Office Action dated Apr. 30, 2019, issued in connection with U.S. Appl. No. 15/098,760, filed Apr. 14, 2016, 6 pages.
Final Office Action dated Feb. 7, 2020, issued in connection with U.S. Appl. No. 15/948,541, filed Apr. 9, 2018, 8 pages.
First Action Interview Office Action dated Aug. 14, 2019, issued in connection with U.S. Appl. No. 16/227,308, filed Dec. 20, 2018, 4 pages.
First Action Interview Office Action dated Jun. 2, 2020, issued in connection with U.S. Appl. No. 16/109,375, filed Aug. 22, 2018, 10 pages.
First Action Interview Office Action dated Jan. 22, 2020, issued in connection with U.S. Appl. No. 15/989,715, filed May 25, 2018, 3 pages.
First Action Interview Office Action dated Jul. 5, 2019, issued in connection with U.S. Appl. No. 16/227,308, filed Dec. 20, 2018, 4 pages.
International Bureau, International Preliminary Report on Patentability, dated Feb. 20, 2020, issued in connection with International Application No. PCT/US2018/045397, filed on Aug. 6, 2018, 8 pages.
International Bureau, International Preliminary Report on Patentability, dated Apr. 23, 2019, issued in connection with International Application No. PCT/US2017/057220, filed Oct. 18, 2017, 7 pages.
International Bureau, International Preliminary Report on Patentability, dated Mar. 31, 2020, issued in connection with International Application No. PCT/US2018053123, filed Sep. 27, 2018, 12 pages.
International Bureau, International Preliminary Report on Patentability, dated Mar. 31, 2020, issued in connection with International Application No. PCT/US2018053472, filed Sep. 28, 2018, 8 pages.
International Bureau, International Preliminary Report on Patentability, dated Mar. 31, 2020, issued in connection with International Application No. PCT/US2018053517, filed Sep. 28, 2018, 10 pages.
International Bureau, International Search Report and Written Opinion dated Nov. 18, 2019, issued in connection with International Application No. PCT/US2019052841, filed Sep. 25, 2019, 12 pages.
International Bureau, International Search Report and Written Opinion dated Mar. 2, 2020, issued in connection with International Application No. PCT/US2019064907, filed Dec. 6, 2019, 11 pages.
International Bureau, International Search Report and Written Opinion dated Dec. 20, 2019, issued in connection with International Application No. PCT/US2019052654, filed Sep. 24, 2019, 11 pages.
International Bureau, International Search Report and Written Opinion dated Dec. 6, 2019, issued in connection with International Application No. PCT/US2019050852, filed Sep. 12, 2019, 10 pages.
International Bureau, International Search Report and Written Opinion dated Apr. 8, 2020, issued in connection with International Application No. PCT/US2019/067576, filed Dec. 19, 2019, 12 pages.

(56) References Cited

OTHER PUBLICATIONS

Japanese Patent Office, Non-Final Office Action and Translation dated Nov. 5, 2019, issued in connection with Japanese Patent Application No. 2019-517281, 6 pages.
Japanese Patent Office, Office Action and Translation dated Oct. 8, 2019, issued in connection with Japanese Patent Application No. 2019-521032, 5 pages.
Japanese Patent Office, Office Action Translation dated Nov. 5, 2019, issued in connection with Japanese Patent Application No. 2019-517281, 2 pages.
Japanese Patent Office, Office Action Translation dated Oct. 8, 2019, issued in connection with Japanese Patent Application No. 2019-521032, 8 pages.
Korean Patent Office, Korean Office Action and Translation dated Aug. 16, 2019, issued in connection with Korean Application No. 10-2018-7027452, 14 pages.
Korean Patent Office, Korean Office Action and Translation dated Apr. 2, 2020, issued in connection with Korean Application No. 10-2020-7008486, 12 pages.
Korean Patent Office, Korean Office Action and Translation dated Mar. 25, 2020, issued in connection with Korean Application No. 10-2019-7012192, 14 pages.
Jones, Stephen, "Dell Digital Audio Receiver: Digital upgrade for your analog stereo," Analog Stereo, Jun. 24, 2000 retrieved Jun. 18, 2014, 2 pages.
Jose Alvarez and Mathieu Salzmann "Compression-aware Training of Deep Networks" 31st Conference on Neural Information Processing Systems, Nov. 13, 2017, 12pages.
Louderback, Jim, "Affordable Audio Receiver Furnishes Homes With MP3," TechTV Vault. Jun. 28, 2000 retrieved Jul. 10, 2014, 2 pages.
Maja Taseska and Emanual A.P. Habets, "MMSE-Based Blind Source Extraction in Diffuse Noise Fields Using a Complex Coherence-Based a Priori Sap Estimator." International Workshop on Acoustic Signal Enhancement 2012, Sep. 4-6, Sep. 2012, 4pages.
Morales-Cordovilla et al. "Room Localization for Distant Speech Recognition," Proceedings of Interspeech 2014, Sep. 14, 2014, 4 pages.

\* cited by examiner

NETWORK MICROPHONE DEVICES WITH AUTOMATIC DO NOT DISTURB ACTUATION CAPABILITIES

CROSS-REFERENCE TO RELATED APPLICATIONS

The present application claims priority to U.S. Provisional Application 62/596,902, titled "Network Microphone Device with Automatic Do Not Disturb Actuation Capabilities," filed on Dec. 10, 2017. The entire contents of the 62/596,902 application are incorporated herein by reference.

FIELD OF THE DISCLOSURE

The disclosure is related to consumer goods and, more particularly, to methods, systems, products, features, services, and other elements directed to voice control of media playback or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from many sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever-growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

Figure 1:
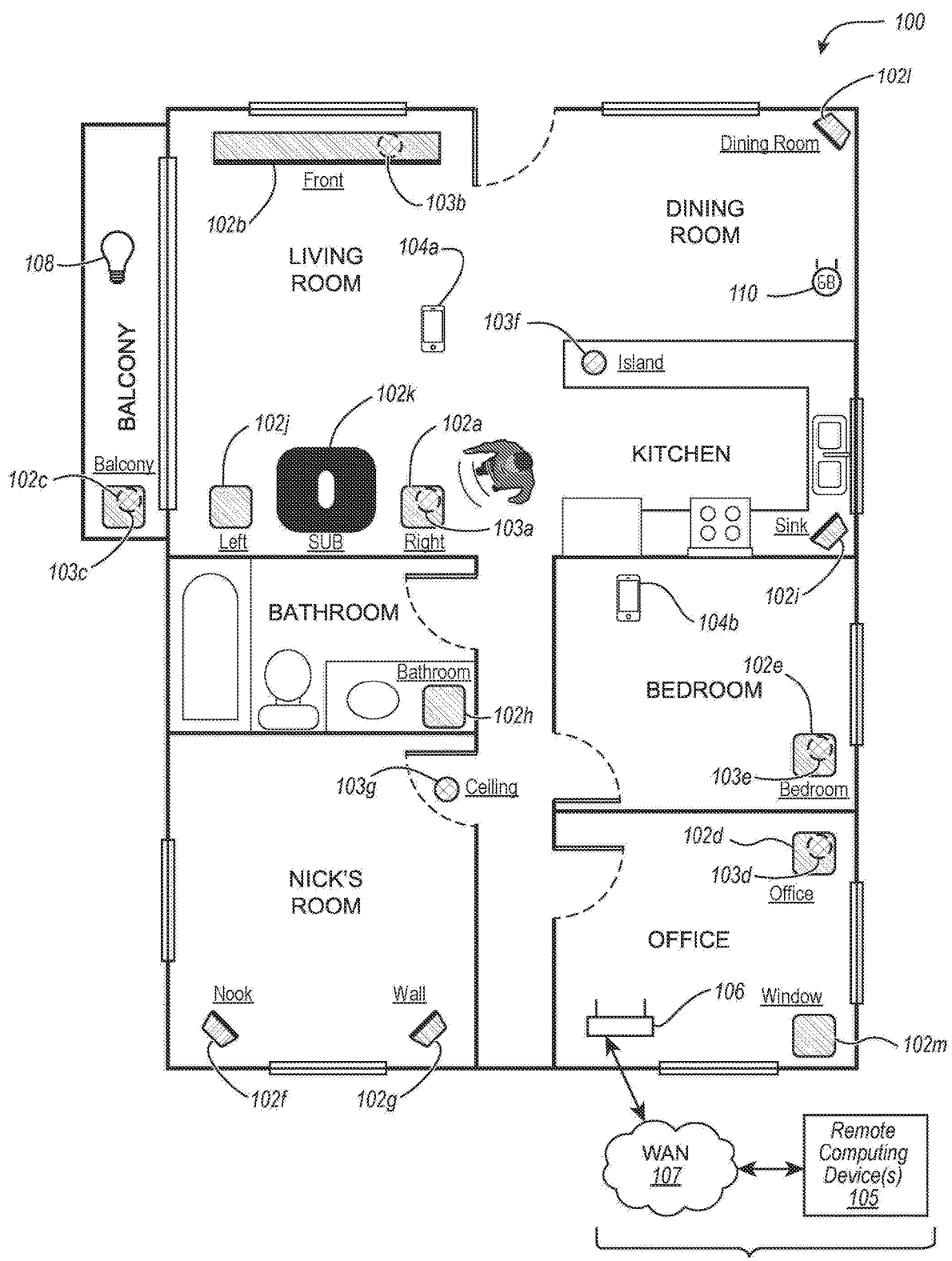
FIG. 1 shows a media playback system in which certain embodiments may be practiced.

The drawings are for purposes of illustrating example embodiments, but it is understood that the inventions are not limited to the arrangements and instrumentalities shown in the drawings. In the drawings, identical reference numbers identify at least generally similar elements. To facilitate the discussion of any particular element, the most significant digit or digits of any reference number refers to the Figure in which that element is first introduced. For example, element 107 is first introduced and discussed with reference to FIG. 1.

DETAILED DESCRIPTION

I. Overview

Voice control can be beneficial for a "smart" home having smart appliances and related devices, such as wireless illumination devices, home-automation devices (e.g., thermostats, door locks, etc.), and audio playback devices. In some implementations, networked microphone devices may be used to control smart home devices. A network microphone device (NMD) will typically include a microphone for receiving voice inputs. The network microphone device can forward voice inputs to a voice assistant service (VAS). A traditional VAS may be a remote service implemented by cloud servers to process voice inputs. A VAS may process a voice input to determine an intent of the voice input. Based on the response, the NMD may cause one or more smart devices to perform an action. For example, the NMD may instruct an illumination device to turn on/off based on the response to the instruction from the VAS.

A voice input detected by an NMD will typically include a wake word followed by an utterance containing a user request. The wake word is typically a predetermined word or phrase used to "wake up" and invoke the VAS for interpreting the intent of the voice input. For instance, in querying the AMAZON® VAS, a user might speak the wake word "Alexa." Other examples include "Ok, Google" for invoking the GOOGLE® VAS and "Hey, Siri" for invoking the APPLE® VAS, or "Hey, Sonos" for a VAS offered by SONOS®.

In operation, an NMD listens for a user request or command accompanying a wake word in the voice input. In some instances, the user request may include a command to control a third-party device, such as a thermostat (e.g., NEST® thermostat), an illumination device (e.g., a PHILIPS HUE® lighting device), or a media playback device (e.g., a Sonos® playback device). For example, a user might speak the wake word "Alexa" followed by the utterance "set the thermostat to 68 degrees" to set the temperature in a home using the Amazon® VAS. A user might speak the same wake word followed by the utterance "turn on the living room lights" to turn on illumination devices in a living room area of the home. The user may similarly speak a wake word followed by a request to play a particular song, an album, or a playlist of music on a playback device in the home.

In addition to voice control, some NMDs also provide voice communication capabilities, such as "intercom" or "drop in" communications, and in the future, some NMDs may reliably support Voice over Internet Protocol (VoIP) telephone capabilities, and IP-based video and voice calling features. In some embodiments, the voice communication capabilities can be initiated via voice commands and/or via controller devices configured to control the NMDs, including controlling the NMDs to initiate and effectuate voice and video communication features.

For example, an NMD may provide an "Intercom" feature (sometimes called a "Drop In" feature) that allows users to communicate with each other via multiple NMDs typically on the same Local Area Network (LAN). In one example, a first NMD is located in a basement room and a second NMD is located in a kitchen. With the "Intercom" feature, a user in the basement room can initiate an "Intercom" session between the first NMD in the basement room and the second NMD located upstairs in the kitchen by saying, for example, "Hey, Sonos, intercom to the kitchen." In response to the voice command, the first NMD in the basement room establishes a bi-directional intercom session with the second NMD in the upstairs kitchen via a wireless (e.g., WiFi) and/or wired (e.g., Ethernet) LAN in the home so that a user in the basement room and a user in the kitchen can talk with each other via the NMDs.

In another example, an NMD may provide a "Talk" feature that allows two users in the same or different locations to communicate with each other via multiple NMDs. In one example, a first user (e.g., Jack) with a first NMD is located at a first location (e.g., Jack's house) and a second user (e.g., Jill) with a second NMD is located at a second location (e.g., Jill's house). With the "Talk" feature, Jack can initiate a "Talk" session with Jill by saying, for example, "Hey, Sonos, talk to Jill." In response to the voice command, Jack's NMD at his house establishes a bi-directional IP communication session with Jill's NMD at her house so that Jack and Jill can talk to each other via their respective NMDs over one or more networks, including but not limited to Jack's LAN, the Internet, and Jill's LAN. In some embodiments, the IP communication includes one or both video and voice.

In another example, an NMD may provide a "Call" feature that allows a first user's NMD to call a second user's telephone via the Internet or the public telephone networks, and vice versa. In one example, a first user (e.g., Jack) with a first NMD is located at a first location (e.g., Jack's house) and a second user (e.g., Jill) with a mobile phone (or other device connected to a public telephone network) is located at a second location (e.g., Jill's office). With the "Call" feature, Jack can initiate a "Call" session with Jill by saying, for example, "Hey, Sonos, call Jill." In response to the voice command, Jack's NMD at his house establishes a bi-directional phone call with Jill's mobile phone at her office so that Jack and Jill can talk to each other as though Jack's NMD were another telephone. In some embodiments, the bi-directional phone call comprises one or more video and/or VoIP communication sessions.

Although initiating and receiving voice communications via NMDs may be convenient, there are times when a user may not wish to receive voice and/or video communications via his or her NMD from other NMDs, computing devices, and/or mobile phones. Therefore, in some embodiments disclosed herein, NMDs are configured with a "Do Not Disturb" (DND) feature that, when activated, causes the NMD in some circumstances to reject incoming requests for a communication session and perhaps also perform additional actions related to the request.

But while some of the advanced DND features implemented with NMDs may be similar in some respects to the types of basic DND features that have long been available on phone handsets used with private branch exchange (PBX) and similar telephony equipment, NMDs provide a vast array of additional features and functionality beyond simple phone handsets and/or PBXs, and thus, implementing DND features on an NMD presents new opportunities for advanced DND features and functions along with correspondingly new technical implementation challenges flowing therefrom. As will become apparent, the advanced DND features and functions for use with NMDs disclosed and described herein were neither desired nor even contemplated in the context of PBX systems in view of the different purposes, operating environments, and technical architectures of the two disparate classes of devices.

For example, with respect to advanced features, a user can speak voice commands to an NMD that causes the NMD to perform a multitude of advanced functions, including but not limited to, for example, adding items to a shopping list for purchase via the Internet, purchasing items via the Internet, ordering food from a food delivery service, retrieving movie times from local theaters, requesting a taxi or car service, retrieving local weather forecasts and updated sports scores, playing audio books or podcasts, playing audio content from any of a variety of Internet music providers, purchasing pay-per-view movies and sporting events for viewing on the user's home theater system, controlling smart home appliances, configuring and controlling networks of playback devices, and so on. Indeed, NMD and VAS technology is advancing rapidly and NMDs and VASes are expected to support many more advanced features in the future.

In operation, the user may not wish to be disturbed by voice or video calls while the user is having a dialog with the VAS via the NMD (e.g., while adding items to a shopping list, purchasing items, ordering food, retrieving movie times, requesting a taxi or car service, etc.). Similarly, a user may not wish to be disturbed by voice or video calls while certain playback devices (e.g., in a den or basement) are playing audio data received from a television, set-top box, or similar audio source that suggests the user is watching a movie or television show. Likewise, a user may not wish to be disturbed by voice or video calls while certain playback devices (e.g., in a dining room or kitchen) are playing certain audio content, such a dinner playlist, which suggests the user is having dinner. Further, a user may not wish to be disturbed by voice or video calls while the user's playback devices in certain zones (e.g., all playback devices on the main floor and the patio) are configured in a "party mode" where they all play the same audio content in synchrony, which suggests that the user might be entertaining guests at his or her home.

However, for many users, it may be complicated and cumbersome to repeatedly activate and deactivate a DND feature in a manual fashion on one or more NMDs in a home to avoid interruptions while performing or otherwise engaging in the above-described activities. Therefore, NMDs according to some embodiments disclosed herein are configured to (i) determine whether the DND feature should be activated, and (ii) in response to determining that the DND feature should be activated, activate the DND feature.

NMDs according to some embodiments herein are also configured to additionally (i) determine whether the DND feature should be deactivated, and (ii) in response to determining that the DND feature should be deactivated, deactivate the DND feature.

For example, in some embodiments, when determining whether the DND feature should be activated (or deactivated), the NMD may consider, in any combination, one or more (or all) of: (i) the network configuration that the NMD is currently in (e.g., standalone NMD, configured in a synchrony group, an NMD paired with a playback device, and so on); (ii) changes to the NMD's network configuration (e.g., activating/deactivating a zone scene, pairing/un-pairing with a playback device, joining/leaving a synchrony group, and so on); (iii) whether the NMD is playing audio content, and if so, the type and/or source of the audio content; (iv) whether the NMD's microphones are disabled, and if so, whether the microphones were disabled via a hard-kill or a soft-kill mechanism, as described herein; and/or (v) whether one or more other NMDs' microphones are disabled, and if so, the NMD's relationship to those other NMDs having disabled microphones (e.g., paired with another NMD having a disabled microphone, grouped in a zone group with one or more other NMDs having disabled microphones, grouped in a synchrony group with one or more other NMDs having disabled microphones, bonded with one or more other NMDs having disabled microphones, and so on).

In addition to having the capability to activate/deactivate the DND feature in a wide variety of scenarios (sometimes referred to herein as actuating or toggling the DND feature), NMDs according to some embodiments disclosed herein are configured to take different actions in response to receiving incoming requests for communication sessions while the DND feature is activated. For example, in some embodiments, based at least in part on the type of communication session and/or origin of the request, an NMD determines one or more of the timing (e.g., upon receipt of the request or later) and form of any notification(s) (e.g., application alert on a user's smartphone, text message to user's smartphone, audible alert via NMD speaker, on-screen message displayed on screen associated with the NMD) that the NMD may generate or otherwise send to a user associated with the NMD to notify the user that the NMD received (or perhaps is receiving) a request for a communication session (and perhaps the origin of the request). And in some embodiments, based at least in part on the type of communication session, origin of the request, and/or the type of function the NMD may be engaged in when it receives the incoming request, the NMD may additionally or alternatively (i) direct the incoming request to another NMD, (ii) direct the request to a user's mobile phone, (iii) direct the incoming request to a voice mailbox or a voice-to-text application, (iv) notify the originating device that sent the request that the DND feature is activated, and if the NMD is playing audio content, perhaps additionally inform the originating device of the audio content that the NMD is currently playing.

In some embodiments, if the NMD receives a request for a communication session while the NMD is playing audio content (in synchrony or otherwise) in a group with one or more other playback devices, and if the DND feature is activated, the NMD may, perhaps depending at least in part on the type of communication and the origin of the communication request, cause the other playback devices in the group to duck (i.e., reduce) their audio playback volume level while the NMD temporarily breaks away from the group to handle the requested voice communication. While the NMD has temporarily broken away from the group, the other playback devices in the group continue to play back the audio content at the ducked volume level, and the NMD implements the voice communication session rather than playing the audio content. Then, after the voice communication session has ended, the NMD rejoins the group of other playback devices and begins playing back audio content again with the other playback devices in the group. When rejoining the group, the NMD begins playing the audio content that the other playback devices in the group are playing at the time that the NMD rejoins the group, and after the NMD has rejoined the group, the NMD and the other playback devices in the group increase their volume levels to their previous levels prior to the NMD receiving the request for the communication session.

Because NMDs according to some embodiments have the capability to activate and deactivate the DND feature, NMDs according to some embodiments are additionally configured to inform a user of the DND feature status (i.e., active (or activated) vs. not active (or deactivated)). For example, in some embodiments, an NMD may generate an audible notification that indicates the DND feature has been activated (e.g., playing a first tone when DND is activated, and playing a second tone when DND is deactivated). In some embodiments, the NMD informs a controller application running on a controller device (e.g., a smartphone or other computing device) of the current state of the DND feature (i.e., activated vs. deactivated) for the NMD. Some NMDs can be controlled by multiple controller applications from multiple manufacturers and/or software vendors; perhaps even multiple controller applications running on the same controller device (e.g. a smartphone or other computing device). For example, in some embodiments, an NMD from SONOS® may be controlled by both a first controller application from SONOS® and a second controller application from AMAZON®. In some embodiments, the first and second controller applications run on the same controller device, e.g., the user's smartphone or other computing device.

While some embodiments described herein may refer to functions performed by given actors such as "users" and/or other entities, it should be understood that this description is for purposes of explanation only. The claims should not be interpreted to require action by any such example actor unless explicitly required by the language of the claims themselves.

II. Example Operating Environment

FIG. 1 illustrates an example configuration of a media playback system 100 in which one or more embodiments disclosed herein may be implemented. The media playback system 100 as shown is associated with an example home environment having several rooms and spaces, such as for example, an office, a dining room, and a living room. Within these rooms and spaces, the media playback system 100 includes playback devices 102 (identified individually as playback devices 102a-102m), network microphone devices 103 (identified individually as "NMD(s)" 103a-103g), and controller devices 104a and 104b (collectively "controller devices 104"). The home environment may include other network devices, such as one or more smart illumination devices 108 and a smart thermostat 110.

The various playback, network microphone, and controller devices 102-104 and/or other network devices of the media playback system 100 may be coupled to one another via point-to-point connections and/or over other connections, which may be wired and/or wireless, via a LAN including a network router 106. For example, the playback device 102*j* (designated as "Left") may have a point-to-point connection with the playback device 102*a* (designated as "Right"). In one embodiment, the Left playback device 102*j* may communicate over the point-to-point connection with the Right playback device 102*a*. In a related embodiment, the Left playback device 102*j* may communicate with other network devices via the point-to-point connection and/or other connections via the LAN.

The network router 106 may be coupled to one or more remote computing device(s) 105 via a wide area network (WAN) 107. In some embodiments, the remote computing device(s) may be cloud servers. The remote computing device(s) 105 may be configured to interact with the media playback system 100 in various ways. For example, the remote computing device(s) may be configured to facilitate streaming and controlling playback of media content, such as audio, in the home environment. In one aspect of the technology described in greater detail below, the remote computing device(s) 105 are configured to provide a first VAS 160 for the media playback system 100.

In some embodiments, one or more of the playback devices 102 may include an on-board (e.g., integrated) network microphone device. For example, the playback devices 102*a-e* include corresponding NMDs 103*a-e*, respectively. Playback devices that include network microphone devices may be referred to herein interchangeably as a playback device or a network microphone device unless indicated otherwise in the description.

In some embodiments, one or more of the NMDs 103 may be a stand-alone device. For example, the NMDs 103*f* and 103*g* may be stand-alone network microphone devices. A stand-alone network microphone device may omit components typically included in a playback device, such as a speaker or related electronics. In such cases, a stand-alone network microphone device may not produce audio output or may produce limited audio output (e.g., relatively low-quality audio output compared to a playback device).

In use, a network microphone device may receive and process voice inputs from a user in its vicinity. For example, a network microphone device may capture a voice input upon detection of the user speaking the input. In the illustrated example, the NMD 103*a* of the playback device 102*a* in the Living Room may capture the voice input of a user in its vicinity. In some instances, other network microphone devices (e.g., the NMDs 103*b* and 103*f*) in the vicinity of the voice input source (e.g., the user) may also detect the voice input. In such instances, network microphone devices may arbitrate between one another to determine which device(s) should capture and/or process the detected voice input. Examples for selecting and arbitrating between network microphone devices may be found, for example, in U.S. application Ser. No. 15/438,749 filed Feb. 21, 2017, and titled "Voice Control of a Media Playback System," which is incorporated herein by reference in its entirety.

In certain embodiments, a network microphone device may be assigned to a playback device that may not include a network microphone device. For example, the NMD 103*f* may be assigned to the playback devices 102*i* and/or 102*l* in its vicinity. In a related example, a network microphone device may output audio through a playback device to which it is assigned. Additional details regarding associating network microphone devices and playback devices as designated or default devices may be found, for example, in previously referenced U.S. patent application Ser. No. 15/438,749.

Further aspects relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in other home environment configurations comprising more or fewer of any of the playback, network microphone, and/or controller devices 102-104. Additionally, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback and Network Microphone Devices

By way of illustration, SONOS, Inc. presently offers (or has offered) for sale certain playback devices including a "PLAY:1," "SONOS ONE" "PLAY:3," "PLAY:5," "PLAY-BAR," "PLAYBASE," "BEAM," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the examples shown and described herein or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

Figure 2A:
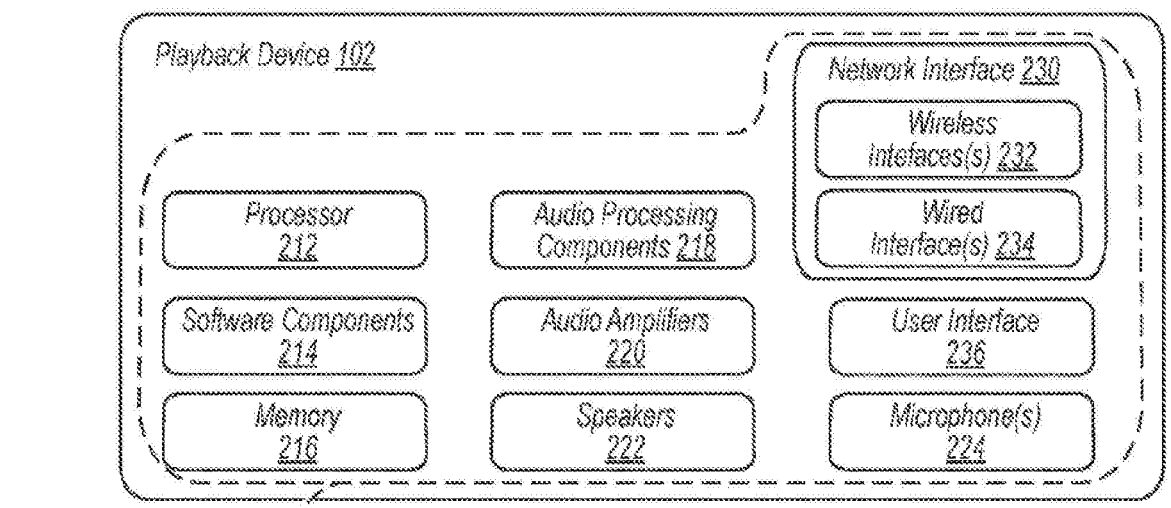
FIG. 2A is a functional block diagram of an example playback device.

FIG. 2A is a functional block diagram illustrating certain aspects of a selected one of the playback devices 102 shown in FIG. 1. As shown, such a playback device may include a processor 212, software components 214, memory 216, audio processing components 218, audio amplifier(s) 220, speaker(s) 222, and a network interface 230 including wireless interface(s) 232 and wired interface(s) 234. In some embodiments, a playback device may not include the speaker(s) 222, but rather a speaker interface for connecting the playback device to external speakers. In certain embodiments, the playback device may include neither the speaker(s) 222 nor the audio amplifier(s) 222, but rather an audio interface for connecting a playback device to an external audio amplifier or audio-visual receiver.

A playback device may further include a user interface 236. The user interface 236 may facilitate user interactions independent of or in conjunction with one or more of the controller devices 104. In various embodiments, the user interface 236 includes one or more of physical buttons and/or graphical interfaces provided on touch sensitive screen(s) and/or surface(s), among other possibilities, for a user to directly provide input. The user interface 236 may further include one or more of lights and the speaker(s) to provide visual and/or audio feedback to a user.

In some embodiments, the processor 212 may be a clock-driven computing component configured to process input data according to instructions stored in the memory 216. The memory 216 may be a tangible computer-readable medium configured to store instructions executable by the processor 212. For example, the memory 216 may be data storage that can be loaded with one or more of the software components 214 executable by the processor 212 to achieve certain functions. In one example, the functions may involve a playback device retrieving audio data from an audio source or another playback device. In another example, the functions may involve a playback device sending audio data to another device on a network. In yet another example, the functions may involve pairing of a playback device with one or more other playback devices to create a multi-channel audio environment.

Certain functions may include or otherwise involve a playback device synchronizing playback of audio content with one or more other playback devices. During synchronous playback, a listener may not perceive time-delay differences between playback of the audio content by the synchronized playback devices. U.S. Pat. No. 8,234,395 filed Apr. 4, 2004, and titled "System and method for synchronizing operations among a plurality of independently clocked digital data processing devices," which is hereby incorporated by reference in its entirety, provides in more detail some examples for audio playback synchronization among playback devices.

The audio processing components 218 may include one or more digital-to-analog converters (DAC), an audio preprocessing component, an audio enhancement component or a digital signal processor (DSP), and so on. In some embodiments, one or more of the audio processing components 218 may be a subcomponent of the processor 212. In one example, audio content may be processed and/or intentionally altered by the audio processing components 218 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback, the audio processing components 208 may be configured to process audio content to be sent to one or more other playback devices for playback.

Audio content to be processed and/or played back by a playback device may be received from an external source, such as via an audio line-in input connection (e.g., an auto-detecting 3.5 mm audio line-in connection) or the network interface 230.

The network interface 230 may be configured to facilitate a data flow between a playback device and one or more other devices on a data network. As such, a playback device may be configured to receive audio content over the data network from one or more other playback devices in communication with a playback device, network devices within a local area network, or audio content sources over a wide area network such as the Internet. In one example, the audio content and other signals transmitted and received by a playback device may be transmitted in the form of digital packet data containing an Internet Protocol (IP)-based source address and IP-based destination addresses. In such a case, the network interface 230 may be configured to parse the digital packet data such that the data destined for a playback device is properly received and processed by the playback device.

As shown, the network interface 230 may include wireless interface(s) 232 and wired interface(s) 234. The wireless interface(s) 232 may provide network interface functions for a playback device to wirelessly communicate with other devices (e.g., other playback device(s), speaker(s), receiver(s), network device(s), control device(s) within a data network the playback device is associated with) in accordance with a communication protocol (e.g., any wireless standard including IEEE 802.11a, 802.11b, 802.11g, 802.11n, 802.11ac, 802.15, 4G & 5G mobile communication standards, and so on). The wired interface(s) 234 may provide network interface functions for a playback device to communicate over a wired connection with other devices in accordance with a communication protocol (e.g., IEEE 802.3). While the network interface 230 shown in FIG. 2A includes both wireless interface(s) 232 and wired interface(s) 234, the network interface 230 may in some embodiments include only wireless interface(s) or only wired interface(s).

As discussed above, a playback device may include a network microphone device, such as one of the NMDs 103 shown in FIG. 1. A network microphone device may share some or all the components of a playback device, such as the processor 212, the memory 216, the microphone(s) 224, etc. In other examples, a network microphone device includes components that are dedicated exclusively to operational aspects of the network microphone device. For example, a network microphone device may include far-field microphones and/or voice processing components, which in some instances a playback device may not include. But in some embodiments, a playback device may contain the same or similar far-field microphones and/or voice processing components as a network microphone device, thereby enabling the playback device to function as a networked microphone device. In another example, a network microphone device may include a touch-sensitive button for enabling/disabling a microphone.

Figure 2B:
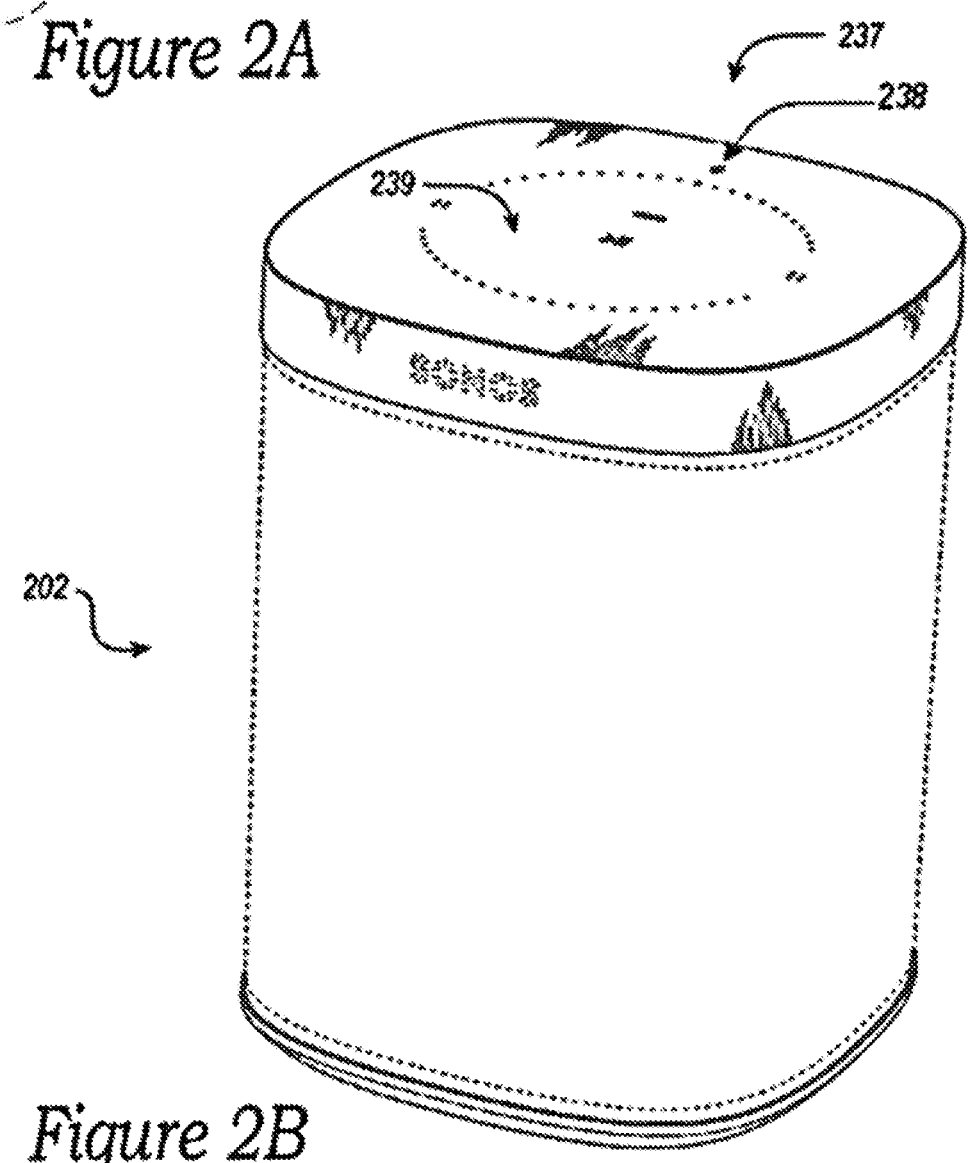
FIG. 2B is a isometric diagram of an example playback device that includes a network microphone device.

FIG. 2B is an isometric diagram showing an example playback device 202 incorporating a network microphone device (NMD). The playback device 202 has a control area 237 at the top of the device comprising a switch 238 to turn the microphones "on" and/or "off" via a manual control input, e.g., the user touches the switch 238 to toggle the microphones on/off. The control area 237 is adjacent to another area 239 at the top of the playback device 202 for controlling playback. In some embodiments, switch 238 functions as a hard-kill switch. A hard-kill switch differs from a soft-kill switch by physically disconnecting from power or otherwise mechanically deactivating the microphone(s) of the NMD. A hard-kill switch in this context cannot be functionally toggled or controlled in software remotely. Such a hard-kill feature assures the user that the microphones cannot be activated inadvertently by a user or others, or surreptitiously or otherwise by others, because the hard-kill switch completely disconnects power from the microphones of the NMD.

In some embodiments, an NMD is configured to include a soft-kill switch (not shown) and/or a controller application, such as a controller application running on a controller device, can include a soft-kill switch activation function.

a(i). Switch 238 Functions as a Hard-Kill Switch

When the switch 238 functions as a hard-kill switch, the playback device 202 supplies power to the microphones and voice-processing components when switch 238 is in the "on" state. While switch 238 is in the "on" state and the playback device 202 is supplying power to the microphones and voice-processing components, the playback device 202 can enable and disable the microphones in response to voice commands received via the microphone and commands received from a controller application running on a controller device (e.g., the Sonos application running on a user's smartphone or other computing device).

When switch 238 is in the "on" state and playback device 202 has enabled the microphones, the microphones listen for and record wake words and voice commands for processing by the playback device 202 and/or VAS.

In some embodiments, when switch 238 is in the "on" state and the playback device 202 has disabled the microphones, the microphones do not listen for or record wake words or voice commands for processing even though the switch 238 is in the "on" state and the playback device 202 is supplying power to the microphones and voice-processing components.

Alternatively, in some embodiments, when switch 238 is in the "on" state and the playback device 202 has disabled the microphones, the microphones may listen for a wake word and a specific microphone activation command (e.g., "Hey Sonos, activate the microphones"), but the playback device 202 will only process (i.e., process locally or send to the VAS for processing) the specific microphone activation command, and it will not process (i.e., locally or via the VAS) any other commands. For example, if a user speaks a command other than the specific microphone activation command after the wake word, e.g., "Hey Sonos, turn on the bedroom lights," the playback device 202 will not process the "turn on the bedroom lights" command. In some embodiments, in response to detecting the wake word but not detecting the specific microphone activation command, the playback device 202 plays a voice response notifying the user that the microphones are disabled, and perhaps also asks the user if he or she would like the playback device 202 to activate the microphones. For example, the playback device 202 may respond, "I'm sorry, the microphone is disabled. Would you like to enable it?" And if the user replies, "Yes," then playback device 202 reactivates the microphones so that the microphones can resume listening for and recording wake words and voice commands for processing by the playback device 202 and/or VAS.

In some embodiments, when the switch 238 is in the "off" state, the playback device 202 cuts off power to the microphones and/or voice-processing components. While switch 238 is in the "off" state and the playback device 202 has cut power to the microphones and/or voice-processing components, the microphones cannot listen for any sounds, including wake words. Importantly, in such embodiments, while switch 238 is in the "off" state, the playback device 202 cannot enable or disable the microphones in response to voice commands received via the microphone or commands received from a controller application running on a controller device.

a(ii). Switch 238 Functions as a Soft-Kill Switch

In embodiments where switch 238 functions as a soft-kill switch, the playback device 202 supplies power to the microphones and voice-processing components when the switch 238 is in the "on" state and when the switch 238 is in the "off" state. Thus, in embodiments where switch 238 functions as a soft-kill switch, toggling switch 238 between the on/off states functions in a manner similar to the playback device 202 activating/deactivating the microphones when switch 238 functions as a hard-kill switch and switch 238 is in the "on" state, as described above.

In some embodiments, when switch 238 is in the "on" state, the microphones are enabled, and the microphones are listening for and recording wake words and voice commands for processing by the playback device 202 and/or VAS. In some embodiments, even though the switch 238 is in the "on" state, the playback device 202 can still disable the microphones in response to voice commands received via the microphone and commands received from a controller application running on a controller device. In some embodiments, disabling the microphones includes the playback device 202 additionally toggling switch 238 to the "off" state.

In some embodiments, when switch 238 is in the "off" state, the microphones do not listen for or record wake words or voice commands for processing even though the playback device 202 is still providing power to the microphones and voice-processing components. In some embodiments, even though the switch 238 is in the "off" state, the playback device 202 can still enable the microphones in response to voice commands received via the microphone and commands received from a controller application running on a controller device. In some embodiments, enabling the microphones includes the playback device 202 additionally toggling switch 238 to the "on" state.

For example, while the soft-kill switch is in the "off" state, the microphones may listen for a wake word and a specific microphone activation command (e.g., "Hey Sonos, activate the microphones"), but the playback device 202 will only process (i.e., process locally or send to the VAS for processing) the specific microphone activation command, and it will not process (i.e., locally or via the VAS) any other commands. For example, if a user speaks a command other than the specific microphone activation command after the wake word, e.g., "Hey Sonos, turn on the bedroom lights," the playback device 202 will not process the "turn on the bedroom lights" command because the soft-kill switch is in the "off" state. In some embodiments, in response to detecting the wake word but not detecting the specific microphone activation command, the playback device 202 plays a voice response notifying the user that the microphones are disabled, and perhaps also asks the user if he or she would like the playback device 202 to activate the microphones. For example, the playback device 202 may respond, "I'm sorry, the microphone is disabled. Would you like to enable it?" And if the user replies, "Yes," then playback device 202 reactivates the microphones so that the microphones can resume listening for and recording wake words and voice commands for processing by the playback device 202 and/or VAS.

b. Example Playback Device Configurations

Figure 3A:
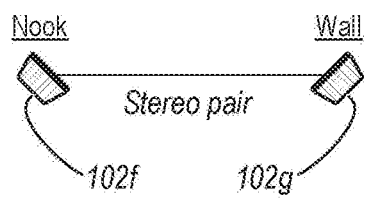
FIGS. 3A, 3B, 3C, 3D, and 3E are diagrams showing example zones and zone groups in accordance with aspects of the disclosure.
Figure 3B:
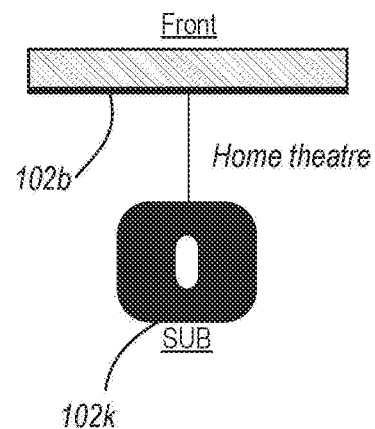
Figure 3C:
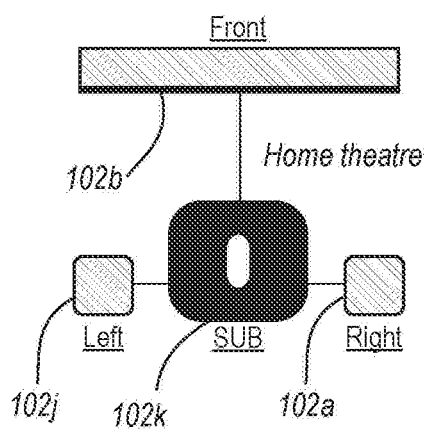
Figure 3D:
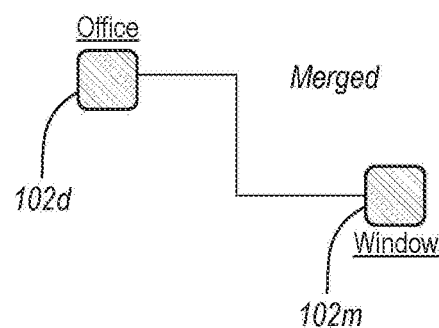
Figure 3E:
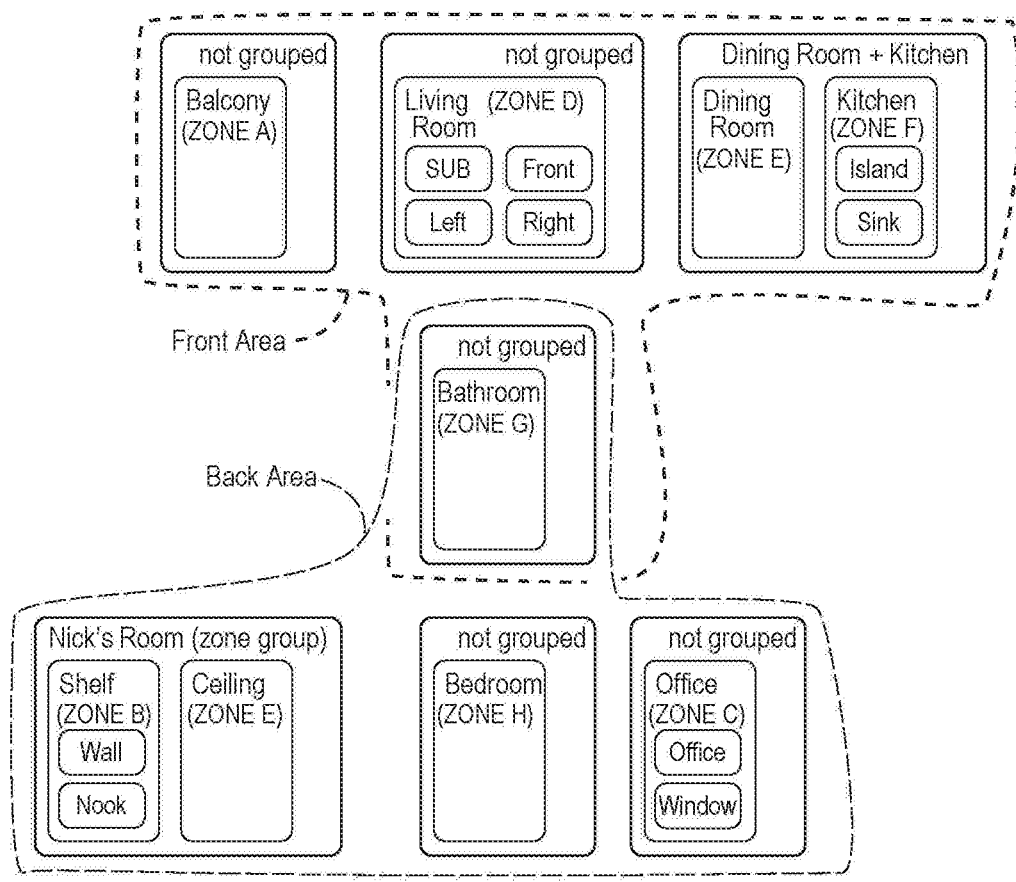

FIGS. 3A-3E show example configurations of playback devices in zones and zone groups. Referring first to FIG. 3E, in one example, a single playback device may belong to a zone. For example, the playback device 102c in the Balcony may belong to Zone A. In some implementations described below, multiple playback devices may be "bonded" to form a "bonded pair" which together form a single zone. For example, the playback device 102f named Nook in FIG. 1 may be bonded to the playback device 102g named Wall to form Zone B. Bonded playback devices may have different playback responsibilities (e.g., channel responsibilities). In another implementation described below, multiple playback devices may be merged to form a single zone. For example, the playback device 102d named Office may be merged with the playback device 102m named Window to form a single Zone C. The merged playback devices 102d and 102m may not be specifically assigned different playback responsibilities. That is, the merged playback devices 102d and 102m may, aside from playing audio content in synchrony, each play audio content as they would if they were not merged.

Each zone in the media playback system 100 may be provided for control as a single user interface (UI) entity. For example, Zone A may be provided as a single entity named Balcony. Zone C may be provided as a single entity named Office. Zone B may be provided as a single entity named Shelf.

In various embodiments, a zone may take on the name of one of the playback device(s) belonging to the zone. For example, Zone C may take on the name of the Office device 102d (as shown). In another example, Zone C may take on the name of the Window device 102m. In a further example, Zone C may take on a name that is some combination of the Office device 102d and Window device 102 m. The name that is chosen may be selected by user. In some embodiments, a zone may be given a name that is different than the device(s) belonging to the zone. For example, Zone B is named Shelf but none of the devices in Zone B have this name.

Playback devices that are bonded may have different playback responsibilities, such as responsibilities for certain audio channels. For example, as shown in FIG. 3A, the Nook and Wall devices 102f and 102g may be bonded so as to produce or enhance a stereo effect of audio content. In this example, the Nook playback device 102f may be configured to play a left channel audio component, while the Wall playback device 102g may be configured to play a right channel audio component. In some implementations, such stereo bonding may be referred to as "pairing."

Additionally, bonded playback devices may have additional and/or different respective speaker drivers. As shown in FIG. 3B, the playback device 102b named Front may be bonded with the playback device 102k named SUB. The Front device 102b may render a range of mid to high frequencies and the SUB device 102k may render low frequencies as, e.g., a subwoofer. When un-bonded, the Front device 102b may render a full range of frequencies. As another example, FIG. 3C shows the Front and SUB devices 102b and 102k further bonded with Right and Left playback devices 102a and 102k, respectively. In some implementations, the Right and Left devices 102a and 102k may form surround or "satellite" channels of a home theatre system. The bonded playback devices 102a, 102b, 102j, and 102k may form a single Zone D (FIG. 3E).

Playback devices that are merged may not have assigned playback responsibilities, and may each render the full range of audio content the respective playback device is capable of. Nevertheless, merged devices may be represented as a single UI entity (i.e., a zone, as discussed above). For instance, the playback device 102d and 102m in the Office have the single UI entity of Zone C. In one embodiment, the playback devices 102d and 102m may each output the full range of audio content each respective playback device 102d and 102m are capable of, in synchrony.

In some embodiments, a stand-alone network microphone device may be in a zone by itself. For example, the NMD 103g in FIG. 1 named Ceiling may be Zone E. A network microphone device may also be bonded or merged with another device so as to form a zone. For example, the NMD device 103f named Island may be bonded with the playback device 102i Kitchen, which together form Zone G, which is also named Kitchen. Additional details regarding associating network microphone devices and playback devices as designated or default devices may be found, for example, in previously referenced U.S. patent application Ser. No. 15/438,749. In some embodiments, a stand-alone network microphone device may not be associated with a zone.

Zones of individual, bonded, and/or merged devices may be grouped to form a zone group. For example, referring to FIG. 3E, Zone A may be grouped with Zone B to form a zone group that includes the two zones. As another example, Zone A may be grouped with one or more other Zones C-I. The Zones A-I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234,395. Playback devices may be dynamically grouped and ungrouped to form new or different groups that synchronously play back audio content.

In various implementations, the zones in an environment may be the default name of a zone within the group or a combination of the names of the zones within a zone group, such as Dining Room+Kitchen, as shown in FIG. 3E. In some embodiments, a zone group may be given a unique name selected by a user, such as Nick's Room, as also shown in FIG. 3E.

Referring again to FIG. 2A, certain data may be stored in the memory 216 as one or more state variables that are periodically updated and used to describe the state of a playback zone, the playback device(s), and/or a zone group associated therewith. The memory 216 may also include the data associated with the state of the other devices of the media system, and shared from time to time among the devices so that one or more of the devices have the most recent data associated with the system.

In some embodiments, the memory may store instances of various variable types associated with the states. Variables instances may be stored with identifiers (e.g., tags) corresponding to type. For example, certain identifiers may be a first type "a1" to identify playback device(s) of a zone, a second type "b1" to identify playback device(s) that may be bonded in the zone, and a third type "c1" to identify a zone group to which the zone may belong. As a related example, in FIG. 1, identifiers associated with the Balcony may indicate that the Balcony is the only playback device of a particular zone and not in a zone group. Identifiers associated with the Living Room may indicate that the Living Room is not grouped with other zones but includes bonded playback devices 102a, 102b, 102j, and 102k. Identifiers associated with the Dining Room may indicate that the Dining Room is part of Dining Room+Kitchen group and that devices 103f and 102i are bonded. Identifiers associated with the Kitchen may indicate the same or similar information by virtue of the Kitchen being part of the Dining Room+Kitchen zone group. Other example zone variables and identifiers are described below.

In yet another example, the media playback system 100 may store and use variables or identifiers representing other associations of zones and zone groups, such as identifiers associated with Areas, as shown in FIG. 3. An area may involve a cluster of zone groups and/or zones not within a zone group. For instance, FIG. 3E shows a first area named Front Area and a second area named Back Area. The Front Area includes zones and zone groups of the Balcony, Living Room, Dining Room, Kitchen, and Bathroom. The Back Area includes zones and zone groups of the Bathroom, Nick's Room, the Bedroom, and the Office. In one aspect, an Area may be used to invoke a cluster of zone groups and/or zones that share one or more zones and/or zone groups of another cluster. In another aspect, this differs from a zone group, which does not share a zone with another zone group. Further examples of techniques for implementing Areas may be found, for example, in U.S. application Ser. No. 15/682,506 filed Aug. 21, 2017 and titled "Room Association Based on Name," and U.S. Pat. No. 8,483,853 filed Sep. 11, 2007, and titled "Controlling and manipulating groupings in a multi-zone media system." U.S. application Ser. No. 15/682,506 and U.S. Pat. No. 8,483,853 are both incorporated herein by reference in their entirety. In some embodiments, the media playback system 100 may not implement Areas, in which case the system may not store variables associated with Areas.

The memory 216 may be further configured to store other data. Such data may pertain to audio sources accessible by a playback device or a playback queue that the playback device (or some other playback device(s)) may be associated with. In embodiments described below, the memory 216 is configured to store a set of command data for selecting a particular VAS, such as the first VAS 160, when processing voice inputs.

During operation, one or more playback zones in the environment of FIG. 1 may each be playing different audio content. For instance, the user may be grilling in the Balcony zone and listening to hip hop music being played by the playback device 102c while another user may be preparing food in the Kitchen zone and listening to classical music being played by the playback device 102i. In another example, a playback zone may play the same audio content in synchrony with another playback zone. For instance, the user may be in the Office zone where the playback device 102d is playing the same hip-hop music that is being playing by playback device 102c in the Balcony zone. In such a case, playback devices 102c and 102d may be playing the hip-hop in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified. As such, the media playback system 100 may support numerous configurations. For example, if a user physically moves one or more playback devices to or from a zone, the media playback system 100 may be reconfigured to accommodate the change(s). For instance, if the user physically moves the playback device 102c from the Balcony zone to the Office zone, the Office zone may now include both the playback devices 102c and 102d. In some cases, the user may pair or group the moved playback device 102c with the Office zone and/or rename the players in the Office zone using, e.g., one of the controller devices 104 and/or voice input. As another example, if one or more playback devices 102 are moved to a particular area in the home environment that is not already a playback zone, the moved playback device(s) may be renamed or associated with a playback zone for the particular area.

Further, different playback zones of the media playback system 100 may be dynamically combined into zone groups or split up into individual playback zones. For example, the Dining Room zone and the Kitchen zone may be combined into a zone group for a dinner party such that playback devices 102i and 102l may render audio content in synchrony. As another example, bonded playback devices 102 in the Living Room zone may be split into (i) a television zone and (ii) a separate listening zone. The television zone may include the Front playback device 102b. The listening zone may include the Right, Left, and SUB playback devices 102a, 102j, and 102k, which may be grouped, paired, or merged, as described above. Splitting the Living Room zone in such a manner may allow one user to listen to music in the listening zone in one area of the living room space, and another user to watch the television in another area of the living room space. In a related example, a user may implement either of the NMD 103a or 103b to control the Living Room zone before it is separated into the television zone and the listening zone. Once separated, the listening zone may be controlled, for example, by a user in the vicinity of the NMD 103a, and the television zone may be controlled, for example, by a user in the vicinity of the NMD 103b. As described above, however, any of the NMDs 103 may be configured to control the various playback and other devices of the media playback system 100.

c. Example Controller Devices

Figure 4A:
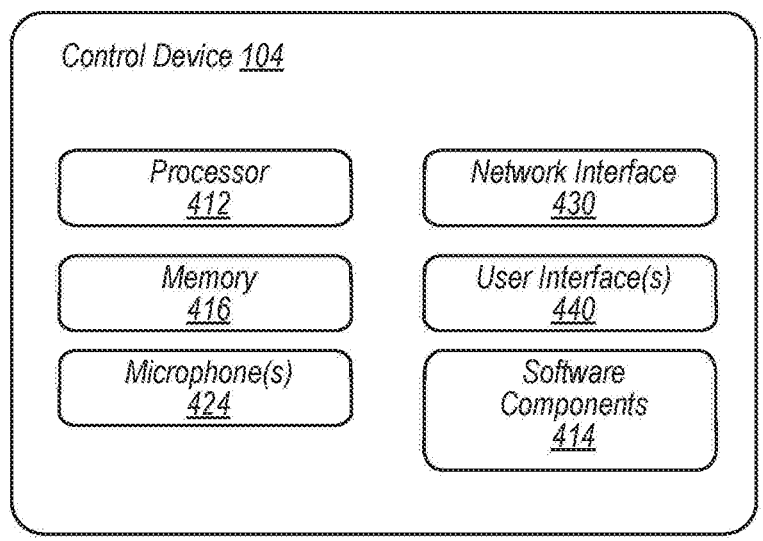
FIG. 4A is a functional block diagram of an example controller device in accordance with aspects of the disclosure.

FIG. 4A is a functional block diagram illustrating certain aspects of a selected one of the controller devices 104 of the media playback system 100 of FIG. 1. Such controller devices may also be referred to as a controller. The controller device shown in FIG. 4A may include components that are generally similar to certain components of the network devices described above, such as a processor 412, memory 416, microphone(s) 424, and a network interface 430. In one example, a controller device may be a dedicated controller for the media playback system 100. In another example, a controller device may be a network device on which media playback system controller application software may be installed, such as for example, an iPhone™, iPad™ or any other smart phone, tablet or network device (e.g., a networked computer such as a PC or Mac™).

The memory 416 of a controller device may be configured to store controller application software and other data associated with the media playback system 100 and a user of the system 100. The memory 416 may be loaded with one or more software components 414 executable by the processor 412 to achieve certain functions, such as facilitating user access, control, and configuration of the media playback system 100. A controller device communicates with other network devices over the network interface 430, such as a wireless interface, as described above.

In one example, data and information (e.g., such as a state variable) may be communicated between a controller device and other devices via the network interface 430. For instance, playback zone and zone group configurations in the media playback system 100 may be received by a controller device from a playback device, a network microphone device, or another network device, or transmitted by the controller device to another playback device or network device via the network interface 406. In some cases, the other network device may be another controller device.

Playback device control commands such as volume control and audio playback control may also be communicated from a controller device to a playback device via the network interface 430. As suggested above, changes to configurations of the media playback system 100 may also be performed by a user using the controller device. The configuration changes may include adding/removing one or more playback devices to/from a zone, adding/removing one or more zones to/from a zone group, forming a bonded or merged player, separating one or more playback devices from a bonded or merged player, among others.

Figures 4B, 4C:
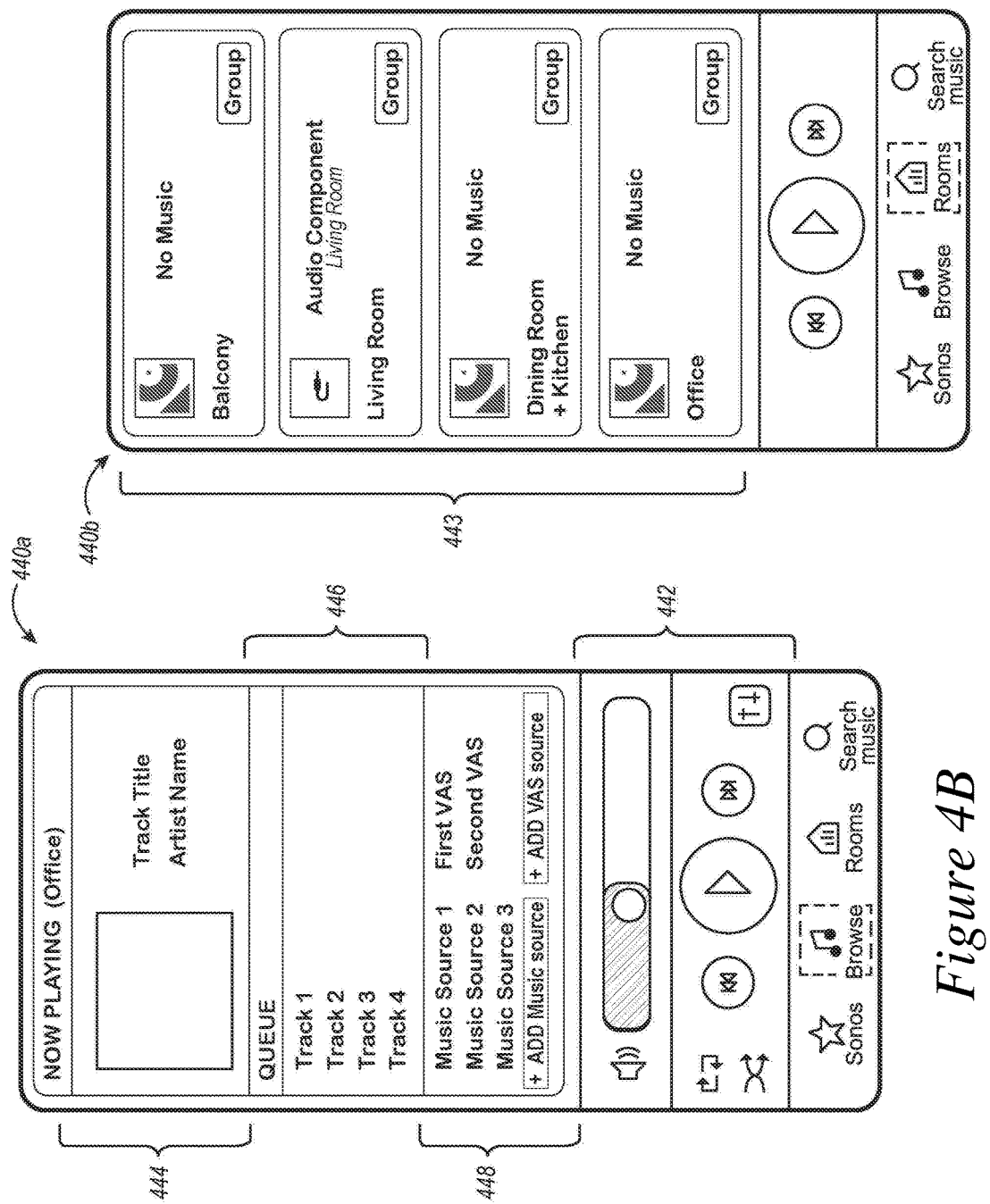
FIGS. 4B and 4C are controller interfaces in accordance with aspects of the disclosure.

The user interface(s) 440 of a controller device may be configured to facilitate user access and control of the media playback system 100, by providing controller interface(s) such as the controller interfaces 440a and 440b shown in FIGS. 4B and 4C, respectively, which may be referred to collectively as the controller interface 440. Referring to FIGS. 4B and 4C together, the controller interface 440 includes a playback control region 442, a playback zone region 443, a playback status region 444, a playback queue region 446, and a sources region 448. The user interface 400 as shown is just one example of a user interface that may be provided on a network device such as the controller device shown in FIG. 3 and accessed by users to control a media playback system such as the media playback system 100. Other user interfaces of varying formats, styles, and interactive sequences may alternatively be implemented on one or more network devices to provide comparable control access to a media playback system.

The playback control region 442 (FIG. 4B) may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 442 may also include selectable icons to modify equalization settings, and playback volume, among other possibilities.

The playback zone region 443 (FIG. 4C) may include representations of playback zones within the media playback system 100. The playback zones regions may also include representation of zone groups, such as the Dining Room+ Kitchen zone group, as shown. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 443 (FIG. 4C) may be dynamically updated as playback zone or zone group configurations are modified.

The playback status region 444 (FIG. 4B) may include graphical representations of audio content that is presently being played, previously played, or scheduled to play next in the selected playback zone or zone group. The selected playback zone or zone group may be visually distinguished on the user interface, such as within the playback zone region 443 and/or the playback status region 444. The graphical representations may include track title, artist name, album name, album year, track length, and other relevant information that may be useful for the user to know when controlling the media playback system via the user interface 440.

The playback queue region 446 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

With reference still to FIGS. 4B and 4C, the graphical representations of audio content in the playback queue region 446 (FIG. 4C) may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device. Playback of such a playback queue may involve one or more playback devices playing back media items of the queue, perhaps in sequential or random order.

The sources region 448 may include graphical representations of selectable audio content sources and selectable voice assistants associated with a corresponding VAS. The VASes may be selectively assigned. In some examples, multiple VASes, such as AMAZON's ALEXA® and another voice service, may be invokable by the same network microphone device. In some embodiments, a user may assign a VAS exclusively to one or more network microphone devices. For example, a user may assign the first VAS 160 to one or both of the NMDs 102*a* and 102*b* in the Living Room shown in FIG. 1, and a second VAS to the NMD 103*f* in the Kitchen. Other examples are possible, too.

d. Example Audio Content Sources

The audio sources in the sources region 448 may be audio content sources from which audio content may be retrieved and played by the selected playback zone or zone group. One or more playback devices in a zone or zone group may be configured to retrieve playback audio content (e.g., according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a controller device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

e. Example Network Microphone Devices

Figure 5A:
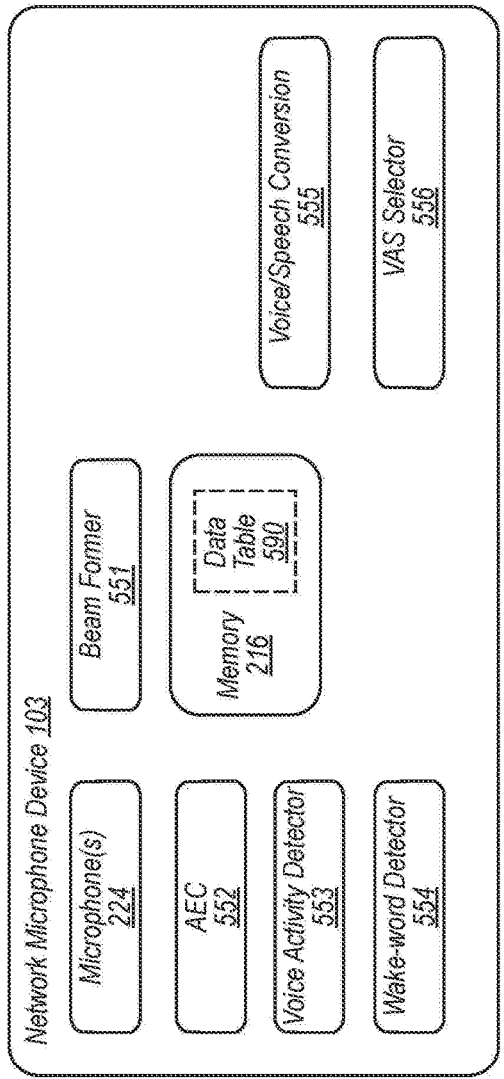
FIG. 5A is a functional block diagram of an example network microphone device in accordance with aspects of the disclosure.

FIG. 5A is a functional block diagram showing additional features of one or more of the NMDs 103 in accordance with aspects of the disclosure. The network microphone device shown in FIG. 5A may include components that are generally similar to certain components of network microphone devices described above, such as the processor 212 (FIG. 1), network interface 230 (FIG. 2A), microphone(s) 224, and the memory 216. Although not shown for purposes of clarity, a network microphone device may include other components, such as speakers, amplifiers, signal processors, as discussed above.

The microphone(s) 224 may be a plurality of microphones arranged to detect sound in the environment of the network microphone device. In one example, the microphone(s) 224 may be arranged to detect audio from one or more directions relative to the network microphone device. The microphone(s) 224 may be sensitive to a portion of a frequency range. In one example, a first subset of the microphone(s) 224 may be sensitive to a first frequency range, while a second subset of the microphone(s) 224 may be sensitive to a second frequency range. The microphone(s) 224 may further be arranged to capture location information of an audio source (e.g., voice, audible sound) and/or to assist in filtering background noise. Notably, in some embodiments the microphone(s) 224 may have a single microphone rather than a plurality of microphones.

A network microphone device may further include beamformer components 551, acoustic echo cancellation (AEC) components 552, voice activity detector components 553, wake word detector components 554, speech/text conversion components 555 (e.g., voice-to-text and text-to-voice), and VAS selector components 556. In various embodiments, one or more of the components 551-556 may be a subcomponent of the processor 512.

The beamforming and AEC components 551 and 552 are configured to detect an audio signal and determine aspects of voice input within the detect audio, such as the direction, amplitude, frequency spectrum, etc. For example, the beamforming and AEC components 551 and 552 may be used in a process to determine an approximate distance between a network microphone device and a user speaking to the network microphone device. In another example, a network microphone device may detective a relative proximity of a user to another network microphone device in a media playback system.

The voice activity detector activity components 553 are configured to work closely with the beamforming and AEC components 551 and 552 to capture sound from directions where voice activity is detected. Potential speech directions can be identified by monitoring metrics which distinguish speech from other sounds. Such metrics can include, for example, energy within the speech band relative to background noise and entropy within the speech band, which is measure of spectral structure. Speech typically has a lower entropy than most common background noise.

The wake-word detector components 554 are configured to monitor and analyze received audio to determine if any wake words are present in the audio. The wake-word detector components 554 may analyze the received audio using a wake word detection algorithm. If the wake-word detector 554 detects a wake word, a network microphone device may process voice input contained in the received audio. Example wake word detection algorithms accept audio as input and provide an indication of whether a wake word is present in the audio. Many first- and third-party wake word detection algorithms are known and commercially available. For instance, operators of a voice service may make their algorithm available for use in third-party devices. Alternatively, an algorithm may be trained to detect certain wake-words.

In some embodiments, the wake-word detector 554 runs multiple wake word detection algorithms on the received audio simultaneously (or substantially simultaneously). As noted above, different voice services (e.g. AMAZON's ALEXA®, APPLE's SIRI®, or MICROSOFT's CORTANA®) each use a different wake word for invoking their respective voice service. To support multiple services, the wake word detector 554 may run the received audio through the wake word detection algorithm for each supported voice service in parallel.

The VAS selector components 556 are configured to detect for commands spoken by the user within a voice input. The speech/text conversion components 555 may facilitate processing by converting speech in the voice input to text. In some embodiments, a network microphone device may include voice recognition software that is trained to a particular user or a particular set of users associated with a household. Such voice recognition software may implement voice-processing algorithms that are tuned to specific voice profile(s). Tuning to specific voice profiles may require less computationally intensive algorithms than traditional VASes, which typically sample from a broad base of users and diverse requests that are not targeted to media playback systems The VAS selector components 556 are also configured to determine if certain command criteria are met for particular command(s) detected in a voice input. Command criteria for a given command in a voice input may be based, for example, on the inclusion of certain keywords within the voice input. A keyword may be, for example, a word in the voice input identifying a particular device or group in the media playback system 100. As used herein, the term "keyword" may refer to a single word (e.g., "Bedroom") or a group of words (e.g., "the Living Room").

In addition or alternatively, command criteria for given command(s) may involve detection of one or more control state and/or zone state variables in conjunction with detecting the given command(s). Control state variables may include, for example, indicators identifying a level of volume, a queue associated with one or more device(s), and playback state, such as whether devices are playing a queue, paused, etc. Zone state variables may include, for example, indicators identifying which, if any, zone players are grouped. The VAS selector components 556 may store in the memory 216 a set of command information, such as in a data table 590, that contains a listing of commands and associated command criteria, which are described in greater detail below.

In some embodiments, one or more of the components 551-556 described above can operate in conjunction with the microphone(s) 224 to detect and store a user's voice profile, which may be associated with a user account of the media playback system 100. In some embodiments, voice profiles may be stored as and/or compared to variables stored in the set of command information 590, as described below. The voice profile may include aspects of the tone or frequency of user's voice and/or other unique aspects of the user such as those described in previously referenced U.S. patent application Ser. No. 15/438,749.

In some embodiments, one or more of the components 551-556 described above can operate in conjunction with the microphone array 524 to determine the location of a user in the home environment and/or relative to a location of one or more of the NMDs 103. The location or proximity of a user may be detected and compared to a variable stored in the command information 590, as described below. Techniques for determining the location or proximity of a user may include or more techniques disclosed in previously referenced U.S. patent application Ser. No. 15/438,749, U.S. Pat. No. 9,084,058 filed Dec. 29, 2011, and titled "Sound Field Calibration Using Listener Localization," and U.S. Pat. No. 8,965,033 filed Aug. 31, 2012, and titled "Acoustic Optimization." U.S. patent application Ser. No. 15/438,749, U.S. Pat. Nos. 9,084,058, and 8,965,033 are incorporated herein by reference in their entirety.

Figure 5B:
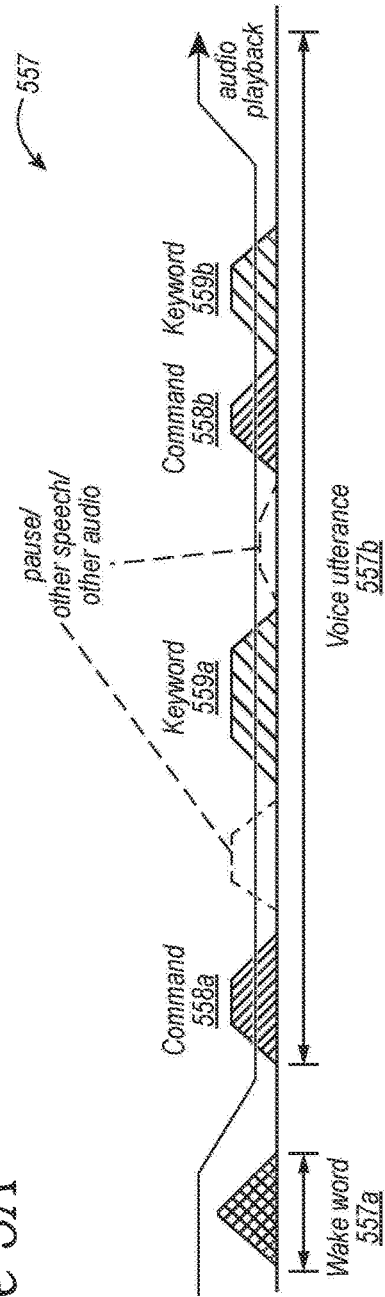
FIG. 5B is a diagram of an example voice input in accordance with aspects of the disclosure.

FIG. 5B is a diagram of an example voice input in accordance with aspects of the disclosure. The voice input may be captured by a network microphone device, such as by one or more of the NMDs 103 shown in FIG. 1. The voice input may include a wake word portion 557a and a voice utterance portion 557b (collectively "voice input 557"). In some embodiments, the wake word 557a can be a known wake word, such as "Alexa," which is associated with AMAZON's ALEXA®). In other embodiments, the voice input 557 may not include a wake word.

In some embodiments, a network microphone device may output an audible and/or visible response upon detection of the wake word portion 557a. Additionally or alternatively, a network microphone device may output an audible and/or visible response after processing a voice input and/or a series of voice inputs (e.g., in the case of a multi-turn request).

The voice utterance portion 557b may include, for example, one or more spoken commands 558 (identified individually as a first command 558a and a second command 558b) and one or more spoken keywords 559 (identified individually as a first keyword 559a and a second keyword 559b). In one example, the first command 557a can be a command to play music, such as a specific song, album, playlist, etc. In this example, the keywords 559 may be one or more words identifying one or more zones in which the music is to be played, such as the Living Room and the Dining Room shown in FIG. 1. In some examples, the voice utterance portion 557b can include other information, such as detected pauses (e.g., periods of non-speech) between words spoken by a user, as shown in FIG. 5B. The pauses may demarcate the locations of separate commands, keywords, or other information spoke by the user within the voice utterance portion 557b.

In some embodiments, the media playback system 100 is configured to temporarily reduce the volume of audio content that it is playing while detecting the wake word portion 557a. The media playback system 100 may restore the volume after processing the voice input 557, as shown in FIG. 5B. Such a process can be referred to as ducking, examples of which are disclosed in previously referenced U.S. patent application Ser. No. 15/438,749.

f. Example Network and Remote Computing Systems

Figure 6:
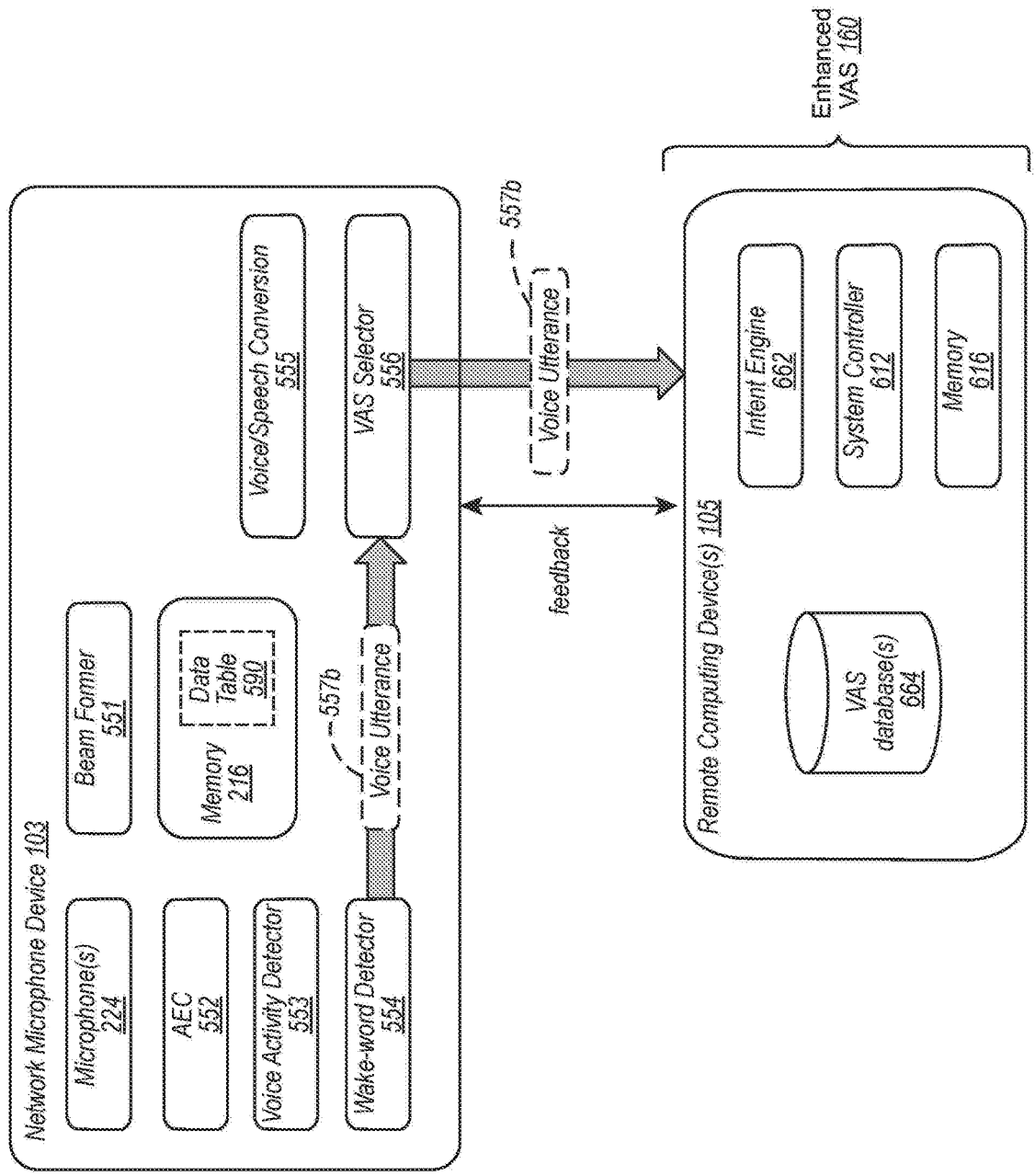
FIG. 6 is a functional block diagram of example remote computing device(s) in accordance with aspects of the disclosure.

FIG. 6 is a functional block diagram showing additional details of the remote computing device(s) 105 in FIG. 1. In various embodiments, the remote computing device(s) 105 may receive voice inputs from one or more of the NMDs 103 over the WAN 107 shown in FIG. 1. For purposes of illustration, selected communication paths of the voice input 557 (FIG. 5B) are represented by arrows in FIG. 6. In one embodiment, the voice input 557 processed by the remote computing device(s) 105 may include the voice utterance portion 557b (FIG. 5B). In another embodiment, the processed voice input 557 may include both the voice utterance portion 557b and the wake word 557a (FIG. 5B)

The remote computing device(s) 105 includes a system controller 612 comprising one or more processors, an intent engine 602, and a memory 616. The memory 616 may be a tangible computer-readable medium configured to store instructions executable by the system controller 612 and/or one or more of the playback, network microphone, and/or controller devices 102-104.

The intent engine 662 is configured to process a voice input and determine an intent of the input. In some embodiments, the intent engine 662 may be a subcomponent of the system controller 612. The intent engine 662 may interact with one or more database(s), such as one or more VAS database(s) 664, to process voice inputs. The VAS database(s) 664 may reside in the memory 616 or elsewhere, such as in memory of one or more of the playback, network microphone, and/or controller devices 102-104. In some embodiments, the VAS database(s) 664 may be updated for adaptive learning and feedback based on the voice input processing. The VAS database(s) 664 may store various user data, analytics, catalogs, and other information for NLU-related and/or other processing.

The remote computing device(s) 105 may exchange various feedback, information, instructions, and/or related data with the various playback, network microphone, and/or controller devices 102-104 of the media playback system 100. Such exchanges may be related to or independent of transmitted messages containing voice inputs. In some embodiments, the remote computing device(s) 105 and the media playback system 100 may exchange data via communication paths as described herein and/or using a metadata exchange channel as described in previously referenced U.S. patent application Ser. No. 15/438,749.

Processing of a voice input by devices of the media playback system 100 may be carried out at least partially in parallel with processing of the voice input by the remote computing device(s) 105. Additionally, the speech/text conversion components 555 of a network microphone device may convert responses from the remote computing device(s) 105 to speech for audible output via one or more speakers.

Figure 7A:
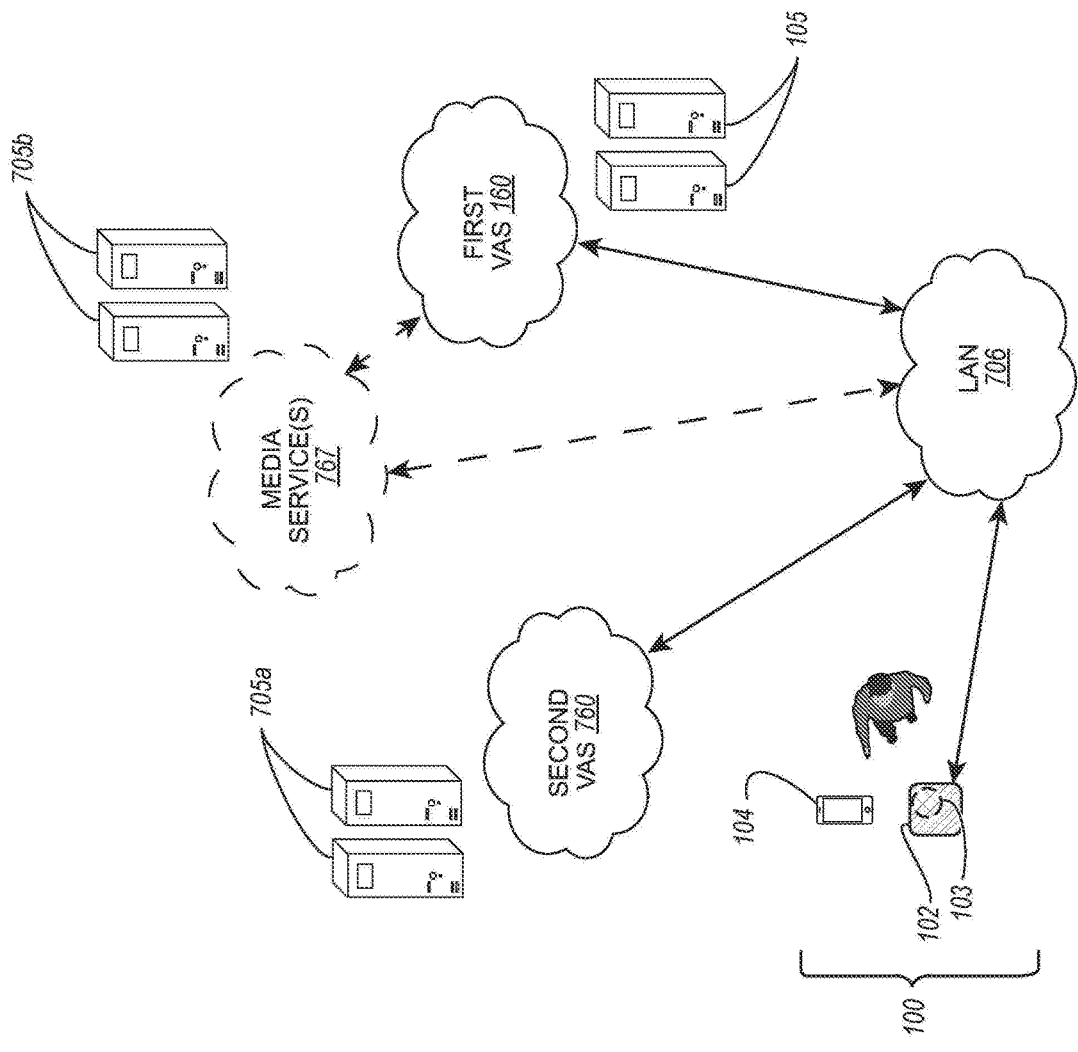
FIG. 7A is a schematic diagram of an example network system in accordance with aspects of the disclosure.

In accordance with various embodiments of the present disclosure, the remote computing device(s) 105 carry out functions of the first VAS 160 for the media playback system 100. FIG. 7A is schematic diagram of an example network system 700 that comprises the first VAS 160. As shown, the remote computing device(s) 105 are coupled to the media playback system 100 via the WAN 107 (FIG. 1) and/or a LAN 706 connected to the WAN 107. In this way, the various playback, network microphone, and controller devices 102-104 of the media playback system 100 may communicate with the remote computing device(s) 105 to invoke functions of the first VAS 160.

The network system 700 further includes additional first remote computing device(s) 705a (e.g., cloud servers) and second remote computing device(s) 705b (e.g., cloud servers). The second remote computing device(s) 705b may be associated with a media service provider 767, such as SPOTIFY® or PANDORA®. In some embodiments, the second remote computing device(s) 705b may communicate directly the computing device(s) of the first VAS 160. Additionally or alternately, the second remote computing device(s) 705b may communicate with the media playback system 100 and/or other intervening remote computing device(s).

The first remote computing device(s) 705a may be associated with a second VAS 760. The second VAS 760 may be a traditional VAS provider associated with, e.g., AMAZON's ALEXA®, APPLE's SIRI®, MICROSOFT's CORTANA®, or another VAS provider. Although not shown for purposes of clarity, the network computing system 700 may further include remote computing devices associated with one or more additional VASes, such as additional traditional VASes. In such embodiments, media playback system 100 may be configured to select the first VAS 160 over the second VAS 760 as well as another VAS.

Figure 7B:
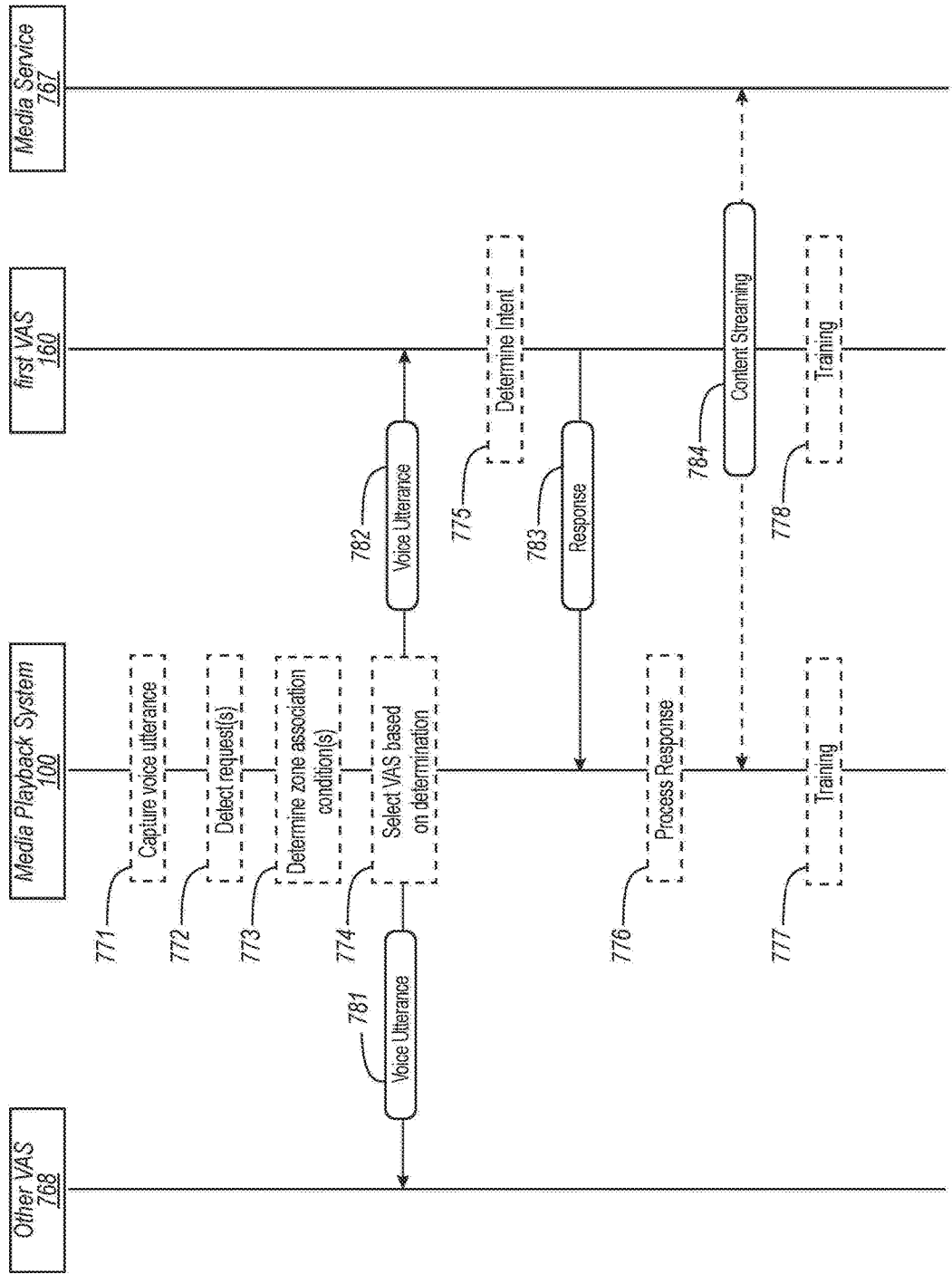
FIG. 7B is an example message flow implemented by the example network system of FIG. 7A in accordance with aspects of the disclosure.

FIG. 7B is a message flow diagram illustrating various data exchanges in the network computing system 700 of FIG. 7A. The media playback system 100 captures a voice input via a network microphone device (block 771), such as via one or more of the NMDs 103 shown in FIG. 1. The media playback system 100 may select an appropriate VAS based on commands and associated command criteria in the set of command information 590 (blocks 771-774), as described below. If the second VAS 760 is selected, the media playback system 100 may transmit one or messages 781 (e.g., packets) containing the voice input to the second VAS 760 for processing.

If, on the other hand, the first VAS 160 is selected, the media playback system 100 transmits one or more messages 782 (e.g., packets) containing the voice input to the VAS 160. The media playback system 100 may concurrently transmit other information to the VAS 160 with the message(s) 782. For example, the media playback system 100 may transmit data over a metadata channel, as described in previously referenced U.S. patent application Ser. No. 15/131,244.

The first VAS 160 may process the voice input in the message(s) 782 to determine intent (block 775). Based on the intent, the VAS 160 may send one or more response messages 783 (e.g., packets) to the media playback system 100. In some instances, the response message(s) 783 may include a payload that directs one or more of the devices of the media playback system 100 to execute instructions (block 776). For example, the instructions may direct the media playback system 100 to play back media content, group devices, and/or perform other functions described below. In addition or alternately, the response message(s) 783 from the VAS 160 may include a payload with a request for more information, such as in the case of multi-turn commands.

In some embodiments, the response message(s) 783 sent from the first VAS 160 may direct the media playback system 100 to request media content, such as audio content, from the media service(s) 667. In other embodiments, the media playback system 100 may request content independently from the VAS 160. In either case, the media playback system 100 may exchange messages for receiving content, such as via a media stream 784 comprising, e.g., audio content.

In some embodiments, the media playback system 100 may receive audio content from a line-in interface on a playback, network microphone, or other device over a local area network via a network interface. Example audio content includes one or more audio tracks, a talk show, a film, a television show, a podcast, an Internet streaming video, among many possible other forms of audio content. The audio content may be accompanied by video (e.g., an audio track of a video) or the audio content may be content that is unaccompanied by video.

In some embodiments, the media playback system 100 and/or the first VAS 160 may use voice inputs that result in successful (or unsuccessful) responses from the VAS for training and adaptive training and learning (blocks 777 and 778). Training and adaptive learning may enhance the accuracy of voice processing by the media playback system 100 and or the first VAS 160. In one example, the intent engine 662 (FIG. 6) may update and maintain training learning data in the VAS database(s) 664 for one or more user accounts associated with the media playback system 100.

III. Actuating a do not Disturb Feature

As discussed above, embodiments disclosed and described herein include automatic activation and deactivation of Do Not Disturb (DND) features by network microphone devices (NMDs), including but not limited to stand-alone NMDs, playback devices comprising NMDs, and other computing devices disclosed and described herein that comprise microphones and speakers and which are capable of processing requests for voice and/or video communication sessions and activating/deactivating a DND feature.

When activated, a DND feature causes the NMD in some circumstances to reject incoming requests for a communication session and perhaps also perform additional actions related to the request, as described herein. In some embodiments, the DND feature may be (i) a local DND feature activated on a single NMD, (ii) a group DND feature activated across a group of DNDs (e.g., activated in one or more NMDs of room group, one or more NMDs of a zone group, one or more NMDs of a synchrony group, one or more NMDs of a bonded pair or bonded group, and so on), or (iii) a network DND feature activated on all NMDs in a user's home network.

Figure 8:
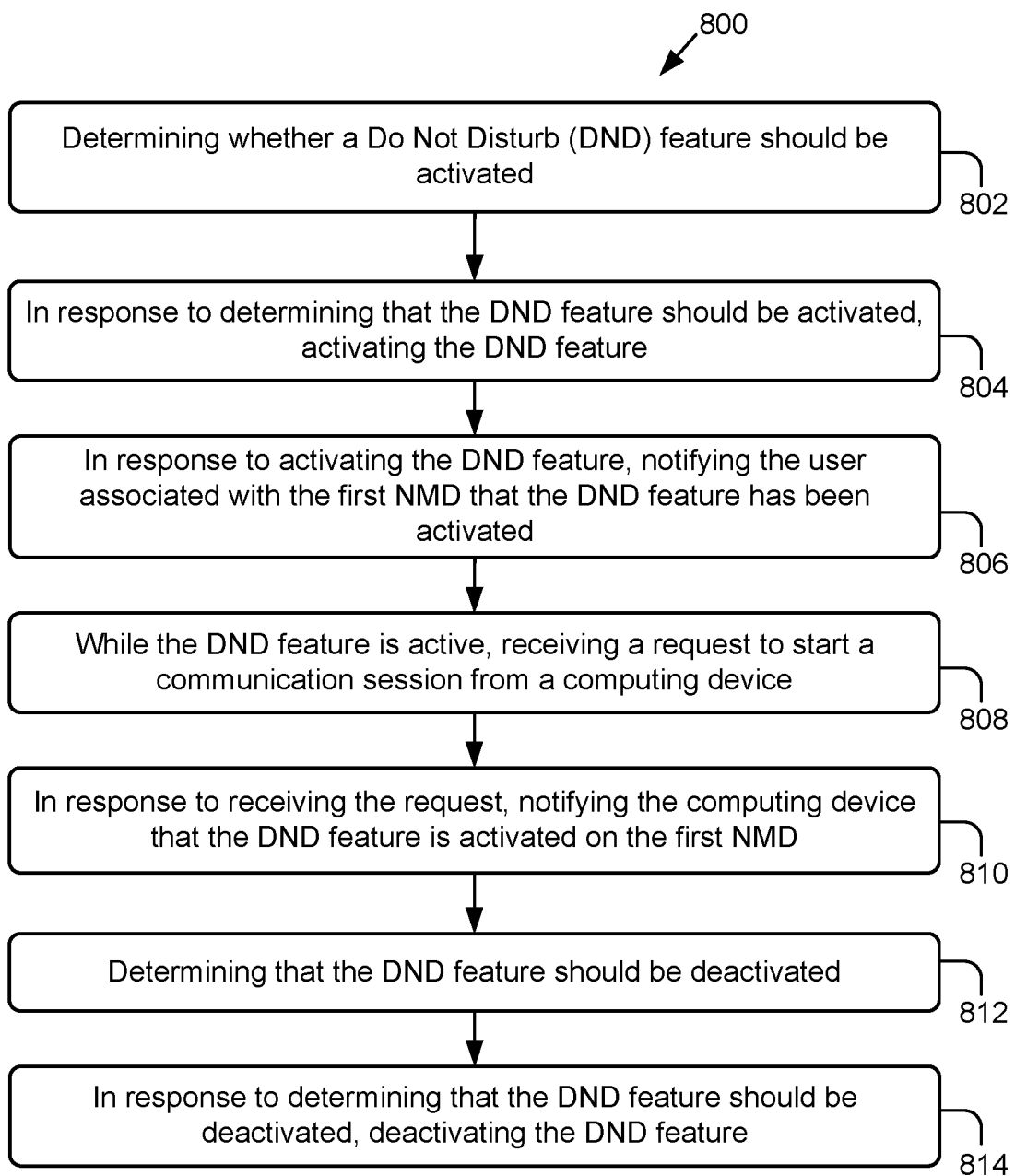
FIG. 8 is an example method of a network microphone device actuating a Do Not Disturb feature according to some embodiments.

FIG. 8 is an example method 800 of a NMD actuating a DND feature according to some embodiments.

Method 800 begins at block 802 where the NMD determines whether a DND feature should be activated.

In some embodiments, determining whether a DND feature should be activated at block 802 comprises receiving a voice command via the one or more microphones of the NMD to activate the DND feature at the NMD. In one example, the NMD determines that a local DND feature should be activated in response to receiving a voice command such as, "Hey Sonos, activate do not disturb." In response, the NMD activates the local DND feature.

In another example, a user has configured a home theater group. The home theater group may comprise a variety of combinations of NMDs. In some examples, a home theater group may include one Sonos PLAYBAR, one Sonos SUB, and two SONOS ONE playback devices. In operation, the user has configured the PLAYBAR, SUB, and SONOS ONE playback devices as a bonded group named "home theater" that is configured to play audio content in a surround sound arrangement. In this example, any of the PLAYBAR, SUB, or first and second SONOS ONE playback devices may perform the NMD functions described herein. For example, the playback devices in the "home theater" group may automatically determine that DND should be activated in certain circumstances, as described herein.

Alternatively, a separate NMD (e.g., an Amazon Echo with Alexa, an Apple iPhone with Siri, or other NMD in communication with a VAS) may perform the NMD functions described herein. In this example, the NMD determines that a group DND feature should be activated in response to receiving a voice command such as, "Hey Sonos, activate do not disturb for my home theater." In response, the NMD activates the group DND feature for one or more (or all) of the NMDs in the "home theater" group. Thus, if the PLAYBAR, SUB, and SONOS ONE devices all have NMD capabilities, then activating the group DND feature in response to the "Hey Sonos, activate do not disturb for my home theater" includes activating the group DND feature at each of the PLAYBAR, SUB, and SONOS ONE devices in the "home theater" group, which may, in some embodiments, amount to activating individual local DND features at each device. If only some but not all of the devices in the "home theater" group have NMD capabilities, then activating the group DND feature in response to the "Hey Sonos, activate do not disturb for my home theater" includes activating the group DND feature at the devices in the "home theater" group that have NMD capabilities. In some embodiments, this may amount to activating individual local DND features at each device in the "home theater" group having NMD capabilities.

In other variations on this example, the NMD may be an Amazon Echo with Alexa (or similar device) located in the same room as the "home theater" group. Additionally, the Amazon Echo (or similar device) may even be a member of the "home theater" group or a designated NMD for the "home theater" group. In either example, the Amazon Echo (or similar) may activate the group DND feature in response to a command such as "Hey Alexa, activate do not disturb for my home theater," which includes activating the group DND at all of the devices in the "home theater" group (and/or at least associated with the "home theater" group, e.g., as a designated NMD for the "home theater" group) that have NMD capabilities, which may, in some examples, include activating individual local DND features at each device in the "home theater" group (or at least associated with the "home theater" group), having NMD capabilities. In some embodiments, if the only NMD in the "home theater" group (or associated with the "home theater" group) is the Amazon Echo with Alexa (or similar device), then activating the group DND feature in response to a command such as "Hey Alexa, activate do not disturb for my home theater" (or similar command) includes activating a local DND feature at the Amazon Echo with Alexa device (or similar NMD).

In different examples, the user has created a group called "Bedrooms" that includes all the NMDs in all the bedrooms of the user's home. Alternatively, in some embodiments, an NMD may automatically configure a group called "Bedrooms" that includes every NMD with "bedroom" in its name (e.g., "master bedroom," "guest bedroom," "Jack's bedroom," "Jill's bedroom," etc.). In similar examples, a controller application configured to control the NMD may automatically configure a group called "Bedrooms" that includes every NMD with "bedroom" in its name. In this example, the user may also manually configure a group called "Bedrooms" via the controller application. Regardless of whether the "Bedrooms" group is manually configured by the user or automatically configured by an NMD or controller application, the NMD determines that a group DND feature should be activated in response to receiving a voice command such as, "Hey Sonos, activate do not disturb in the bedrooms." In response, the NMD activates the group DND feature for all of the NMDs in the "Bedrooms" group, which may, in some embodiments, amount to activating a local DND feature at each NMD in the "Bedrooms" group.

Additionally, this manual or automatic group creation is possible with many other types of rooms. For example, a user may have multiple offices within a home. In this example, the NMD or controller application may automatically configure a group called "Offices" for every NMD with "office" in its name (e.g., "Jack's office", "Jill's office", etc.). Many other examples are possible, too.

In another example, the NMD determines that a network DND feature should be activated in response to receiving a voice command such as, "Hey Sonos, activate do not disturb everywhere." In response, the NMD activates the network DND feature at every NMD in the user's home, which may, in some embodiments, including activating a local DND feature at each NMD in the user's home.

In some examples in response to receiving a voice command involving activating the DND feature in multiple NMDs, zones, or groups, NMDs at locations other than where the command was received may prompt alternate users for confirmation of DND feature activation. For example, one NMD (e.g. "Jill's room") receives a voice command such as "Hey Sonos, activate do not disturb in the bedrooms." A second NMD in the "Bedrooms" group (e.g. "Jack's room") may output a prompt for a second user's confirmation by, for example, an audible alert (e.g. "Would you like to activate do not disturb mode"). Alternatively, the NMD may communicate with a controller device by way of a controller application (e.g., a second user receives a notification on a smartphone via an application). In response to receiving a negative indication (e.g., a spoken, "no," or a user indication of "no" via the controller application), the second NMD determines that the DND feature should not be activated. In example scenarios where no user feedback is received, the second NMD determines that the DND feature should be activated.

In some embodiments, determining whether a DND feature should be activated at block 802 additionally or alternatively comprises a first NMD determining, at least one of, (i) that a hard-kill switch of the first NMD has cut power to the one or more microphones of the first NMD, (ii) that a soft-kill switch of the first NMD has deactivated the one or more microphones of the first NMD, (iii) that a hard-kill switch of a second NMD has cut power to one or more microphones of the second NMD, and/or (iv) that a soft-kill switch of the second NMD has deactivated the one or more microphones of the second NMD.

For example, as described with reference to FIG. 2B, NMDs in some embodiments include a hard-kill switch that can be toggled between "on" and "off" states. In some embodiments, when the hard-kill switch is in the "on" state, the NMD supplies power to the microphones and voice-processing components of the NMD, but the NMD can still activate and deactivate the microphones and voice-processing components of the NMD. And, when the hard-kill switch is in the "off" state, the NMD cuts power to the microphones and voice-processing components of the NMD, and the NMD cannot activate the microphones of the NMD. By setting the hard-kill switch to the "off" position, a user concerned with privacy can be confident that the NMD cannot possibly detect, record, or process (even accidentally) spoken words because the voice microphones and voice-processing components have been powered off and are therefore physically unable to detect, record, or process spoken words or other sounds.

For embodiments where the NMD has a hard-kill switch, the NMD determines whether a DND feature should be activated at block 802 by determining that the hard-kill switch has cut power to the one or more microphones. In such a scenario, because the NMD has cut power to the microphones and voice-processing components, the NMD cannot possibly engage in a voice or video communication session. Therefore, in such embodiments, the NMD activates a local DND feature in response to detecting that the hard-kill switch has cut power to the one or more microphones of the NMD.

In another example, and as described with reference to FIG. 2B, NMDs in some embodiments include a soft-kill switch that can be toggled between "on" and "off" states. When the soft-kill switch in the "on" state, the microphones are enabled, and the NMD is listening for and recording wake words and voice commands for processing by the NMD and/or VAS. When the soft-kill switch is in the "off" state, the microphones are disabled and do not listen for or record wake words or voice commands for processing even though the NMD is still providing power to the microphones and voice-processing components of the NMD.

For embodiments where the NMD has a soft-kill switch, the NMD determines whether a DND feature should be activated at block 802 by determining that the soft-kill switch has disabled the one or more microphones and/or voice-processing components in response to a user input via the soft-kill switch. In such a scenario, because the NMD has disabled the microphones and voice-processing components in response to user input via the soft-kill switch, the NMD infers that the user does not wish to be disturbed by a request for a voice or video communication session. Therefore, in such embodiments, the NMD activates a local DND feature in response to detecting that the soft-kill switch has deactivated the one or more microphones of the NMD.

In some embodiments, the NMD determines that a DND feature should be activated at block 802 in response to determining that either (i) a hard-kill switch of a second NMD has cut power to one or more microphones of the second NMD or (ii) a soft-kill switch of the second NMD has deactivated the one or more microphones of the second NMD.

For example, if the NMD and the second NMD are in a group (e.g., a room group, zone group, synchrony group, bonded pair, bonded group, or other grouping), then in some embodiments, the NMD may determine that it should activate a DND feature in response to determining that another NMD has powered off (e.g., via a hard-kill switch) or deactivated (e.g., via a soft-kill switch) its microphones.

In some embodiments, when one NMD powers off or deactivates its microphones (via a hard-kill or soft-kill switch, respectively), the NMD broadcasts a status message or otherwise notifies one or more other NMDs that are grouped with the NMD (e.g., in the same room group, zone group, synchrony group, bonded pair, bonded group, and/or other grouping) that (i) it has powered off or deactivated its microphones and/or (ii) it has activated a DND feature, e.g., a local, group, or network DND feature. And in some embodiments, in response to receiving a status message that another NMD in the group has powered off or deactivated its microphones and/or activated a DND feature, one or more (or all) of the other NMDs in the group activate a local DND feature. In this manner, an individual NMD in a group of NMDs determines whether it should activate a DND feature in response to receiving a message from another NMD in the group of NMDs comprising one or more of (i) an instruction to activate a local DND feature and/or (ii) message advising the individual NMD that another NMD in its group has powered off or deactivated its microphones.

In some embodiments, determining whether a DND feature should be activated at block 802 additionally or alternatively comprises at least one of (i) detecting whether the NMD is playing audio content; (ii) detecting whether the NMD is playing audio content associated with video content; (iii) detecting whether the NMD is playing audio content from a playlist designated by a user to trigger activation of the DND feature; (iv) detecting whether the NMD is playing audio content comprising one of an audio book and a podcast; and (v) detecting whether an interactive session between a user and a voice assistant servicer (VAS) via the NMD is in process.

In some embodiments, an NMD can be configured, e.g., via instructions from a controller application running on a controller device, to activate a DND feature while the NMD is playing audio content. In some embodiments, a user can configure the NMD to activate a DND feature when the NMD is playing specific types of audio content. In some embodiments, a user can configure the NMD to activate a DND feature when the NMD is playing specific genres of audio content, audio content by particular artists, and/or audio content from specific audio content sources (e.g., Spotify, Amazon Prime Music, Pandora, Apple Music, and/or other sources).

In one example, if the NMD is configured to activate a DND feature while the NMD is playing music, then determining whether a DND feature should be activated at block 802 includes determining whether the NMD is playing music. In such embodiments, the NMD activates a DND feature in response to playing music. And in some embodiments, the NMD later deactivates the DND feature in response to stopping playing music.

In another example, if the NMD is configured to activate a DND feature while the NMD is playing audio content associated with video content (e.g., audio content that accompanies a television show, movie, or online video like YouTube or similar), then determining whether a DND feature should be activated at block 802 includes determining whether the NMD is playing audio content associated with video content. In such embodiments, the NMD activates a DND feature in response to playing audio content associated with video content. And in some embodiments, the NMD later deactivates the DND feature in response to stopping playing audio content associated with video content.

In some embodiments, an NMD determines that it is playing audio content associated with video content based on metadata in the audio content stream that informs the NMD that the audio content is associated with video content. In some embodiments, an NMD determines that it is playing audio content associated with video content based additionally or alternatively on receiving the audio content from a source that provides video content, e.g., Hulu, Netflix, YouTube, HBO Now, and similar media. In some embodiments, an NMD determines that it is playing audio content associated with video content based additionally or alternatively on receiving the audio content from a specific input, e.g., a wired or wireless audio input from or otherwise associated with one or more of a television, set-top box, streaming video player, or other device associated with video content.

In yet another example, if the NMD is configured to activate a DND feature while the NMD is playing an audio book or podcast, then determining whether a DND feature should be activated at block 802 includes determining whether the NMD is playing an audio book or podcast. In such embodiments, the NMD activates a DND feature in response to playing an audio book or podcast. And in some embodiments, the NMD later deactivates the DND feature in response to stopping playing an audio book or podcast.

In a further example, if the NMD is configured to activate a DND feature while the NMD is playing music from a specific playlist (e.g., a dinner playlist or a party playlist), then determining whether a DND feature should be activated at block 802 includes determining whether the NMD is playing audio content from a playlist designated to trigger activation of a DND feature. In operation, a user designates which playlist(s) trigger activation of a DND feature. In some embodiments, the NMD may infer that a particular playlist should trigger activation of a DND feature, for example, based on the name of the playlist (e.g., if the playlist includes words like lullaby, sleep, relax, dinner, party, quiet, focus, and so on). In such embodiments, the NMD activates a DND feature in response to playing a playlist designated to trigger activation of a DND feature. And in some embodiments, the NMD later deactivates the DND feature in response to stopping playing a playlist designated to trigger activation of the DND feature.

In yet another example, if the NMD is configured to activate a DND feature while an interactive session between a user and a VAS via the NMD is in process, then determining whether a DND feature should be activated at block 802 includes determining whether an interactive session between a user and a VAS via the NMD is in process. In such embodiments, the NMD activates a DND feature in response to starting an interactive session between the user and the VAS. For example, the user may be updating a grocery list using Amazon Alexa (or similar device) In this instance, the NMD may determine that the DND feature should be activated once the user initiates the conversation with Alexa. Additionally, the NMD may later deactivate the DND feature in response to terminating the interactive session between the user and the VAS (e.g., once the user is done updating the list of groceries).

Next, method 800 advances to block 804 where, in response to determining that the DND feature should be activated, the NMD activates the DND feature at the NMD.

In some embodiments, activating the DND feature at block 804 comprises activating the DND feature at a first NMD and activating the DND feature at a second NMD on the same LAN as the first NMD, wherein the first NMD and second NMD are at least one of (i) members of a room group, (ii) members of a zone group, (iii) members of a synchrony group, (iv) a bonded playback device, (v) a stereo pair of playback devices, and (vi) manufactured by different manufacturers or suppliers.

For example, if the first NMD and the second NMD are in a group (e.g., a room group, zone group, synchrony group, bonded pair, bonded group, or other grouping), then in some embodiments, when the first NMD activates the DND feature at block 804, the first NMD also activates a DND feature at a second NMD. In operation, the first NMD sends a command or otherwise instructs the second NMD to activate the DND feature at the second NMD.

In one example, a synchrony group includes four Sonos playback devices (e.g. one SONOS PLAYBAR, one SONOS SUB, and two SONOS ONE players), where the user has configured the PLAYBAR, SUB, and SONOS ONE playback devices as a bonded "home theater" group. When a first Sonos playback device in the synchrony group activates a DND feature applicable to the synchrony group (e.g., a group DND or a network DND), the first Sonos playback device instructs the other three Sonos playback devices in the synchrony group to each activate a DND feature, too. For example, if the PLAYBAR activates a DND feature applicable to the "home theater" group, the PLAYBAR instructs the SUB and SONOS ONE devices to each activate a DND feature also.

In some embodiments, the first NMD is manufactured by a first manufacturer or supplier, and the second NMD is manufactured by a second manufacturer or supplier. In one example, the first NMD is a Sonos playback device (e.g., a SONOS ONE) and the second NMD in an Amazon Echo. If the SONOS ONE and Amazon Echo are grouped in the same room, then in some embodiments, when the SONOS ONE activates a DND feature applicable to its room group (e.g., a group DND or a network DND), the SONOS ONE also instructs the Amazon Echo to activate a DND feature. Likewise, when the Amazon Echo activates a DND feature applicable to its room group (e.g., a group DND or network DND), the Amazon Echo also instructs the Sonos ONE to activate a DND feature.

In some embodiments, block 804 additionally includes sending at least one of (i) a first indication to a first controller application that the DND feature has been activated, and (ii) a second indication to a second controller application that the DND feature has been activated.

In one example, a network includes Sonos NMDs and NMDs from another supplier, e.g., Amazon. In operation, a user configures and controls the Sonos NMDs via a Sonos controller application running on a controller device (e.g., the user's smartphone or other computing device), and the user controls the Amazon NMDs via an Amazon controller application running on a controller device (e.g., the user's smartphone or other computing device). In some embodiments, the Sonos controller application can control at least some aspects of the Amazon NMDs and the Amazon controller application can control at least some aspects of the Sonos NMDs. Therefore, in such embodiments, when the Sonos NMD activates a DND feature, the Sonos NMD sends a status message to the Sonos controller application indicating that the Sonos NMD has activated the DND feature, and the Sonos NMD also sends a status message to the Amazon controller application indicating that the Sonos NMD has activated the DND feature. Similarly, when the Amazon NMD activates a DND feature, the Amazon NMD sends a status message to the Amazon controller application indicating that the Amazon NMD has activated the DND feature, and the Amazon NMD also sends a status message to the Sonos controller application indicating that the Amazon NMD has activated the DND feature. In operation, the Sonos NMD sends the status message to the Sonos and Amazon controller applications (i) when the Sonos NMD activates the DND feature and/or (ii) in response to a status query received from either (or both) of the Sonos and Amazon controller applications. Likewise, the Amazon NMD sends the status message to the Sonos and Amazon controller applications (i) when the Amazon NMD activates the DND feature and/or (ii) in response to a status query received from either (or both) of the Sonos and Amazon controller applications. After the Sonos and Amazon controller applications receive the status messages from the Sonos and Amazon NMDs, a user can see the DND feature activation/deactivation status for each Sonos and Amazon NMD in either (or both) of the Sonos controller application and/or the Amazon controller application.

Next, method 800 advances to block 806 where the NMD notifies a user associated with the first NMD that the DND feature has been activated.

In some embodiments, notifying the user associated with the NMD that the DND feature has been activated in block 806 comprises one or more of (i) sending one or more of a text message, app notification, or email to one or more computing devices associated with the user, (ii) playing an audio announcement via the one or more speakers indicating that the DND feature is activated, (iii) acting a flashing light on the NMD, and (iv) causing a video screen associated with the NMD to display an on-screen message indicating that the DND feature is activated.

For example, the NMD may send the alert to a smart phone associated with the user. The user may have a previously configured smart phone application. In this example, the NMD may send a notification to the user that the DND feature has been activated by way of the application. In similar examples, the user may have a phone number or e-mail address associated with the NMD. In these examples, the NMD may send a text message to the cell phone number or an e-mail to the e-mail address alerting the user that the DND feature has been activated. Additionally or alternatively, the NMD may send more than one alert through various channels (e.g., a smartphone application notification and a text message).

In some alternate embodiments, the NMD plays an audible alert to let the user know when the NMD has activated the DND feature. For an NMD configured to activate a DND feature when playing audio, the NMD plays a short audible alert right before beginning playing the audio content to remind the user that DND is activated. Similarly, when the NMD stops playing the audio content, the NMD plays a different, short audible alert to remind the user that DND is no longer activated. An NMD additionally or alternatively configured to inform a user when the NMD activates/deactivates a DND feature via the other notification mechanisms listed above function similarly, e.g., by notifying the user via the notification mechanism when the NMD activates the DND feature and when the NMD deactivates the DND feature.

Alternatively or additionally, if there is video content associated with the audio content, the NMD may cause a video screen associated with the NMD to display an on-screen message indicating that the DND feature has been activated. For example, if the NMD is in a zone or group called "Living Room", the associated screen may display the message "Do Not Disturb has been activated in the Living Room". Many other examples are possible, too.

Next, method 800 advances to block 808 where, while the DND feature is active, the NMD receives a request to start a communication session from a computing device. In operation, the communication session can be any one of (i) an intercom session, (ii) a communication session comprising one or both of Voice over Internet Protocol (VoIP) and video, and (iii) a telephone call. For example, the communication can be an "intercom" or "drop-in" session, a "talk" session, or a "call" session, as described earlier. In another example, the NMD may be configured to interface with one or more features of a house (e.g., a doorbell/intercom). In this example, the request to start a communication session from a computing device involves a doorbell ring that initiates a "intercom" type of communication session between the NMD and the doorbell/intercom system.

Next method 800 advances to block 810 where, in response to receiving the request, the NMD notifies the computing device that sent the request (i.e., the requesting computing device) that the DND feature is activated on the NMD. For example, if the request is an intercom session from a second NMD in the same house by a second user, the NMD will notify the second NMD that the DND feature is activated. The second NMD may then notify the second user via, for example, an audible message (e.g., "home theater has do not disturb feature activated").

In some embodiments, block 810 additionally or alternatively includes one or more of (1) notifying the requesting computing device of audio content that the NMD was playing when the NMD received the request, (ii) directing the request to a second NMD, e.g., another NMD in the user's house, (iii) directing the request to a mobile phone, e.g., a mobile phone associated with the NMD or perhaps to another mobile phone number designated to receive calls diverted from the NMD while DND is activated, (iv) directing the request to a voice mailbox, (v) sending an inaudible notification of the request to a user associated with the first NMD (e.g., a text message, app alert, on-screen alert, and so on), or least sending such an inaudible notification to the user's smartphone or other computing device, and (vi) logging the request at one or more controller applications associated with the first NMD so that the user can later access the log to see the requests that the NMD received while the DND feature was active.

For example, in some embodiments, a user may wish to selectively enforce the DND feature based on the type of communication session and/or the source of the requested communication session. In one example, a user may want the DND feature to block an incoming request for a communication session originating from outside his or her home (e.g., a VoIP voice or video call from outside the home) and reroute such requests to voicemail or a mobile phone, for example. But the user may not want the DND feature to block an incoming request for a communication originating from another NMD in his or her home (e.g., an "intercom" session from another NMD inside the home).

Next, method 800 advances to block 812 where the NMD determines that the DND feature should be deactivated.

In some embodiments, determining whether a DND feature should be deactivated at block 812 comprises receiving a voice command via the one or more microphones of the NMD to deactivate the DND feature at the NMD.

In some embodiments, determining whether a DND feature should be deactivated at block 812 additionally or alternatively comprises at least one of (i) determining that a hard-kill switch of the first NMD has restored power to the one or more microphones of the first NMD, (ii) determining that a soft-kill switch of the first NMD has reactivated the one or more microphones of the first NMD, (iii) determining that a hard-kill switch of a second NMD has restored power to one or more microphones of the second NMD, and (iv) determining that a soft-kill switch of the second NMD has reactivated the one or more microphones of the second NMD.

In some embodiments, determining whether a DND feature should be deactivated at block 812 additionally or alternatively comprises at least one of (i) determining that the first NMD is no longer playing audio content; (ii) determining that the first NMD is no longer playing audio content associated with video content; (iii) determining that the first NMD is no longer playing audio content from a playlist designated by a user to trigger activation of the DND feature; (iv) determining that the first NMD is no longer playing audio content comprising one of an audio book and a podcast; and (v) determining that an interactive session between a user and a voice assistant servicer (VAS) via the first NMD is no longer in process.

Next, method 800 advances to block 814 where, in response to determining that the DND feature should be deactivated, the NMD deactivates the DND feature at the NMD.

In some embodiments, deactivating the DND feature at block 814 additionally comprises at least one of (i) generating an audible notification indicating that a request was received while the DND feature was activated (if a request was received while the DND feature was activated), (ii) generating an audible notification that the DND feature is no longer activated, (iii) sending a first indication to a first controller application that the DND feature is no longer activated (e.g., if the NMD is a Sonos NMD, sending a status message to the Sonos controller application similar to how a Sonos NMD sends a status message to the Sonos controller application to inform the Sonos controller application that the Sonos NMD has activated the DND feature, as described previously), and (iv) sending a second indication to a second controller application that the DND feature is no longer activated (e.g., if the NMD is a Sonos NMD, sending a status message to an Amazon controller application similar to how a Sonos NMD sends a status message to the Amazon controller application to inform the Amazon controller application that the Sonos NMD has activated the DND feature, as described previously).

As mentioned above, in some embodiments of method 800, the actions that the NMD takes in response to receiving the request may vary depending on whether (i) the NMD receives the request to the start the communication session from a computing device that is on the same LAN as the NMD or (ii) the NMD receives the request to the start the communication session from a computing device that is not on the same LAN as the NMD.

For example, in some embodiments, in response to receiving the request and determining that the request originated from a first computing device on the same LAN as the NMD, the NMD generates an audible notification of at least one of (i) the request and (ii) the origin of the request. In a previously-described scenario, if a user's Kitchen NMD has a DND feature activated, and the user's Basement NMD sends a request to start an "intercom" communication session to the Kitchen NMD, and if the Kitchen NMD is configured to accept requests from other NMDs in the same household even though the DND feature is activated, then the Kitchen NMD may generate an audible alert that states, "You have an Intercom request from the Basement. Would you like to accept?" In some embodiments, if the Kitchen NMD is playing audio content when it receives the intercom request from the Basement NMD, the Kitchen NMD ducks (or lowers) the playback volume of the audio content when it plays the audible alert.

Similarly, in some embodiments, and in response to receiving the request and determining that the request originated from a second computing device not on the same LAN as the NMD, the NMD performs at least one of the following previously-described functions of (i) notifying the computing device that the DND feature is activated on the first NMD, (ii) notifying the computing device of audio content that the NMD was playing when the NMD received the request, (iii) directing the request to another NMD, (iv) directing the request to a mobile phone, (v) directing the request to a voice mailbox, (vi) sending an inaudible notification of the request to a user associated with the NMD, and (vii) logging the request at one or more controller applications associated with the NMD.

Figure 9:
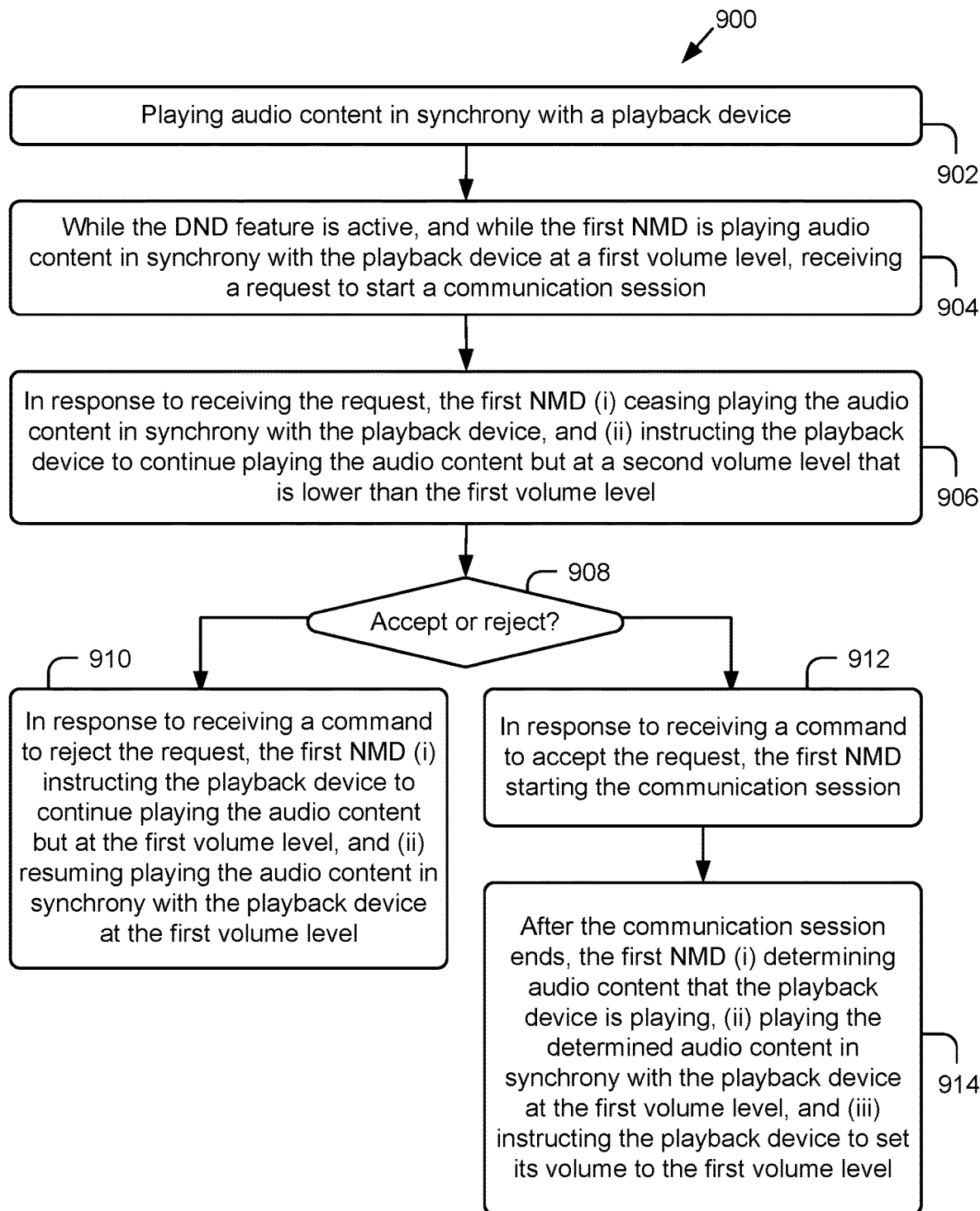
FIG. 9 is an example method of a network microphone device managing a request to start a communication session in a synchrony group where at least one device in the synchrony group has a Do Not Disturb feature activated.

FIG. 9 is an example method 900 of a NMD managing a request to start a communication session in a synchrony group where at least one device in the synchrony group has a DND feature activated.

Method 900 begins at block 902 where the NMD plays audio content in synchrony with a playback device.

Next, method 900 advances to block 904 where, while the DND feature is active, and while the NMD is playing audio content in synchrony with the playback device at a first volume level, the NMD receives a request to start a communication session. In operation, the communication session is one of (i) an intercom session, (ii) a communication session comprising one or both of Voice over Internet Protocol (VoIP) or video, and (iii) a telephone call. For example, the communication can be an "intercom" or "drop-in" session, a "talk" session, or a "call" session, as described earlier.

Next, method 900 advances to block 906 where, in response to receiving the request, the NMD (i) ceases playing the audio content in synchrony with the playback device, and (ii) instructs the playback device to continue playing the audio content but at a second volume level that is lower than the first volume level, i.e., the NMD instructs the playback device to duck its volume.

Next, method 900 advances to block 908, where the NMD waits to receive a command to accept the request or a command to reject the request.

If the NMD receives a command to reject the request, then method 900 advances to block 910 where, in response to receiving the command to reject the request, the NMD (i) instructs the playback device to continue playing the audio content but at the first volume level, and (ii) resumes playing the audio content in synchrony with the playback device at the first volume level.

But, if the NMD receives a command to accept the request, then method 800 advances to block 912 where, in response to receiving the command to accept the request, the NMD starts the communication session.

Next, method 900 advances to block 914 where, after the communication session ends, the first NMD (i) determines audio content that the playback device is playing, (ii) plays the determined audio content in synchrony with the playback device at the first volume level, and (iii) instructs the playback device to set its volume back to the first volume level.

IV. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The invention claimed is:

1. A first Networked Microphone Device (NMD) comprising:
    one or more processors; and
    tangible, non-transitory computer-readable media comprising instructions that, when executed, cause the first NMD to perform a method comprising:
        while the first NMD is grouped with a second NMD, determining whether a Do Not Disturb (DND) feature should be activated, wherein determining whether a DND feature should be activated comprises at least one of (i) determining that one or more microphones of the first NMD has been deactivated or disconnected from power or (ii) determining that one or more microphones of the second NMD has been deactivated or disconnected from power; and
        in response to determining that the DND feature should be activated, activating the DND feature on both the first NMD and the second NMD.

2. The first NMD of claim 1, wherein determining whether a DND feature should be activated comprises at least one of (i) determining that a hard-kill switch of the first NMD has cut power to the one or more microphones of the first NMD, (ii) determining that a soft-kill switch of the first NMD has deactivated the one or more microphones of the first NMD, (iii) determining that a hard-kill switch of the second NMD has cut power to the one or more microphones of the second NMD, or (iv) determining that a soft-kill switch of the second NMD has deactivated the one or more microphones of the second NMD.

3. The first NMD of claim 1, wherein determining whether a DND feature should be activated comprises receiving a voice command via one or more microphones of the first NMD to activate the DND feature.

4. The first NMD of claim 1, wherein determining whether a DND feature should be activated comprises at least one of: (i) detecting whether the first NMD is playing audio content; (ii) detecting whether the first NMD is playing audio content associated with video content; (iii) detecting whether the first NMD is playing audio content from a playlist designated by a user to trigger activation of the DND feature; (iv) detecting whether the first NMD is playing audio content comprising one of an audio book or a podcast; or (v) detecting whether an interactive session between the user and a voice assistant servicer (VAS) via the first NMD is in process.

5. The first NMD of claim 1, wherein the first NMD and the second NMD are at least one of (i) members of a room group, (ii) members of a zone group, (iii) members of a synchrony group, (iv) a bonded playback device, (v) a stereo pair of playback devices, or (vi) manufactured by different manufacturers.

6. The first NMD of claim 1, wherein a user is associated with the first NMD, and wherein the method further comprises:
    in response to activating the DND feature, notifying the user associated with the first NMD that the DND feature has been activated, wherein notifying the user associated with the first NMD that the DND feature has been activated comprises one or more of (i) sending one or more of a text message, app notification, or email to one or more computing devices associated with the user, (ii) playing an audio announcement via one or more speakers indicating that the DND feature is activated, (iii) activing a flashing light on the NMD, or (iv) causing a video screen associated with the first NMD to display an on-screen message indicating that the DND feature is activated.

7. The first NMD of claim 1, wherein the method further comprises:
    in response to activating the DND feature, sending at least one of (i) a first indication to a first controller application that the DND feature has been activated, or (ii) a second indication to a second controller application that the DND feature has been activated.

8. The first NMD of claim 1, wherein the method further comprises:
    while the DND feature is active, receiving a request to start a communication session from a computing device, wherein the communication session is one of (i)

an intercom session, (ii) a communication session comprising one or both of Voice over Internet Protocol (VoIP) or video, or (iii) a telephone call;

in response to receiving the request to start the communication session, at least one of (i) notifying the computing device that the DND feature is activated on the first NMD, (ii) notifying the computing device of audio content that the NMD was playing when the NMD received the request to start the communication session, (iii) directing the request to start the communication session to a third NMD, (iv) directing the request to start the communication session to a mobile phone, (v) directing the request to start the communication session to a voice mailbox, (vi) sending an inaudible notification of the request to start the communication session to a user associated with the first NMD, or (vii) logging the request to start the communication session at one or more controller applications associated with the first NMD;

determining that the DND feature should be deactivated;

in response to determining that the DND feature should be deactivated, deactivating the DND feature on both the first NMD and the second NMD and at least one of (i) generating an audible notification of the request to start the communication session, (ii) generating an audible notification that the DND feature is no longer activated, (iii) sending a first indication to a first controller application that the DND feature is no longer activated, or (iv) sending a second indication to a second controller application that the DND feature is no longer activated.

9. The first NMD of claim 1, wherein the method further comprises while the DND feature is active, receiving a request to start a communication session, wherein the communication session is one of (i) an intercom session, (ii) a communication session comprising one or both of Voice over Internet Protocol (VoIP) or video, or (iii) a telephone call;

determining an origin of the request to start the communication session;

in response to receiving the request to start the communication session and determining that the request to start the communication session originated from a first computing device on a Local Area Network (LAN) which the first NMD is also on, generating an audible notification of at least one of (i) the request to start the communication session and (ii) the origin of the request to start the communication session; and in response to receiving the request to start the communication session and determining that the request to start the communication session originated from a second computing device not on the same LAN as the first NMD, at least one of (i) notifying the second computing device that the DND feature is activated on the first NMD, (ii) notifying the second computing device of audio content that the first NMD was playing when the first NMD received the request to start the communication session, (iii) directing the request to start the communication session to a third NMD, (iv) directing the request to start the communication session to a mobile phone, (v) directing the request to start the communication session to a voice mailbox, (vi) sending an inaudible notification of the request to start the communication session to a user associated with the first NMD, or (vii) logging the request to start the communication session at one or more controller applications associated with the first NMD;

determining that the DND feature should be deactivated;

in response to determining that the DND feature should be deactivated, deactivating the DND feature on both the first NMD and the second NMD and at least one of (i) generating an audible notification of the request to start the communication session, (ii) generating an audible notification that the DND feature is no longer activated, (iii) sending a first indication to a first controller application that the DND feature is no longer activated, or (iv) sending a second indication to a second controller application that the DND feature is no longer activated.

10. The first NMD of claim 1, wherein the method further comprises:

playing audio content in synchrony with a playback device;

while the DND feature is active on the first NMD and the second NMD, and while the first NMD is playing audio content in synchrony with the playback device at a first volume level, receiving a request to start a communication session, wherein the communication session is one of (i) an intercom session, (ii) a communication session comprising one or both of Voice over Internet Protocol (VoIP) or video, or (iii) a telephone call; and in response to receiving the request, the first NMD (i) ceasing playing the audio content in synchrony with the playback device, (ii) instructing the playback device to continue playing the audio content but at a second volume level that is lower than the first volume level, and (iii) wait to receive a command to accept the request or a command to reject the request;

in response to receiving the command to reject the request, the first NMD (i) instructing the playback device to continue playing the audio content but at the first volume level, and (ii) resuming playing the audio content in synchrony with the playback device at the first volume level;

in response to receiving the command to accept the request, the first NMD starting the communication session; and after the communication session ends, the first NMD (i) determining audio content that the playback device is playing, (ii) playing the determined audio content in synchrony with the playback device at the first volume level, and (iii) instructing the playback device to set its volume to the first volume level.

11. Tangible, non-transitory computer-readable media comprising instructions that, when executed, cause a first Networked Microphone Device (NMD) to perform a method comprising:

while the first NMD is grouped with a second NMD, determining whether a Do Not Disturb (DND) feature should be activated, wherein determining whether a DND feature should be activated comprises at least one of (i) determining that one or more microphones of the first NMD has been deactivated or disconnected from power or (ii) determining that one or more microphones of the second NMD has been deactivated or disconnected from power; and in response to determining that the DND feature should be activated, activating the DND feature on both the first NMD and the second NMD.

12. The tangible, non-transitory computer-readable media of claim 11, wherein determining whether a DND feature should be activated comprises at least one of (i) determining that a hard-kill switch of the first NMD has cut power to the one or more microphones of the first NMD, (ii) determining that a soft-kill switch of the first NMD has deactivated the one or more microphones of the first NMD, (iii) determining that a hard-kill switch of the second NMD has cut power to the one or more microphones of the second NMD, or (iv) determining that a soft-kill switch of the second NMD has deactivated the one or more microphones of the second NMD.

13. The tangible, non-transitory computer-readable media of claim 11, wherein determining whether a DND feature should be activated comprises receiving a voice command via one or more microphones to activate the DND feature.

14. The tangible, non-transitory computer-readable media of claim 11, wherein determining whether a DND feature should be activated comprises at least one of: (i) detecting whether the first NMD is playing audio content; (ii) detecting whether the first NMD is playing audio content associated with video content; (iii) detecting whether the first NMD is playing audio content from a playlist designated by a user to trigger activation of the DND feature; (iv) detecting whether the first NMD is playing audio content comprising one of an audio book or a podcast; or (v) detecting whether an interactive session between the user and a voice assistant servicer (VAS) via the first NMD is in process.

15. The tangible, non-transitory computer-readable media of claim 11, wherein the first NMD and the second NMD are on the same LAN, and wherein the first NMD and second NMD are at least one of (i) members of a room group, (ii) members of a zone group, (iii) members of a synchrony group, (iv) a bonded playback device, (v) a stereo pair of playback devices, or (vi) manufactured by different manufacturers.

16. The tangible, non-transitory computer-readable media of claim 11, wherein a user is associated with the first NMD, and wherein the method further comprises:
   in response to activating the DND feature, notifying the user associated with the first NMD that the DND feature has been activated, wherein notifying the user associated with the first NMD that the DND feature has been activated comprises one or more of (i) sending one or more of a text message, app notification, or email to one or more computing devices associated with the user, (ii) playing an audio announcement via one or more speakers indicating that the DND feature is activated, (iii) activing a flashing light on the first NMD, or (iv) causing a video screen associated with the first NMD to display an on-screen message indicating that the DND feature is activated.

17. The tangible, non-transitory computer-readable media of claim 11, wherein the method further comprises:
   in response to activating the DND feature, sending at least one of (i) a first indication to a first controller application that the DND feature has been activated, or (ii) a second indication to a second controller application that the DND feature has been activated.

18. The tangible, non-transitory computer-readable media of claim 11, wherein the method further comprises:
   while the DND feature is active, receiving a request to start a communication session from a computing device, wherein the communication session is one of (i) an intercom session, (ii) a communication session comprising one or both of Voice over Internet Protocol (VoIP) or video, or (iii) a telephone call;
   in response to receiving the request to start the communication session, at least one of (i) notifying the computing device that the DND feature is activated on the first NMD, (ii) notifying the computing device of audio content that the NMD was playing when the NMD received the request to start the communication session, (iii) directing the request to start the communication session to a third NMD, (iv) directing the request to start the communication session to a mobile phone, (v) directing the request to start the communication session to a voice mailbox, (vi) sending an inaudible notification of the request to start the communication session to a user associated with the first NMD, or (vii) logging the request to start the communication session at one or more controller applications associated with the first NMD;
   determining that the DND feature should be deactivated;
   in response to determining that the DND feature should be deactivated, deactivating the DND feature on both the first NMD and the second NMD and at least one of (i) generating an audible notification of the request to start the communication session, (ii) generating an audible notification that the DND feature is no longer activated, (iii) sending a first indication to a first controller application that the DND feature is no longer activated, or (iv) sending a second indication to a second controller application that the DND feature is no longer activated.

19. The tangible, non-transitory computer-readable media of claim 11, wherein the method further comprises
   while the DND feature is active, receiving a request to start a communication session, wherein the communication session is one of (i) an intercom session, (ii) a communication session comprising one or both of Voice over Internet Protocol (VoIP) or video, or (iii) a telephone call;
   determining an origin of the request to start the communication session;
   in response to receiving the request to start the communication session and determining that the request to start the communication session originated from a first computing device on a Local Area Network (LAN) which the first NMD is also on, generating an audible notification of at least one of (i) the request to start the communication session and (ii) the origin of the request to start the communication session; and
   in response to receiving the request to start the communication session and determining that the request to start the communication session originated from a second computing device not on the same LAN as the first NMD, at least one of (i) notifying the second computing device that the DND feature is activated on the first NMD, (ii) notifying the second computing device of audio content that the NMD was playing when the NMD received the request to start the communication session, (iii) directing the request to start the communication session to a third NMD, (iv) directing the request to a mobile phone, (v) directing the request to start the communication session to a voice mailbox, (vi) sending an inaudible notification of the request to start the communication session to a user associated with the first NMD, or (vii) logging the request to start the communication session at one or more controller applications associated with the first NMD;
   determining that the DND feature should be deactivated;
   in response to determining that the DND feature should be deactivated, deactivating the DND feature on the first NMD and at least one of (i) generating an audible notification of the request to start the communication session, (ii) generating an audible notification that the DND feature is no longer activated, (iii) sending a first indication to a first controller application that the DND feature is no longer activated, or (iv) sending a second indication to a second controller application that the DND feature is no longer activated.

20. The tangible, non-transitory computer-readable media of claim 11, wherein the method further comprises:

playing audio content in synchrony with a playback device;

while the DND feature is active, and while the first NMD is playing audio content in synchrony with the playback device at a first volume level, receiving a request to start a communication session, wherein the communication session is one of (i) an intercom session, (ii) a communication session comprising one or both of Voice over Internet Protocol (VoIP) or video, or (iii) a telephone call; and in response to receiving the request, the first NMD (i) ceasing playing the audio content in synchrony with the playback device, (ii) instructing the playback device to continue playing the audio content but at a second volume level that is lower than the first volume level, and (iii) wait to receive a command to accept the request or a command to reject the request;

in response to receiving the command to reject the request, the first NMD (i) instructing the playback device to continue playing the audio content but at the first volume level, and (ii) resuming playing the audio content in synchrony with the playback device at the first volume level;

in response to receiving the command to accept the request, the first NMD starting the communication session; and after the communication session ends, the first NMD (i) determining audio content that the playback device is playing, (ii) playing the determined audio content in synchrony with the playback device at the first volume level, and (iii) instructing the playback device to set its volume to the first volume level.

* * * * *